(12) United States Patent
Jones et al.

(10) Patent No.: US 7,114,366 B1
(45) Date of Patent: Oct. 3, 2006

(54) SENSOR

(75) Inventors: Ben Jones, Austin, TX (US); Scott T. Dupuie, Buda, TX (US); Jeffrey Allen Blackburn, Austin, TX (US); Richard A. Johnson, Buda, TX (US); Michael L. Abrams, Houston, TX (US); James Broseghini, Austin, TX (US); Mauricio A. Zavaleta, Austin, TX (US); Mark E. Burchfield, Austin, TX (US); Roger Maher, Dublin (IE); Burton A. Devolk, Austin, TX (US); Frank Mayo, Houston, TX (US)

(73) Assignee: Input / Output Inc., Stafford, TX (US)

( * ) Notice: Subject to any disclaimer, the term of this patent is extended or adjusted under 35 U.S.C. 154(b) by 0 days.

(21) Appl. No.: 09/936,630

(22) PCT Filed: Mar. 16, 2000
(Under 37 CFR 1.47)

(86) PCT No.: PCT/US00/40038

§ 371 (c)(1),
(2), (4) Date: May 9, 2003

(87) PCT Pub. No.: WO00/55593

PCT Pub. Date: Sep. 21, 2000

(51) Int. Cl.
*G01D 18/00* (2006.01)
(52) U.S. Cl. .......................................... 73/1.01; 73/1.37
(58) Field of Classification Search ................ 73/1.37, 73/1.01, 649, 488, 700
See application file for complete search history.

(56) References Cited

U.S. PATENT DOCUMENTS

| | | | |
|---|---|---|---|
| 4,034,801 A | 7/1977 | Bernstein | |
| 4,206,451 A | 6/1980 | Kurschner | |
| 4,300,205 A | 11/1981 | Tansuwan | |
| 4,325,251 A | 4/1982 | Kanegae | |
| 4,345,474 A | 8/1982 | Deval | |
| 4,377,822 A | 3/1983 | Noirel et al. | |
| 4,713,604 A | 12/1987 | Becker et al. | |
| 4,805,197 A | 2/1989 | Van Derjagt et al. | |
| 5,343,766 A | 9/1994 | Lee | |
| 5,440,939 A * | 8/1995 | Barny et al. | 73/862.61 |
| 5,602,512 A | 2/1997 | Neron | |
| 5,883,598 A * | 3/1999 | Parl et al. | 342/457 |
| 5,950,629 A * | 9/1999 | Taylor et al. | 128/897 |
| 5,991,622 A * | 11/1999 | Henry, Jr. | 455/434 |
| 6,035,694 A | 3/2000 | Dupuie et al. | |
| 6,077,345 A | 6/2000 | Easoz et al. | |

FOREIGN PATENT DOCUMENTS

| | | | |
|---|---|---|---|
| JP | 114852 A | * | 4/1992 |
| JP | 8-62245 | | 3/1996 |

* cited by examiner

*Primary Examiner*—Hezron Williams
*Assistant Examiner*—Nashmiya Fayyaz
(74) *Attorney, Agent, or Firm*—Madan, Mossman & Sriram P.C.

(57) ABSTRACT

A system for acquiring environmental information measurements. The 5 system (100) utilize a sensor, (205) a front-end circuit, (310) a loop filter (315), a switch controller (206), and a reduced-order loop control circuit to provide reliable data measurements while providing robust system behavior. The system further includes a sensor simulator (330) for simulating the operation of the sensor (205) and testing the operation of the front-end circuit (310) and the loop filter (315).

8 Claims, 62 Drawing Sheets

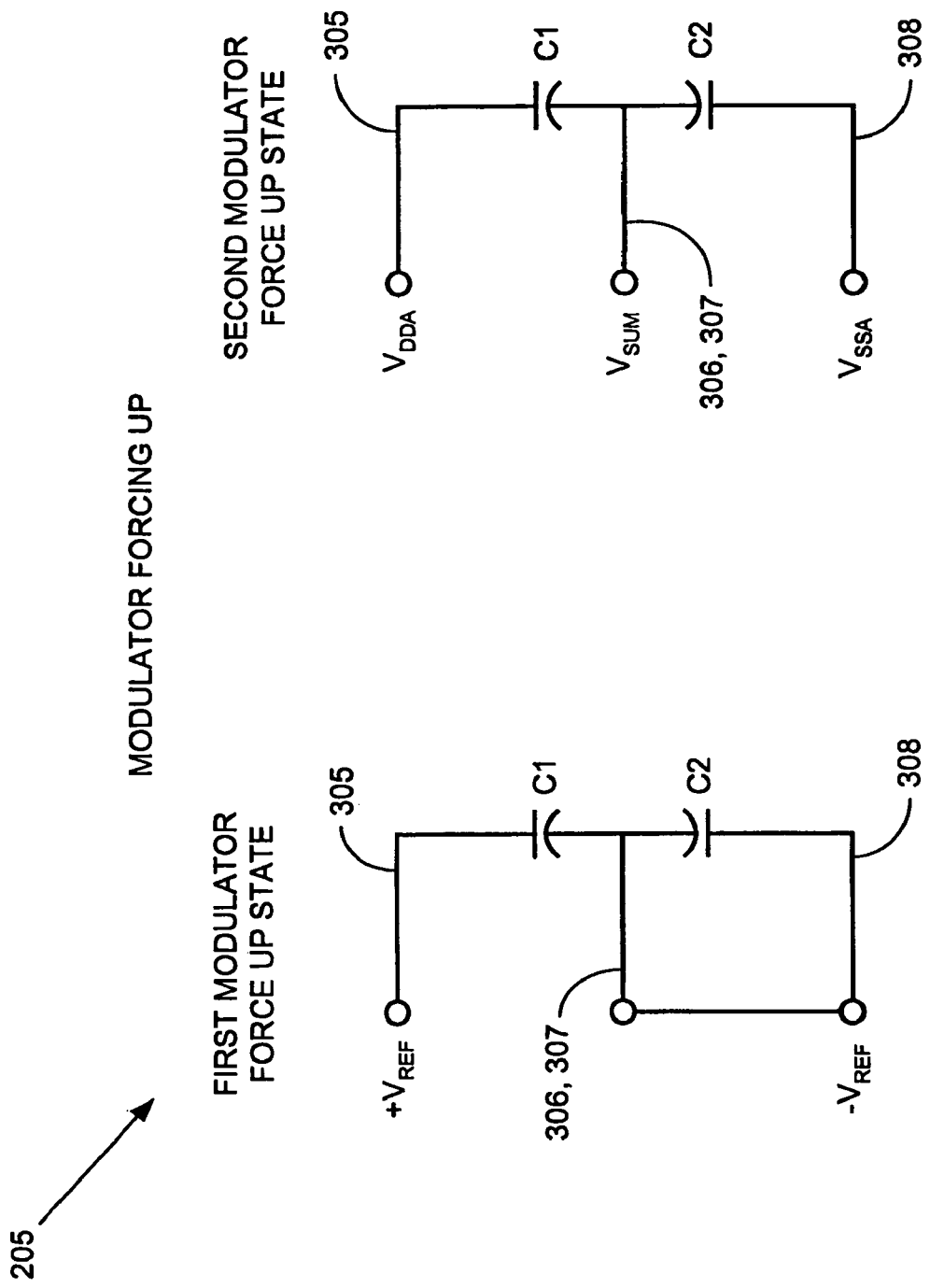

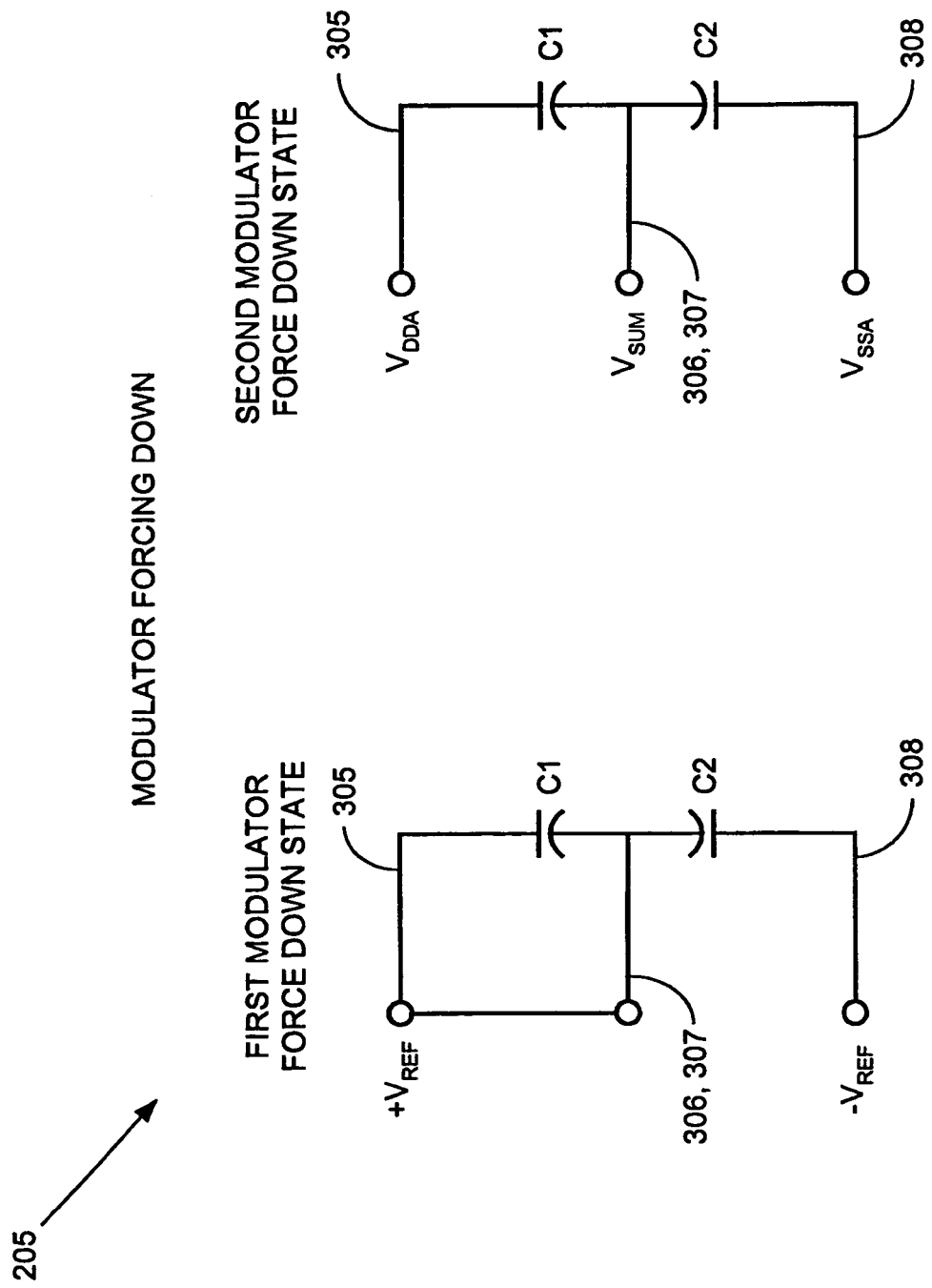

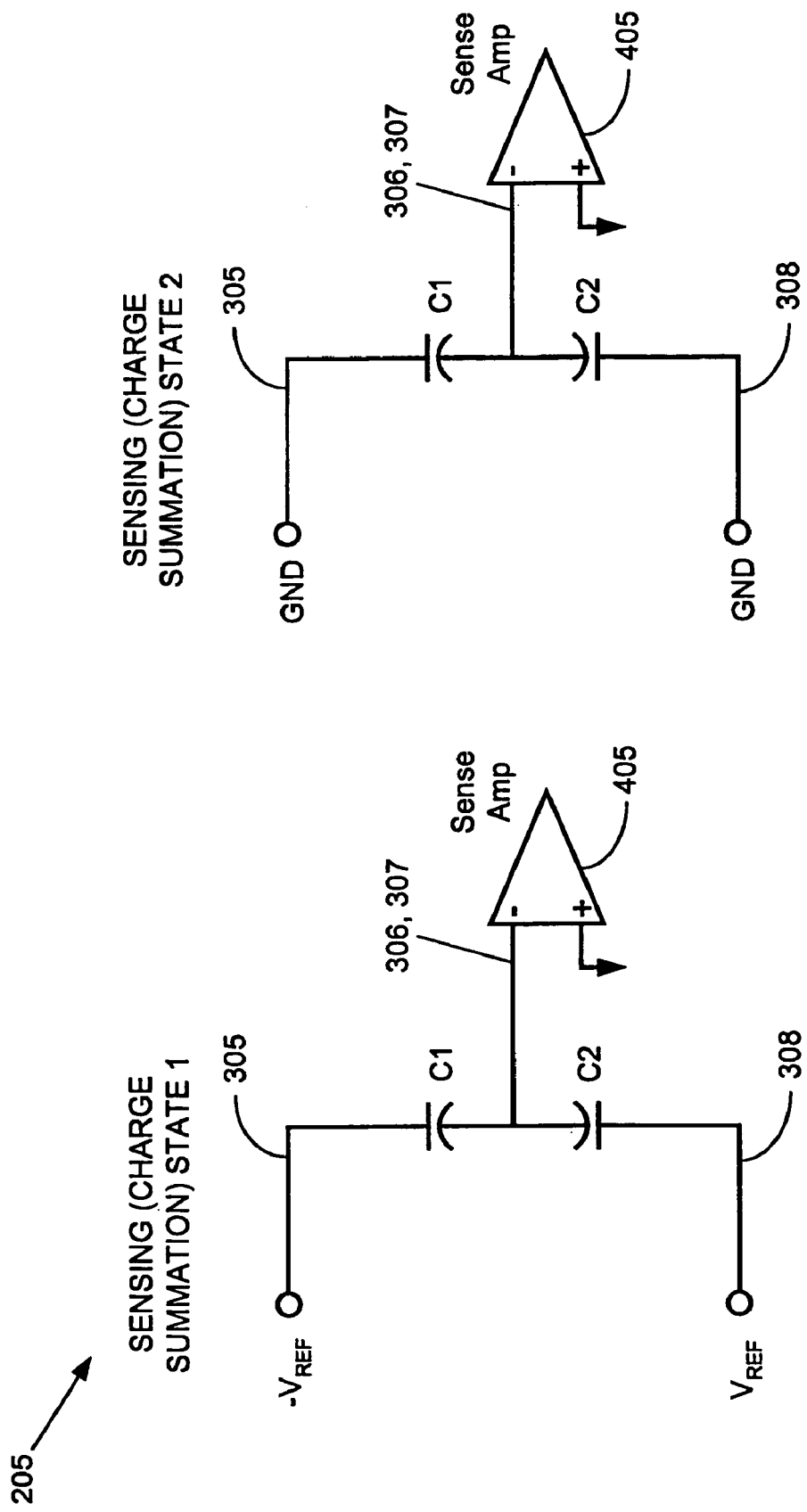

FIGURE 17

| | DUMMY FORCE UP STATE | DUMMY FORCE DOWN STATE | FIRST MODULATOR FORCE UP STATE | SECOND MODULATOR FORCE UP STATE | FIRST MODULATOR FORCE DOWN STATE | SECOND MODULATOR FORCE DOWN STATE | RETURN-TO-ZERO STATE | GRAVITY CANCELLATION STATE | VOLTAGE EQUALIZATION STATE | SENSING STATE 1 | SENSING STATE 2 |
|---|---|---|---|---|---|---|---|---|---|---|---|
| phsu1 | off | off | off | on | off | on | off | off | off | off | off |
| phsu2 | off | off | off | on | off | on | off | off | off | off | off |
| phu1 | on | off | on | off | off | off | off | on | on | off | off |
| phu2 | on | off | on | off | off | off | off | on | on | off | off |
| phd1 | off | on | off | off | on | off | off | off | off | off | off |
| phd2 | off | on | off | off | on | off | off | off | off | off | off |
| phg1 | off | off | off | off | off | off | on | off | off | off | on |
| phg2 | off | off | off | off | on | off | on | off | off | on | off |
| phtc | off | on | on | off | off | off | on | off | off | off | off |
| phbc | on | off | on | off | off | off | off | off | off | off | off |
| phsg | off | off | off | on | off | on | off | off | off | off | off |
| phf | off | off | off | off | off | off | off | on | on, then off | off | off |
| phloop | off | off | off | off | off | on | off | off | off | off | off |
| phsim | off | off | off | off | off | off | on | off | off | off | off |
| phxbuf | off | off | off | off | off | off | off | off | off | off | off |
| phs | off | off | off | off | off | off | off | off | off, then on | on | on |
| phz | on | on | on | off | on | off | on | on | on | off | off |
| pha | off | off | off | off | off | off | off | off | off | on | on |

…

SENSOR

BACKGROUND OF THE INVENTION

This invention relates generally to data measurement and, more specifically, to a control system for data measurement.

Sensor equipment is used in a variety of applications to acquire environmental data measurements. The existing technology for acquiring data measurements suffers from a number of limitations. For example, the existing technology may suffer from a degradation of system performance as a result of system startup, system overloading, or stray capacitance within the system. Furthermore, testing the output of a sensor controller in the existing technology is time-consuming and expensive.

The present invention is directed to overcoming one or more of the limitations of the existing technology for acquiring environmental data measurements.

SUMMARY

According to one embodiment of the present invention, a sensor system for recording environmental data measurements is provided that includes a sensor for detecting environmental data, a controller for controlling the operation of the sensor, including a front-end circuit coupled to the sensor, a loop filter coupled to the front-end circuit, a multiphase clock generator coupled to the front-end circuit and the loop filter, and a startup sequencer coupled to the loop filter, and a communication interface for coupling the sensor and the controller.

According to another embodiment of the present invention, a controller for controlling the operation of a sensor is provided that includes a front-end circuit coupled to the sensor, a loop filter coupled to the front-end circuit, a multiphase clock generator coupled to the front-end circuit and the loop filter, a startup sequencer coupled to the loop filter and the multiphase clock generator, a sensor simulator for simulating the performance of the sensor coupled to the startup sequencer, the multiphase clock generator, and the front-end circuit, and an overload detection device coupled to the loop filter and the startup sequencer.

According to another embodiment of the present invention, a controller for controlling the operation of a sensor is provided that includes a front-end circuit coupled to the sensor, a loop filter coupled to the front-end circuit, a multiphase clock generator coupled to the front-end circuit and the loop filter, a startup sequencer coupled to the loop filter and the multiphase clock generator, and an overload detection device coupled to the loop filter and the startup sequencer.

According to another embodiment of the present invention, a front-end circuit for providing electrostatic forces and position sensing for a measurement mass in a sensor is provided that includes a plurality of switches for controlling the operation of the sensor and a sense amplifier for sensing the position of the measurement mass within the sensor.

According to another embodiment of the present invention, a loop filter for providing control to a sensor system is provided that includes one or more integrators for providing a signal for controlling the sensor system, one or more derivative controllers for providing a signal for controlling the sensor system, one or more proportional controllers for providing a signal for controlling the sensor system, and a summer for combining the signals from the integrators, the derivative controllers, and the proportional controllers.

According to another embodiment of the present invention, a method of operating a loop filter within a sensor system is provided that includes sending a signal to the loop filter indicating an operating mode of the sensor system, operating the loop filter in a reduced-order mode while the sensor system is operating in a start-up mode, operating the loop filter in the reduced-order mode for a predetermined period of time after the sensor system transitions from the start-up operating mode to a sigma-delta operating mode, and operating the loop filter in a normal mode during the sigma-delta operating mode after the predetermined period of time during which the loop filter operates in reduced-order mode.

According to another embodiment of the present invention, a method of operating a loop filter within a sensor system is provided that includes sending a signal to the loop filter indicating an operating mode of the sensor system, operating the loop filter in a reduced-order mode while the sensor system is operating in a start-up mode, operating the loop filter in the reduced-order mode for a predetermined period of time after the sensor system switches from the start-up operating mode to a sigma-delta operating mode, operating the loop fitter in the reduced-order mode while the sensor system is operating in the sigma-delta operating mode, and operating the loop filter in a normal mode while the sensor system operates in the sigma-delta operating mode after the predetermined period of time during which the loop filter operates in reduced-order mode.

According to another embodiment of the present invention, a method of controlling the operation within a sensor system of a loop filter including one or more integrators, a proportional controller, and a derivative controller is provided that includes sending a signal to the loop filter indicating the operating mode of the sensor system, holding the integrators in a reset mode to place the loop filter in a reduced-order operating mode when the sensor system is operating in a startup mode, and taking the integrators out of the reset mode to place the loop filter in a normal operating mode when the sensor system is operating in a sigma-delta operating mode.

According to another embodiment of the present invention, a method of placing a loop filter including one or more integrators, a proportional controller, and a derivative controller in a reduced-order operating mode is provided that includes sending a signal to the loop filter to control the operating mode of the loop filter, holding the integrators within the loop filter in a reset mode to place the loop filter in the reduced-order operating mode.

According to another embodiment of the present invention, a method of providing control to a sensor assembly is provided that includes determining an operating mode of the sensor assembly, adjusting a mode of operation of a loop filter in the sensor assembly, providing feedback loop compensation to the sensor assembly during a startup mode of operation for the sensor assembly, and providing noise shaping to the sensor assembly during a sigma-delta mode of operation for the sensor assembly.

According to another embodiment of the present invention, a multiphase clock generator for providing clock signals for controlling the operation of a sensor system is provided that includes a digital signal generator and a data-independent clock resynchronization circuit coupled to the digital signal generator.

According to another embodiment of the present invention, a sensor simulator for simulating the operation of a sensor is provided that includes a filter adapted to receive one or more input signals and generate an output signal representative of the operating state of the sensor and an input signal selector operably coupled to the filter adapted to controllably select the input signals as a function of the simulated operating state of the sensor.

According to another embodiment of the present invention, a system for testing the operation of a controller in a sensor system is provided that includes a sensor simulator for simulating the operation of a sensor and a controller coupled to the simulator.

According to another embodiment of the present invention, a method of controlling the operation of a sensor system is provided that includes using a controller to apply electrostatic forces to a sensor to create one or more sensor operating states and sequentially arranging the operating states into which the sensor is placed to create one or more operating modes for the sensor system.

According to another embodiment of the present invention, a feedback control system for providing control to a sensor system is provided that includes a startup sequencer for selecting the mode of operation of the feedback control system and a loop filter coupled to the startup sequencer.

According to another embodiment of the present invention, a multiphase clock generator for generating clock signals for use within a sensor system is provided that includes a digital signal generator for generating a first clock signal and a clock resynchronization circuit coupled to the digital signal generator for receiving the first clock signal from the digital signal generator and resampling the first clock signal to generate a second clock signal.

According to another embodiment of the present invention, a clock resynchronization circuit for resampling clock signals is provided that includes a plurality of inverters, a plurality of NOR gates coupled to the inverters, a plurality of NAND gates coupled to the inverters, a plurality of XNOR gates coupled to the NAND gates and the inverters, a plurality of asynchronous set double-edge flip-flops coupled to the NOR gates, and a plurality of asynchronous reset double-edge flip-flops coupled to the NOR gates.

According to another embodiment of the present invention, a device for resampling an input signal on a rising edge and a falling edge of a clock signal is provided that includes a plurality of transmission gates, one or more NOR gates coupled to the transmission gates, and a plurality of inverters coupled to the NOR gates and the transmission gates.

According to another embodiment of the present invention, a device for resampling an input signal on a rising edge and a falling edge of a clock signal is provided that includes a plurality of transmission gates, one or more NAND gates coupled to the transmission gates, and a plurality of inverters coupled to the NAND gates and the transmission gates.

According to another embodiment of the present invention, a method of generating a clock signal for a sensor assembly is provided that includes generating a first clock signal and resampling the first clock signal to generate a second clock signal to restore signal integrity and provide a timing relationship.

According to another embodiment of the present invention, a method of resampling an input signal is provided that includes resampling the input signal in a first level-sensitive latch, including one or more transmission gates, one or more NOR gates, and one or more inverters, on one edge of a clock input signal, and resampling the input signal in a second level-sensitive latch, including one or more transmission gates, one or more NOR gates, and one or more inverters, acting in parallel with the first level-sensitive latch, on another edge of the clock input signal.

According to another embodiment of the present invention, a method of resampling an input signal is provided that includes resampling the input signal in a first level-sensitive latch, including one or more transmission gates, one or more NAND gates, and one or more inverters, on one edge of a clock input signal, and resampling the input signal in a second level-sensitive latch, including one or more transmission gates, one or more NAND gates, and one or more inverters, acting in parallel with the first level-sensitive latch, on another edge of the clock input signal.

According to another embodiment of the present invention, a method of operating an analog control circuit is provided that includes generating a first clock signal, resampling the first clock signal to generate a second clock signal to restore signal integrity and provide a proper timing relationship, and driving the analog control circuit using the second clock signal.

According to another embodiment of the present invention, a controller assembly is provided that includes a sensor, a sensor simulator for simulating the operation of the sensor, a controller for controlling the sensor and the sensor simulator, and a switch for coupling the controller to the sensor or the sensor simulator.

According to another embodiment of the present invention, a method of testing a controller in a controller assembly is provided that includes connecting a sensor simulator to the controller, supplying an input signal of a known value to the sensor simulator, converting the input data to the sensor simulator into an output stream from the sensor simulator, sending the output stream from the sensor simulator to the controller, processing the output stream from the sensor simulator within the controller to create an output stream from the controller, and analyzing the output from the controller to determine the accuracy of the controller.

According to another embodiment of the present invention, a method of fabricating a controller assembly for a sensor is provided that includes providing a substrate, fabricating one or more controllers on the substrate, fabricating one or more sensor simulators on the substrate, and coupling the controller and the sensor simulator.

According to another embodiment of the present invention, a method of offsetting the effects of external acceleration forces on a sensor is provided that includes applying electrostatic forces to the sensor to offset the effects of the acceleration force.

The present embodiments of the invention provide a system for acquiring environmental information measurements, utilizing a sensor, a front-end circuit, a loop filter, a switch controller, and a reduced-order loop control circuit to provide reliable data measurements while providing robust system behavior. The system further includes a sensor simulator for simulating the operation of the sensor and testing the operation of the front-end circuit and the loop filter.

BRIEF DESCRIPTION OF THE DRAWINGS

FIG. 12a illustrates an embodiment of the sensor of FIG. 9 operating in a FIRST MODULATOR FORCE UP STATE.

FIG. 12b illustrates an alternative embodiment of the sensor of FIG. 9 operating in a SECOND MODULATOR FORCE UP STATE.

FIG. 12c illustrates an embodiment of the sensor of FIG. 9 operating in a FIRST MODULATOR FORCE DOWN STATE.

FIG. 12d illustrates an alternative embodiment of the sensor of FIG. 9 operating in a SECOND MODULATOR FORCE DOWN STATE.

FIG. 16a illustrates an embodiment of the sensor of FIG. 9 operating in a SENSING (CHARGE SUMMATION) state 1.

FIG. 16b illustrates an alternative embodiment of the sensor of FIG. 9 operating in a SENSING (CHARGE SUMMATION) state 2.

FIG. 17 is a chart indicating the position of switches within the front-end circuit of FIG. 4 during the various exemplary operating states of the sensor.

FIG. 45b illustrates another portion of the clock resynchronization circuit of FIG. 45a.

FIG. 45c illustrates another portion of the clock resynchronization circuit of FIG. 45a.

FIG. 45d illustrates another portion of the clock resynchronization circuit of FIG. 45a.

FIG. 45e illustrates another portion of the clock resynchronization circuit of FIG. 45a.

FIG. 48 is an embodiment of a timing diagram for the clock resynchronization circuit of FIG. 45a.

FIG. 49 is an embodiment of another timing diagram for the clock resynchronization circuit of FIG. 45a.

DETAILED DESCRIPTION OF THE ILLUSTRATIVE EMBODIMENTS

Referring to FIGS. 1, 2, 3, 4, 5, 6, 7 and 8, a system for acquiring environmental data measurements will now be described.

Figure 1:
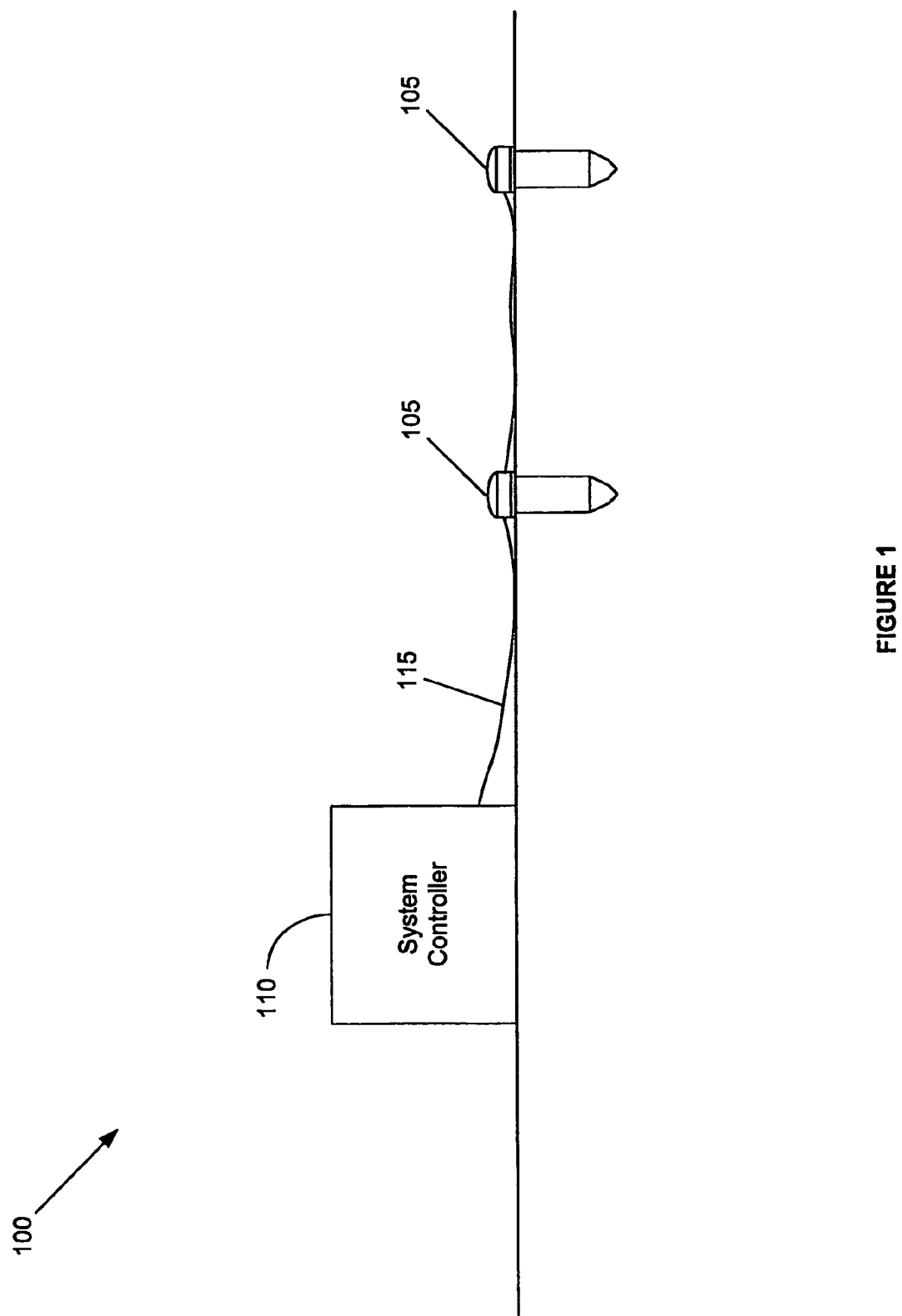
FIG. 1 illustrates an embodiment of a system for acquiring environmental data measurements.

Referring initially to FIG. 1, a preferred embodiment of a sensor system 100 for acquiring environmental data measurements is illustrated. The system 100 preferably includes a measurement device 105 for detecting environmental data measurements, a controller 110 for controlling the measurement device 105, and a communication interface 115 for coupling the measurement device 105 and the controller 110.

Figure 2:
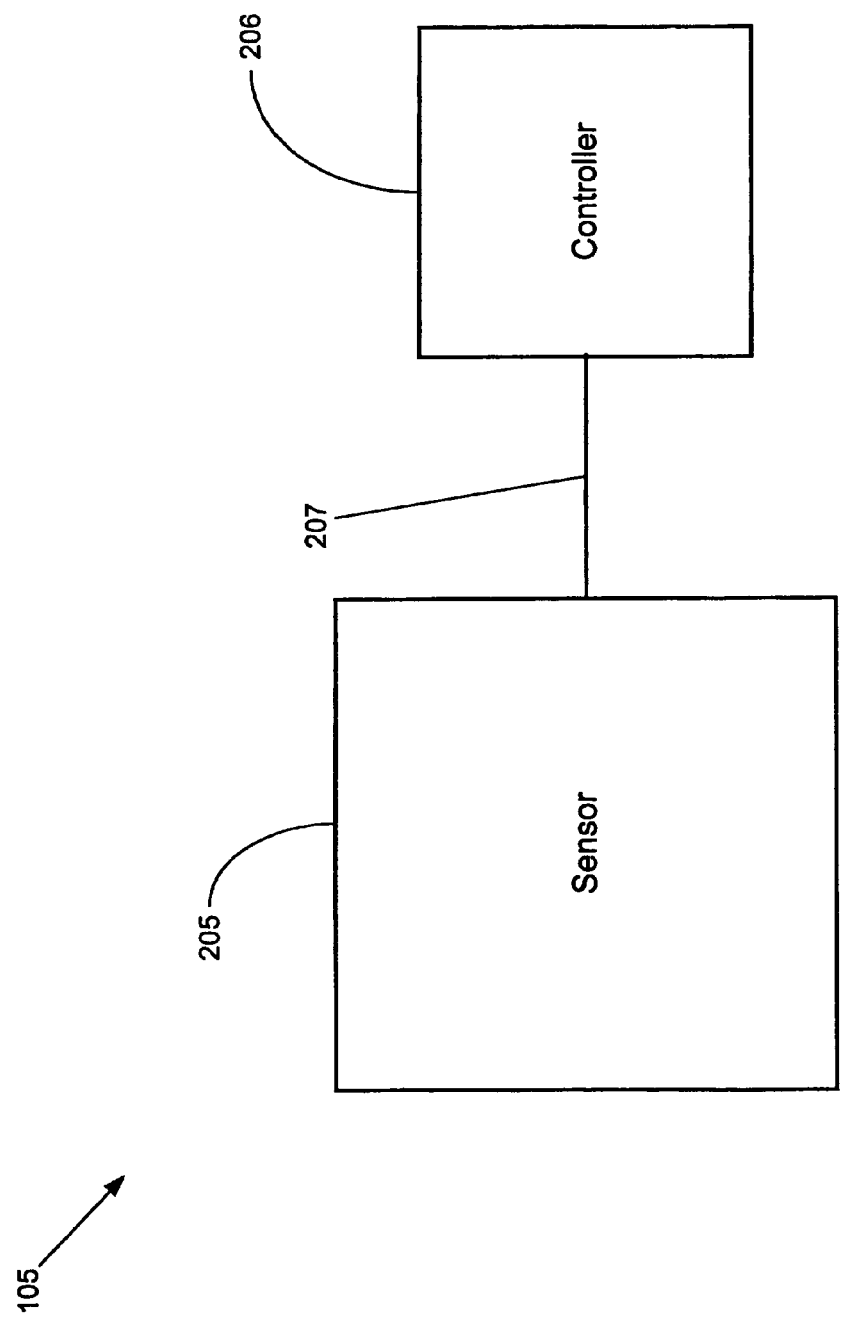
FIG. 2 illustrates an embodiment of a sensor and controller for use in the system of FIG. 1.

The measurement device 105 is preferably adapted to detect environmental data measurements. In a preferred embodiment, the measurement device 105 is coupled to the controller 110 by the communication interface 115. The measurement device 105 may include any number of conventional commercially available measurement devices suitable for acquiring environmental data measurements. As illustrated in FIG. 2, in a preferred embodiment, the measurement device 105 includes a sensor 205, a controller 206, and an interface 207 for coupling the sensor 205 and the controller 206.

The sensor 205 may include any number of sensors suitable for detecting and recording environmental data measurements such as, for example, a geophone, a hydrophone, a pressure sensor, a temperature sensor, or an accelerometer. In a preferred embodiment, the sensor 205 is an accelerometer. The accelerometer 205 may be micromachined from wafers made from any number of conventional commercially available materials suitable for creating a sensor, such as, for example, silicon, polysilicon, germanium, quartz, pyrex, gallium arsenide, gallium phosphate, or plated metals. In a preferred embodiment, the accelerometer 205 is micromachined from silicon.

Figure 3:
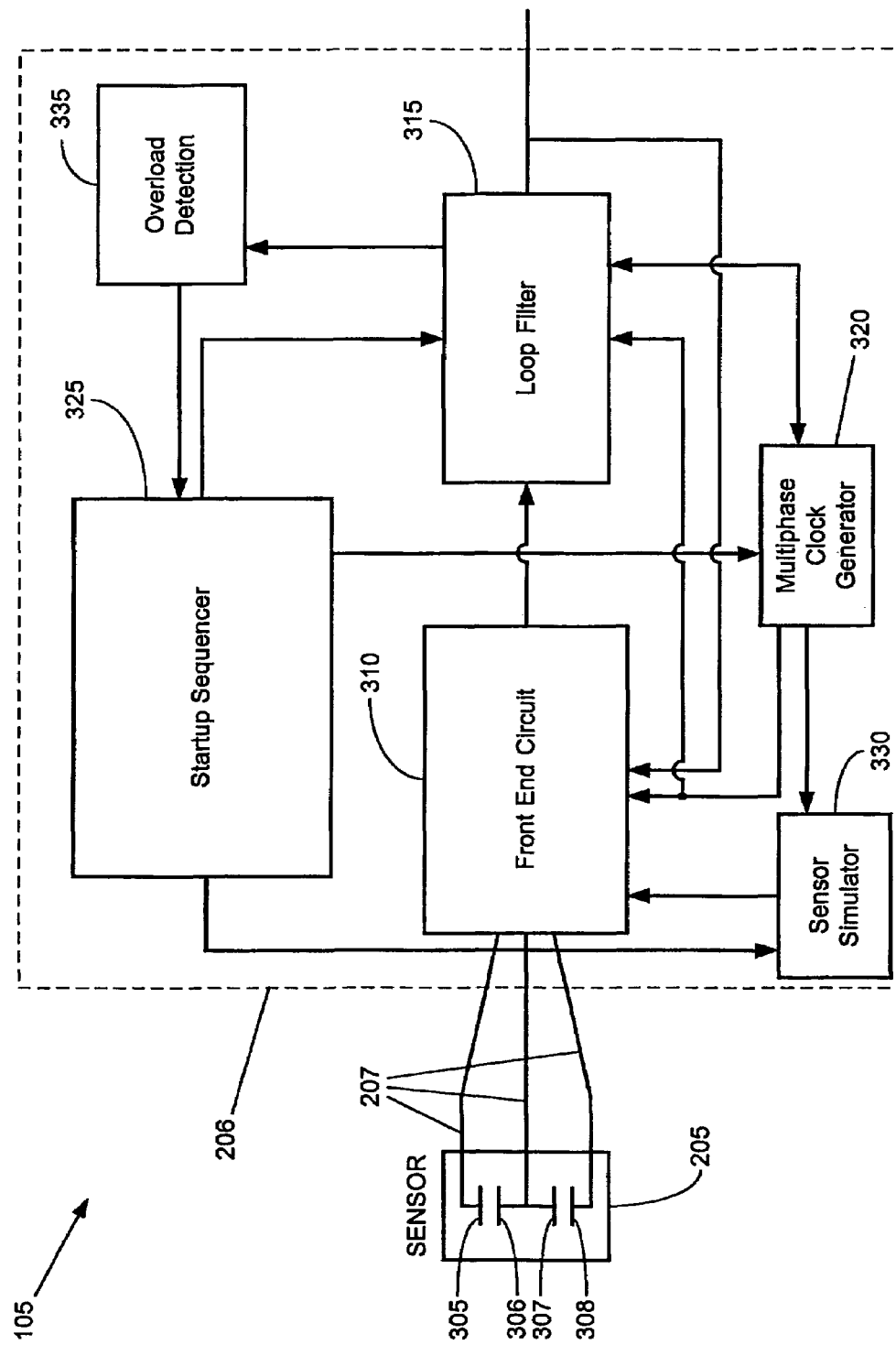
FIG. 3 illustrates an embodiment of the sensor and the controller of FIG. 2.
Figure 4:
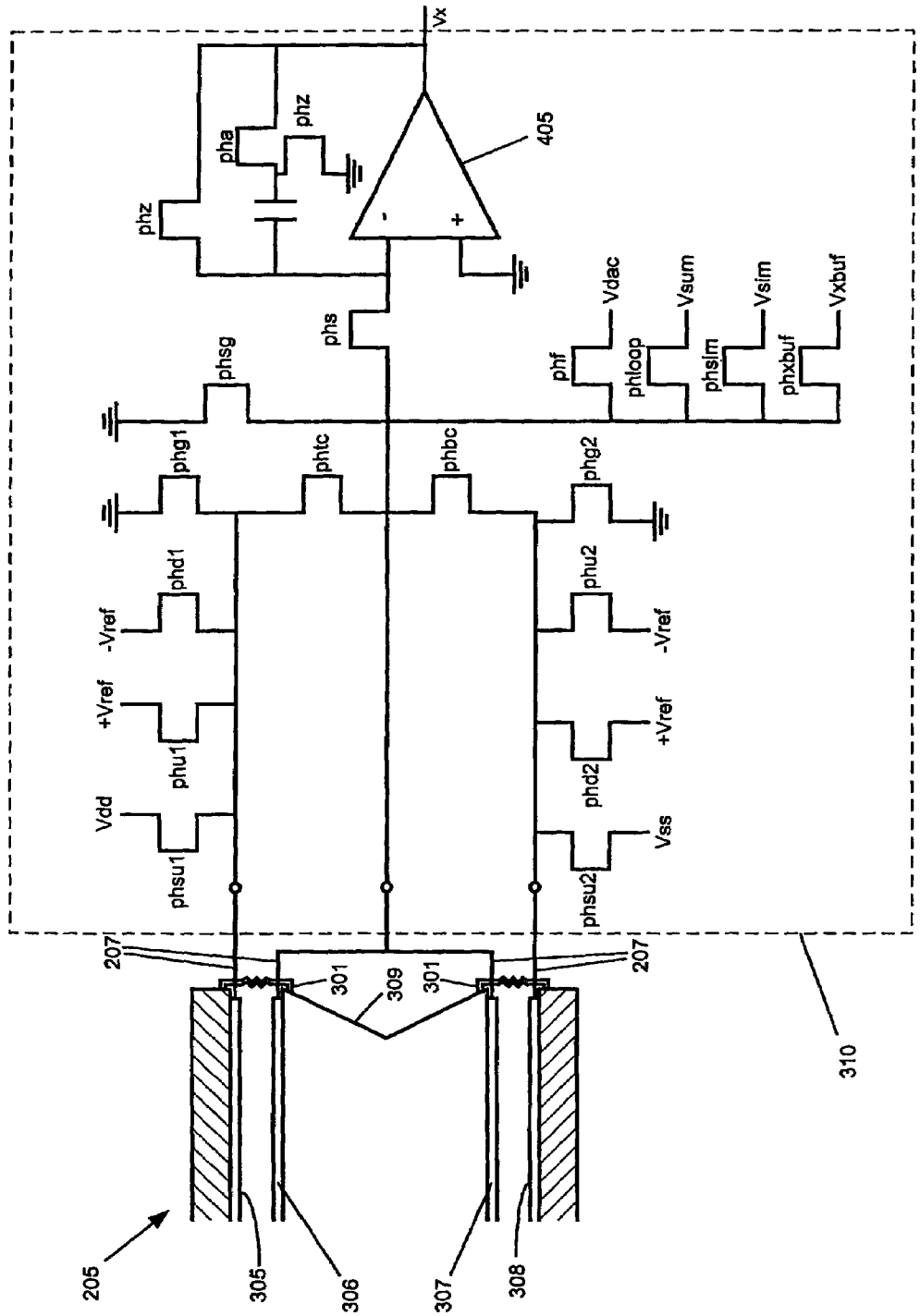
FIG. 4 illustrates an embodiment of the front-end circuit used in the controller of FIG. 3.

The design of the sensor 205 is preferably provided substantially as described in U.S. Pat. No. 5,852,242, the disclosure of which is incorporated herein by reference. In a preferred embodiment, as illustrated in FIGS. 3 and 4, the sensor 205 includes conductive plates 305, 306, 307, and 308, a measurement mass 309, and springs 301 for supporting the measurement mass 309 within the sensor 205.

In a preferred embodiment, the conductive plates 305, 306, 307, and 308 are substantially identical. The plates 305, 306, 307, and 308 may be formed from any number of conventional commercially available materials suitable for forming conductive plates. In a preferred embodiment, the plates 305, 306, 307, and 308 are provided substantially as described in one or more of the following: U.S. Pat. No. 5,852,242, U.S. Pat. No. 5,652,384, and U.S. Pat. No. 5,777,226, the disclosures of which are incorporated herein by reference. The plates 305, 306, 307, and 308 may be arranged within the sensor 205 in any manner suitable for initiating the interaction between the plates 305, 306, 307, and 308 necessary to create a sensor. In a preferred embodiment, the plate 305 is positioned substantially opposite the plate 306 and the plate 307 is positioned substantially opposite the plate 308.

The measurement mass 309 may be formed from any number of conventional commercially available materials, such as, for example, silicon, polysilicon, germanium, quartz, pyrex, gallium arsenide, gallium phosphate, or plated metals. In a preferred embodiment, the measurement mass 309 is micromachined from silicon.

The springs 301 are preferably adapted to couple the measurement mass 309 to the sensor 205 and to support the measurement mass 309 within the sensor 205. The springs 301 preferably further provide electrical connections between the measurement mass 309 and the sensor 205. The design of the springs 301 is preferably provided substantially as described in one or more of the following: U.S. Pat. No. 5,652,384 and U.S. Pat. No. 5,777,226, the disclosures of which are incorporated herein by reference.

The controller 206 may include any number of controllers suitable for controlling the operation of the sensor 205, such as, for example, a frequency/amplitude modulation controller or an application specific integrated circuit (ASIC). In a preferred embodiment, the controller 206 is an ASIC. In a preferred embodiment, the controller 206 is a sigma-delta ASIC controller. In a preferred embodiment, as illustrated in FIG. 3, the controller 206 includes a front-end circuit 310, a loop filter circuit 315, a multiphase clock generator 320, a startup sequencer 325, a sensor simulator 330, and an overload detection device 335.

In a preferred embodiment, the front-end circuit 310 interfaces to the sensor 205 and is adapted to provide electrostatic forcing and position sensing for the measurement mass 309 within the sensor 205. In a preferred embodiment, the front-end circuit 310 is operably coupled to the sensor 205 by the interface 207. The front-end circuit 310 is also preferably operably coupled to the loop filter 315, the multiphase clock generator 320, and the sensor simulator 330. The front-end circuit 310 may include any number of circuits suitable for providing electrostatic forcing and position sensing for the sensor 205. In a preferred embodiment, the front-end circuit 310 is an analog circuit. As illustrated in FIG. 4, the front-end circuit 310 preferably includes switches phsu1, phsu2, phu1, phu2, phd1, phd2, phg1, phtc, phbc, phg2, phsg, phs, phf, phloop, phsim, phxbuf, phz, and pha for connecting the sensor 205 to a variety of voltage sources, and a sense amplifier 405 for sensing the position of the measurement mass 309 within the sensor 205.

The switches phsu1, phsu2, phu1, phu2, phd1, phd2, phg1, phtc, phbc, phg2, phsg, phs, phf, phloop, phsim, phxbuf, phz, and pha may be any number of conventional commercially available switches suitable for connecting the sensor 205 to a variety of voltage sources.

The sense amplifier 405 may be any number of sense amplifiers suitable for sensing the position of the measurement mass 309 in the sensor 205. In a preferred embodiment, the sense amplifier 405 is a switched-capacitor circuit. In a preferred embodiment, the output Vx of the sense amplifier 405 in the front-end circuit 310 is a voltage representing the position of the measurement mass 309 within the sensor 205. The position of the measurement mass 309 within the sensor 205 may be representative of the amount of an acceleration force experienced by the measurement mass 309.

Figure 5:
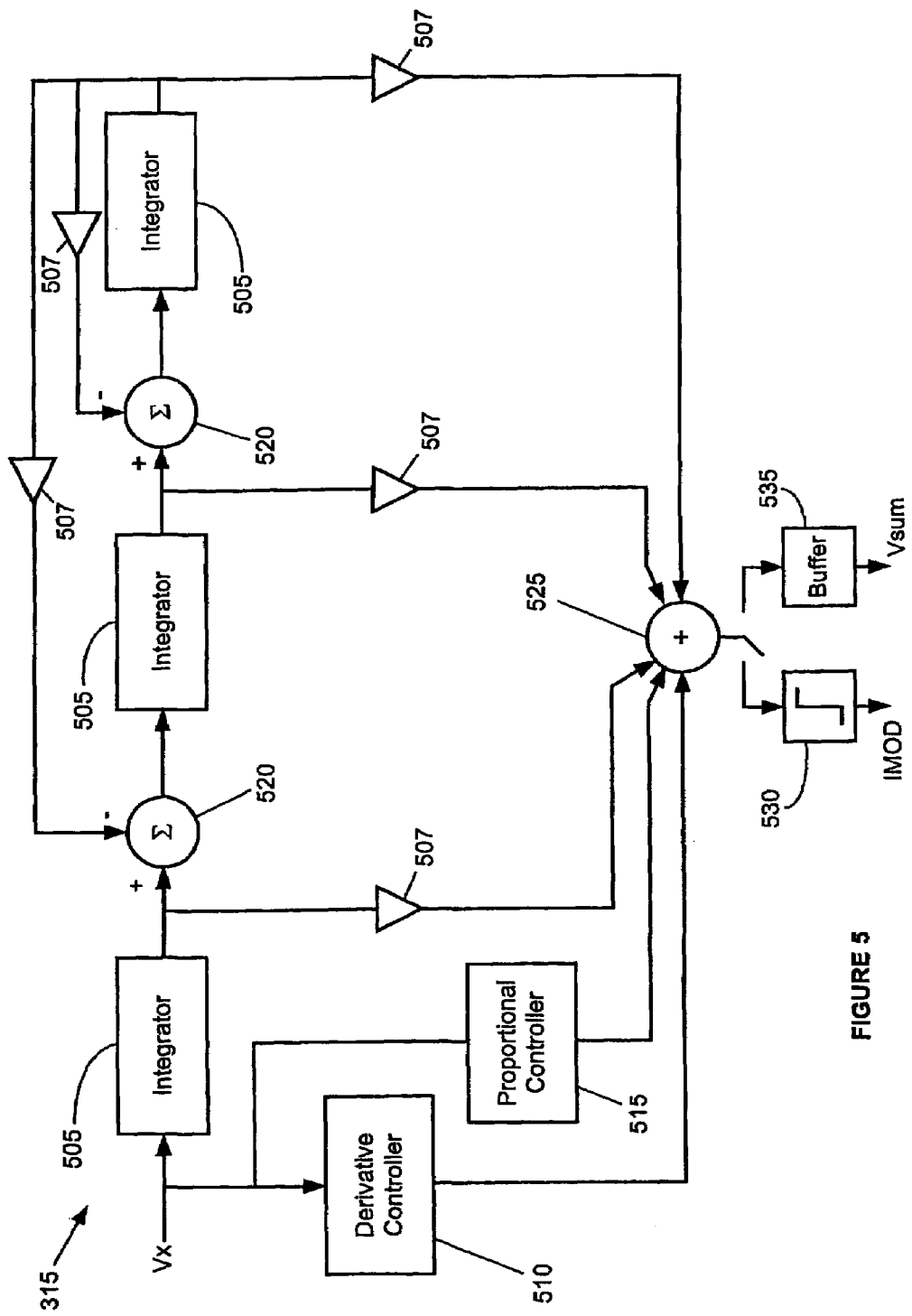
FIG. 5 illustrates an embodiment of the loop filter used in the controller of FIG. 3.

The loop filter 315 is preferably adapted to receive the output Vx from the sense amplifier 405 and create output streams for providing feedback loop compensation and noise shaping for the sensor 205. In a preferred embodiment, the loop filter 315 is operably coupled to the front-end circuit 310, the multiphase clock generator 320, the startup sequencer 325, and the overload detection device 335. In a preferred embodiment, as illustrated in FIG. 5, the loop filter 315 includes one or more integrators 505, a derivative controller 510, a proportional controller 515, summers 520 and 525, a comparator 530, a buffer 535, and scaling devices 507. In a preferred embodiment, the loop filter 315 is an analog circuit.

In a preferred embodiment, the integrators 505 are used to provide control to the sensor 205. The integrators 505 preferably generate third, fourth, and fifth integral terms for fifth-order noise shaping of 1-bit quantization noise. The integrators 505 may include any number of conventional commercially available integrators suitable for providing integral control to sensor 205. In a preferred embodiment, the integrators 505 are switched-capacitor circuits.

The scaling devices 507 preferably scale the output streams from the integrators 505. The scaling devices 507 may be any number of devices suitable for scaling the output streams from the integrators 505. In a preferred embodiment, the scaling devices 507 are switched-capacitor circuits.

The derivative controller 510 preferably provides derivative control to the sensor 205. In a preferred embodiment, the derivative controller 510 provides derivative control to the sensor 205 by generating a velocity term as the first integral of acceleration by using a derivative of the x-position of the measurement mass 309 within the sensor 205. The derivative controller 510 may be any number of conventional commercially available controllers suitable for providing derivative control to the sensor 205. In a preferred embodiment, the derivative controller 510 is a switched-capacitor circuit.

The proportional controller 515 preferably provides additional control to the sensor 205. In a preferred embodiment, the proportional controller 515 provides proportional control to the sensor 205 by generating a displacement term as a second integral of the acceleration force experienced by the sensor 205. The proportional controller 515 may be any number of conventional commercially available controllers suitable for providing proportional control to the sensor 205. In a preferred embodiment, the proportional controller 515 is a switched-capacitor circuit.

The summers 520 preferably receive the output streams from the integrators 505 and combine the streams into a single output data stream. In a preferred embodiment, the summers 520 receive the scaled output streams from the scaling devices 507 and combine them into a single output data stream. In a preferred embodiment, the output data streams from the summers 520 are sent to the next integrator 505. The summers 520 may be any number of conventional commercially available devices suitable for combining data streams from the integrators 505 into a single output data stream. In a preferred embodiment, the summers 520 are switched-capacitor circuits.

The summer 525 preferably receives the output streams from the scaling devices 507, the derivative controller 510, and the proportional controller 515 and combines the streams into a single output data stream. In a preferred embodiment, the output data stream from the summer 525 drives the comparator 530. In another preferred embodiment, the output from the summer 525 drives the buffer 535. The summer 525 may be any number of conventional commercially available devices suitable for combining data streams from the scaling devices 507, the derivative controller 510, and the proportional controller 515 into a single output data stream. In a preferred embodiment, the summer 525 is a switched-capacitor circuit.

The comparator 530 preferably provides a feedback signal to the front-end circuit 310 when the system 100 is operating in a normal sigma-delta operating mode. In a preferred embodiment, the output stream IMOD from the comparator 530 is a digital 1-bit representation of the output of the loop filter 315. In a preferred embodiment, the input into the loop filter 315 is the output Vx of the front-end circuit 310, which is representative of the position of the measurement mass 309 within the sensor 205. The position of the measurement mass 309 preferably varies as acceleration forces are applied to the sensor 205. The comparator 530 may be any number of conventional commercially available comparators. In a preferred embodiment, the comparator 530 is an analog circuit.

The buffer 535 preferably provides a feedback signal to the front-end circuit 310 during the start-up of the system 100. In a preferred embodiment, the output stream Vsum of the buffer 535 is a voltage representation of the acceleration experienced by the sensor 205. In a preferred embodiment, the input into the loop filter 315 is the output Vx of the front-end circuit 310, which is representative of the position of the measurement mass 309 within the sensor 205. The buffer 535 may include any number of conventional commercially available buffers. In a preferred embodiment, the buffer 535 is an analog circuit.

Figure 6:
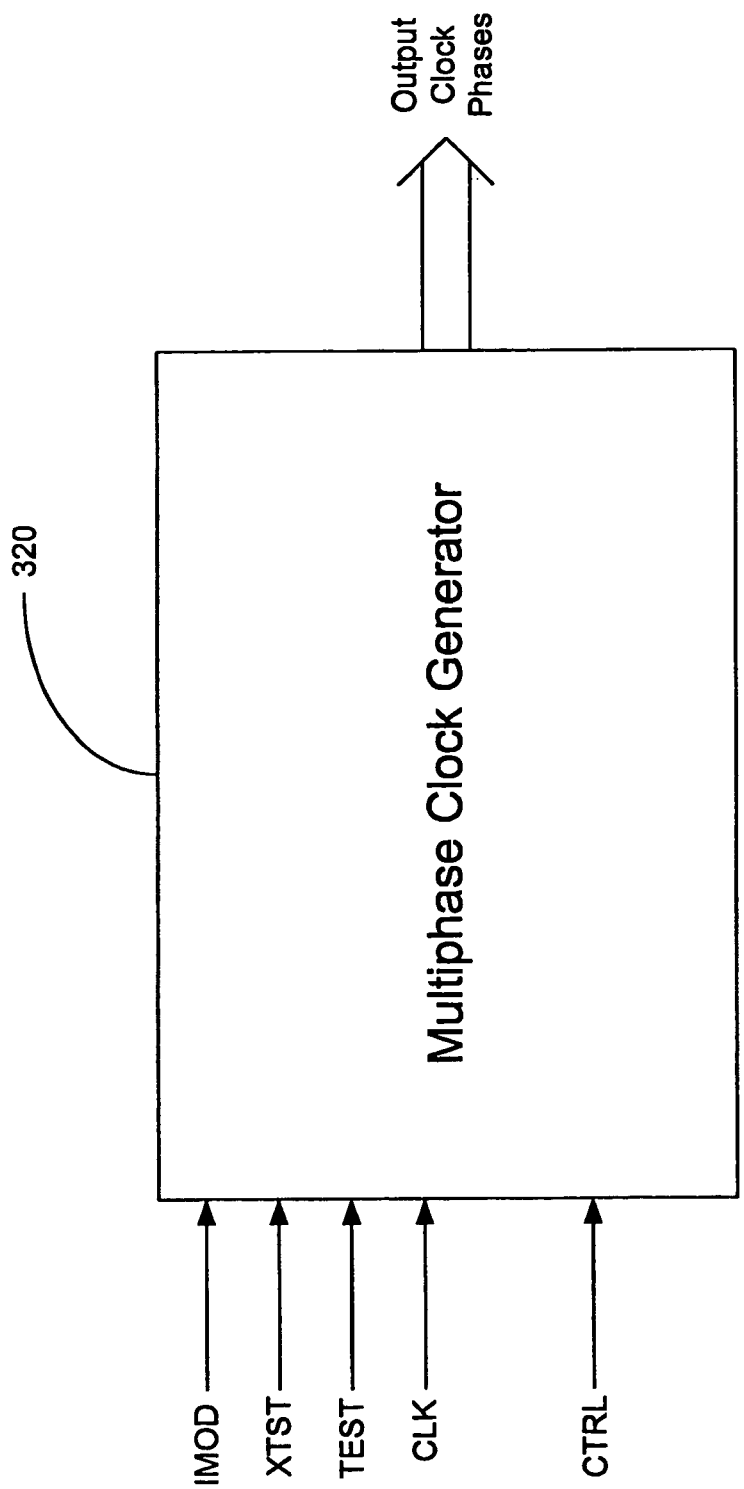
FIG. 6 illustrates an embodiment of the multiphase clock generator used in the controller of FIG. 3.

In a preferred embodiment, as illustrated in FIG. 6, the multiphase clock generator 320 is adapted to receive input data streams and convert the input streams to output clock signals used to control the switches in the front-end circuit 310 and the loop filter 315. The input streams received by the multiphase clock generator 320 may include, for example, the output stream IMOD from the loop filter 315, an external test signal XTST, a test stream TEST designed to combine with the output stream IMOD from the loop filter 315 if the value of the external test signal XTST is high, a master clock signal CLK, and a control signal CTRL for indicating the operating mode of the sensor 205. In a preferred embodiment, as illustrated in FIG. 3, the multiphase clock generator 320 is operably coupled to the front-end circuit 310, the loop filter 315, the startup sequencer 325, and the sensor simulator 330. The multiphase clock generator 320 may be any number of conventional commercially available clock generators suitable for controlling switches in the front-end circuit 310 and the loop filter 315. In a preferred embodiment, the multiphase clock generator 320 is a digital circuit.

Figure 7:
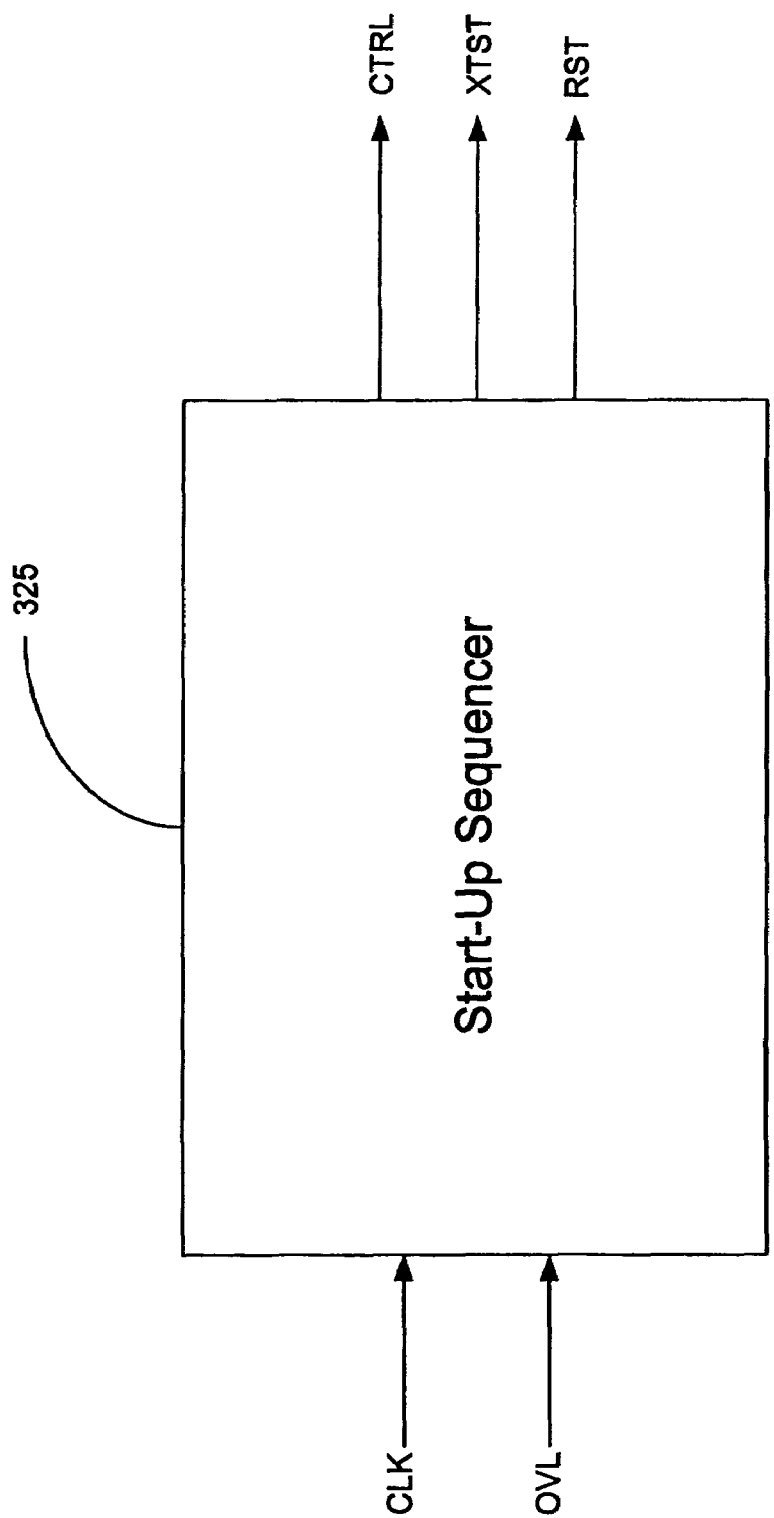
FIG. 7 illustrates an embodiment of the startup sequencer included within the controller of FIG. 3.

The startup sequencer 325 is preferably adapted to provide stability to the sensor 205 during the start-up of the system 100. The startup sequencer 325 is also preferably used to help the sensor 205 handle high-level inputs and recover from unexpected overloads. In a preferred embodiment, the startup sequencer 325 controls the different modes of operation used by the controller 206 for startup and calibration of the sensor 205. In a preferred embodiment, as illustrated in FIG. 3, the startup sequencer 325 is operably coupled to the loop filter 315, the multiphase clock generator 320, the sensor simulator 330, and the overload detection device 335. In a preferred embodiment, as illustrated in FIG. 7, the input streams into the startup sequencer 325 are the master clock signal CLK and an overload detection signal OVL. The output streams from the startup sequencer 325 are preferably the control signal CTRL for indicating the operating mode of the sensor 205, the digital signal XTST for indicating that the controller 206 should use an external test bitstream, and a reset signal RST for resetting the integrators 505 in the loop filter 315, the sense amplifier 405 in the front-end circuit 310, and the multiphase clock generator 320. The startup sequencer 325 may be any number of conventional commercially available circuits suitable for helping the sensor 205 handle high-level inputs and recover from unexpected overloads. In a preferred embodiment, the startup sequencer 325 is a digital circuit.

The sensor simulator 330 is preferably used to substantially duplicate the performance characteristics of the sensor 205 in order to test the operation of the controller 206. In a preferred embodiment, the sensor simulator 330 is operably coupled to the front-end circuit 310, the multiphase clock generator 320, and the startup sequencer 325. The sensor simulator 330 may be any number of devices suitable for duplicating the performance characteristics of the sensor 205 such as, for example, operational amplifiers, capacitors, switches, resistors, or transistors.

Figure 8:
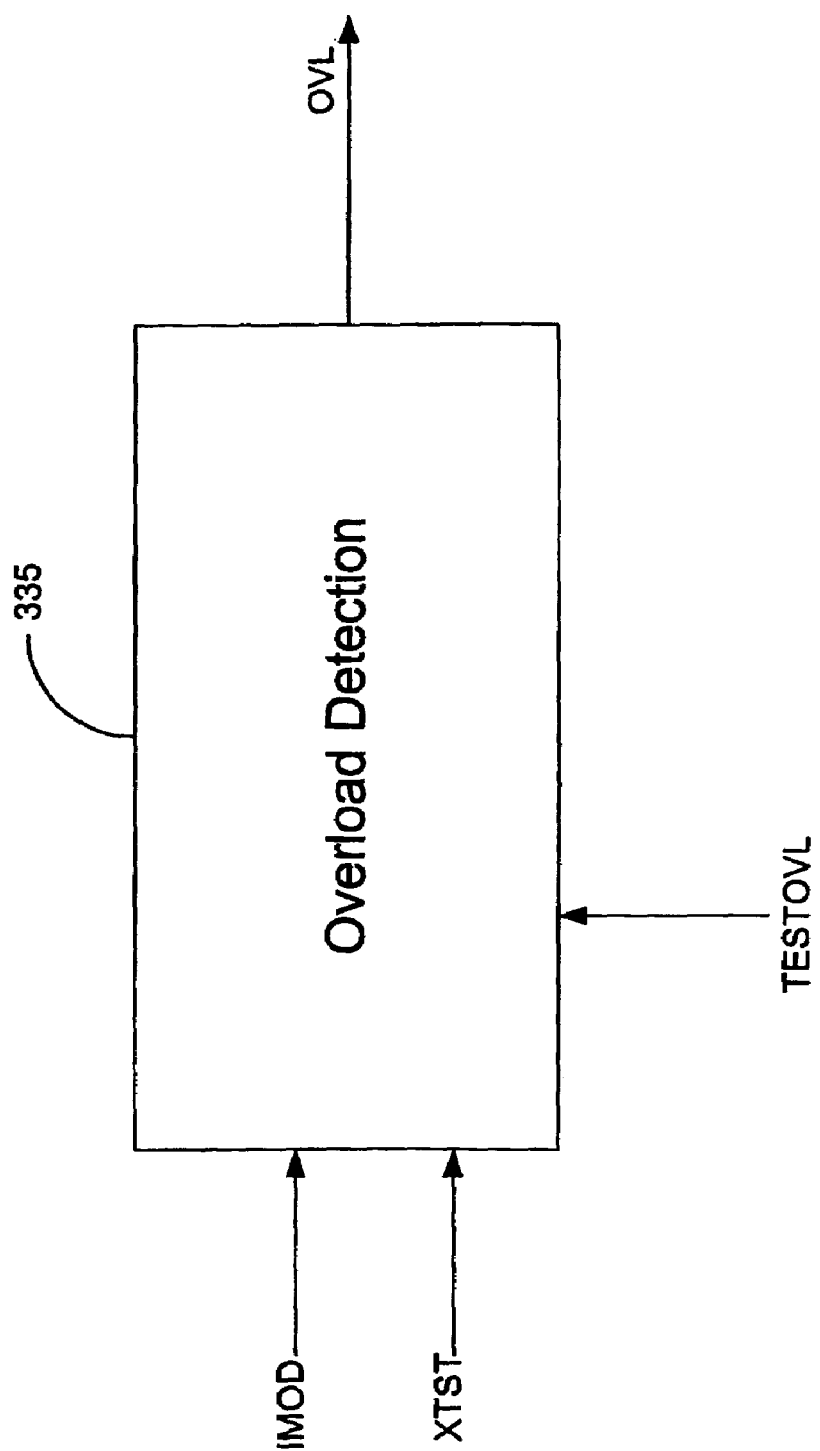
FIG. 8 illustrates an embodiment of the overload detection device used in the controller of FIG. 3.

The overload detection device 335 preferably provides detection of high level inputs and system 100 overloads. In a preferred embodiment, as illustrated in FIG. 3, the overload detection device 335 is operably coupled to the loop filter 315 and the startup sequencer 325. As illustrated in FIG. 8, the input streams into the overload detection device 335 may include, for example, the output stream IMOD from the loop filter 315, the external test stream XTST, and a test overload signal TESTOVL. The output stream OVL from the overload detection device is preferably sent to the startup sequencer 325 when an overload in the system 100 has been detected. The overload detection device 335 may be any number of conventional commercially available devices suitable for providing overload detection for the controller 206. In a preferred embodiment, the overload detection device 335 is a digital counter circuit.

In a preferred embodiment, as illustrated in FIG. 2, the interface 207 couples the sensor 205 to the controller 206. The interface 207 may be any number of conventional commercially available interfaces suitable for coupling the sensor 205 and the controller 206 such as, for example, fiber optics or wireless telemetry. In a preferred embodiment, as illustrated in FIG. 4, the interface 207 includes electrical cables extending from the conductive plates 305, 306, 307, and 308 positioned within the sensor 205.

Figure 9:
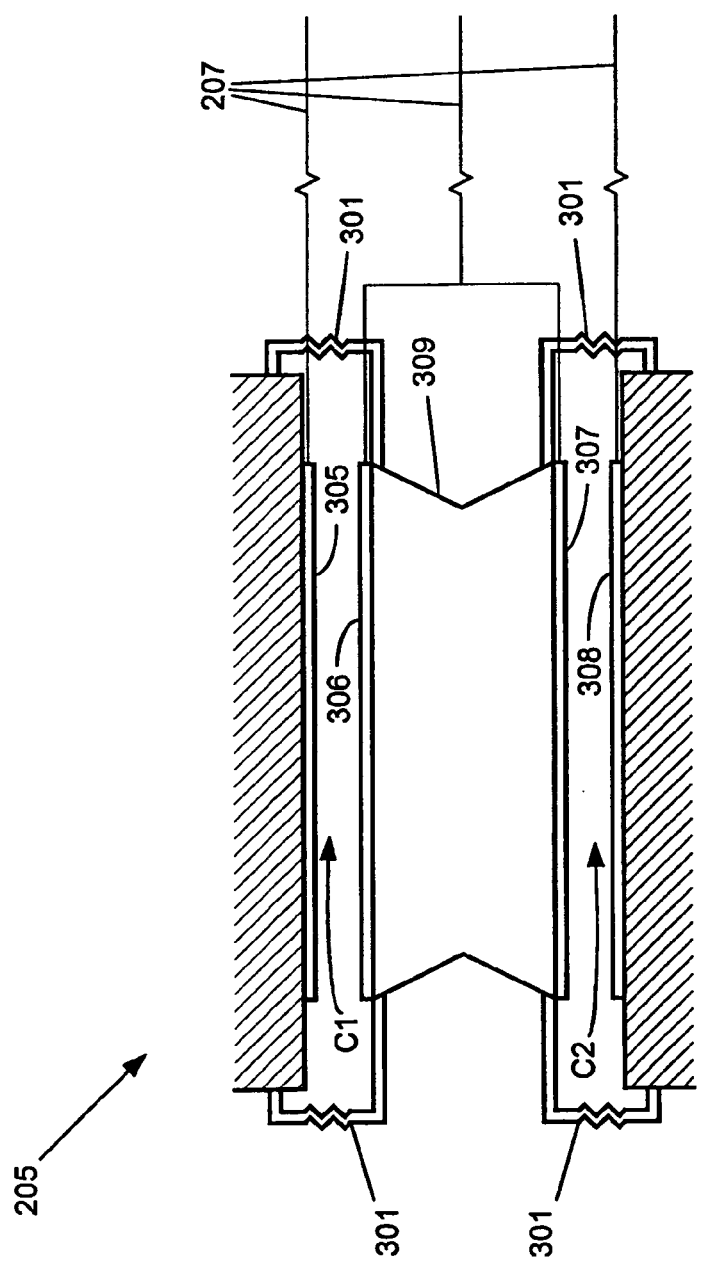
FIG. 9 illustrates an embodiment of the sensor used in the system of FIG. 1.

In a preferred embodiment, as illustrated in FIG. 9, the conductive plate 306 is positioned within the sensor 205 on a top surface of the measurement mass 309, substantially opposite the conductive plate 305. The conductive plates 305 and 306 preferably interact to form a variable capacitor C1 within the sensor 205. In a preferred embodiment, conductive plate 307 is positioned within the sensor 205 on a bottom surface of the measurement mass 309, substantially opposite the conductive plate 308. The conductive plates 307 and 308 preferably interact to form a variable capacitor C2 within the sensor 205.

Referring to FIGS. 4, 10, 11, 12, 13, 14, 15, 16, and 17, the operation of the measurement device 105 will now be described. In a preferred embodiment, the front-end circuit 310 interacts with the sensor 205 to place the sensor 205 in a variety of operating states. The different operating states into which the sensor 205 is placed preferably include (1) a DUMMY FORCE DOWN STATE, (2) a DUMMY FORCE UP STATE, (3) a FIRST MODULATOR FORCE UP STATE, (4) a SECOND MODULATOR FORCE UP STATE, (5) a FIRST MODULATOR FORCE DOWN STATE, (6) a SECOND MODULATOR FORCE DOWN STATE, (7) a RETURN-TO-ZERO STATE, (8) a GRAVITY CANCELLATION STATE, (9) a VOLTAGE EQUALIZATION STATE, (10) a SENSING (CHARGE SUMMATION) state 1, and (11) a SENSING state 2.

Figure 10:
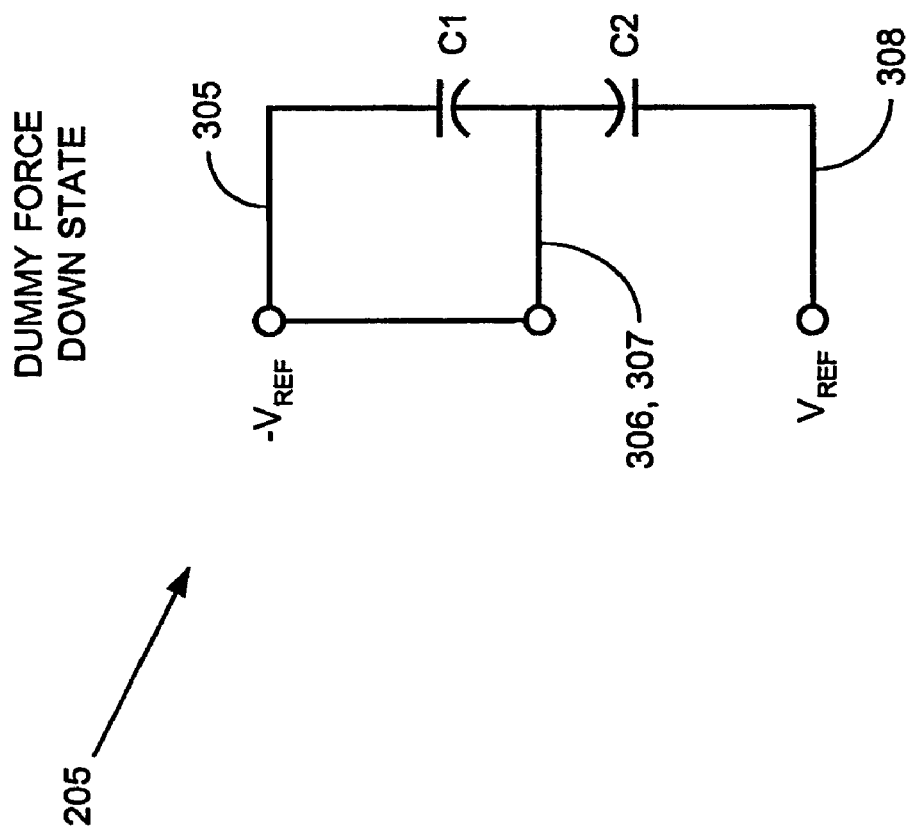
FIG. 10 illustrates an embodiment of the sensor of FIG. 9 operating in a DUMMY FORCE DOWN STATE.

In a preferred embodiment, as illustrated in FIGS. 4, 10 and 17, the controller 206 places the sensor 205 in the DUMMY FORCE DOWN STATE by applying a negative reference voltage $-V_{ref}$ to conductive plates 305, 306 and 307 and a positive reference voltage $+V_{ref}$ to conductive plate 308. The negative reference voltage $-V_{ref}$ is preferably applied to the conductive plates 305, 306, and 307 by turning on switches phd1 and phtc to connect the plates 305, 306, and 307 to the negative reference voltage $-V_{ref}$ source. The positive reference voltage $+V_{ref}$ is preferably applied to conductive plate 308 by tuning on switch phd2 to connect plate 308 to the positive reference voltage $+V_{ref}$ source.

The positive reference voltage $+V_{ref}$ on conductive plate 308 combined with the negative reference voltage $-V_{ref}$ on plate 307 on the measurement mass 309 preferably results in an electrostatic attraction between the measurement mass 309 and the conductive plate 308. The net effect of the attractive forces created within the sensor 205 is to apply an electrostatic force on the measurement mass 309. In a preferred embodiment, the electrostatic force applies a downward force to the measurement mass 309 during the DUMMY FORCE DOWN STATE.

Figure 11:
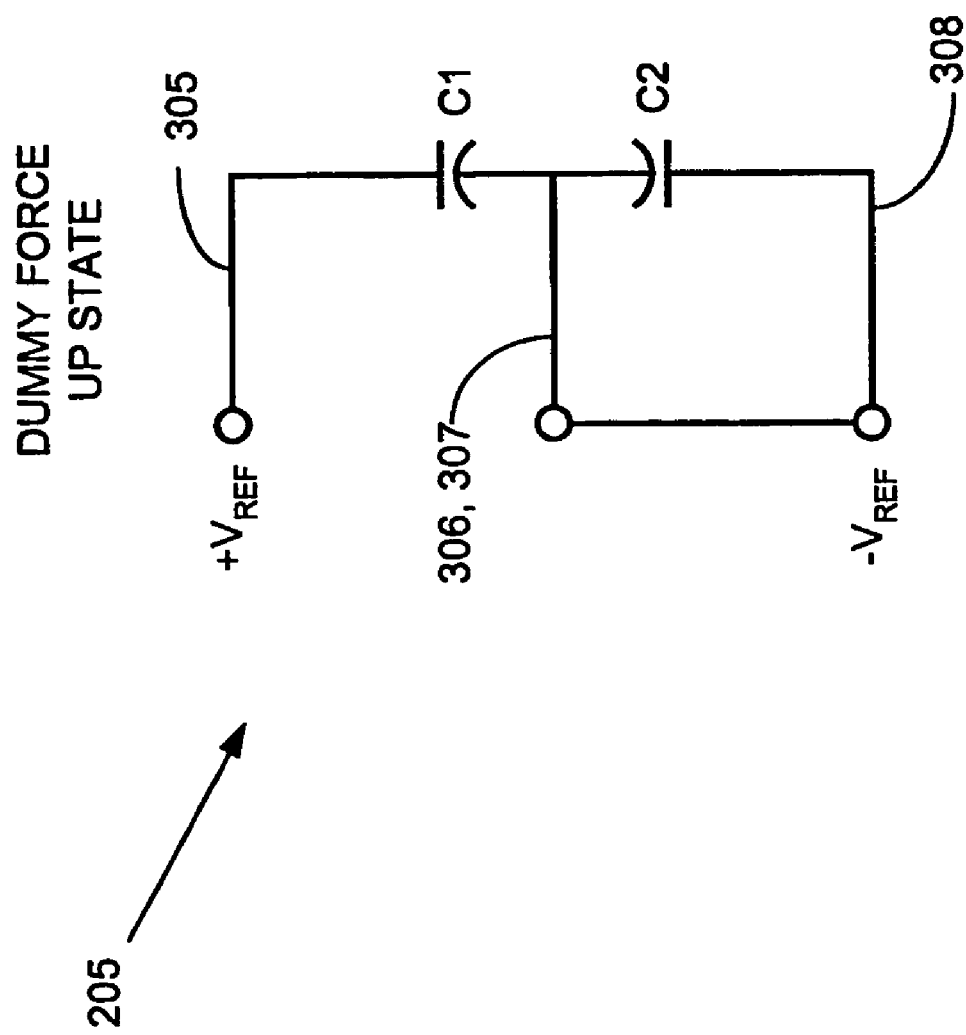
FIG. 11 illustrates an embodiment of the sensor of FIG. 9 operating in a DUMMY FORCE UP STATE.

In a preferred embodiment, as illustrated in FIGS. 4, 11 and 17, the controller 206 places the sensor 205 in the DUMMY FORCE UP STATE by applying a positive reference voltage $+V_{ref}$ to conductive plate 305 and a negative reference voltage $-V_{ref}$ to conductive plates 306, 307, and 308. The positive reference voltage $+V_{ref}$ is preferably applied to the conductive plate 305 by turning on switch phu1 to connect the plate 305 to the positive reference voltage $+V_{ref}$ source. The negative reference voltage $-V_{ref}$ is preferably applied to conductive plates 306, 307, and 308 by turning on switches phu2 and phbc to connect plates 306, 307, and 308 to the negative reference voltage $-V_{ref}$ source.

The positive reference voltage $+V_{ref}$ on conductive plate 305 combined with the negative reference voltage $-V_{ref}$ on plate 306 on the measurement mass 309 preferably results in an electrostatic attraction between the measurement mass 309 and the conductive plate 305. The net effect of the attractive forces created within the sensor 205 is to apply an electrostatic force on the measurement mass 309. In a preferred embodiment, the electrostatic force applies an upward force to the measurement mass 309 during the DUMMY FORCE UP STATE.

In a preferred embodiment, as illustrated in FIGS. 4, 12a, and 17, the controller 206 places the sensor 205 in the FIRST MODULATOR FORCE UP STATE during the normal sigma-delta operating mode by applying a positive reference voltage $+V_{ref}$ to conductive plate 305 and a negative reference voltage $-V_{ref}$ to conductive plates 306, 307, and 308. In a preferred embodiment, the controller 206 places the sensor 205 in the FIRST MODULATOR FORCE UP STATE when the output stream IMOD from the loop filter 315 has a negative value. The positive reference voltage $+V_{ref}$ is preferably applied to the conductive plate 305 by turning on switch phu1 to connect the plate 305 to the positive reference voltage $+V_{ref}$ source. The negative reference voltage $-V_{ref}$ is preferably applied to conductive plates 306, 307, and 308 by turning on switches phu2 and phbc to connect plates 306, 307, and 308 to the negative reference voltage $-V_{ref}$ source.

The positive reference voltage $+V_{ref}$ on conductive plate 305 combined with the negative reference voltage $-V_{ref}$ on plate 306 on the measurement mass 309 preferably results in an electrostatic attraction between the measurement mass 309 and the conductive plate 305. The net effect of the attractive forces created within the sensor 205 is to apply an electrostatic force on the measurement mass 309. In a preferred embodiment, the electrostatic force applies an upward force to the measurement mass 309 during the FIRST MODULATOR FORCE UP STATE.

In another preferred embodiment, as illustrated in FIGS. 4, 12b, and 17, the controller 206 places the sensor 205 in the SECOND MODULATOR FORCE UP STATE during system 100 start-up by applying a voltage $V_{DDA}$ to conductive plate 305, applying a voltage $V_{SSA}$ to conductive plate 308, and applying the output Vsum from the reduced-order loop filter 315 to plates 306 and 307 on the measurement mass 309. In a preferred embodiment, the controller 206 places the sensor 205 in the SECOND MODULATOR FORCE UP STATE when the output stream Vsum from the reduced-order loop filter 315 has a value of less than zero volts. The voltage $V_{DDA}$ is preferably applied to the conductive plate 305 by turning on switch phsu1 to connect the plate 305 to the voltage $V_{DDA}$ source. The voltage $V_{SSA}$ is preferably applied to conductive plate 308 by turning on switch phsu2 to connect plate 308 to the voltage $V_{SSA}$ source. The voltage Vsum is preferably applied to plates 306 and 307 by turning on switch phloop to connect plates 306 and 307 to the output Vsum from the reduced-order loop filter 315.

The voltage $V_{DDA}$ on conductive plate 305 combined with the voltage Vsum on the plate 306 on the measurement mass 309 preferably results in an electrostatic attraction between the measurement mass 309 and the conductive plate 305. The voltage $V_{SSA}$ on conductive plate 308 combined with the voltage Vsum on the plate 307 on the measurement mass 309 preferably results in an electrostatic attraction between the measurement mass 309 and the conductive plate 308. The net attractive forces may, for example, move the measurement mass 309 upwards or downwards. In a preferred embodiment, the net effect of the attractive forces created within the sensor 205 is to apply a net force upward on the measurement mass 309 during the SECOND MODULATOR FORCE UP STATE. The amount of upward force applied to the measurement mass 309 preferably depends on the level of the voltage Vsum (<0 V).

In a preferred embodiment, as illustrated in FIGS. 4, 12c and 17, the controller 206 places the sensor 205 in the FIRST MODULATOR FORCE DOWN STATE during normal sigma-delta operating mode by applying a negative reference voltage $-V_{ref}$ to conductive plate 305, 306 and 307 and a positive reference voltage $+V_{ref}$ to conductive plate 308. In a preferred embodiment, the controller 206 places the sensor 205 in the FIRST MODULATOR FORCE DOWN STATE when the output stream IMOD from the loop filter 315 has a positive value. The negative reference voltage $-V_{ref}$ is preferably applied to the conductive plates 305, 306, and 307 by turning on switches phd1 and phtc to connect the plates 305, 306, and 307 to the negative reference voltage $-V_{ref}$ source. The positive reference voltage $+V_{ref}$ is preferably applied to conductive plate 308 by turning on switch phd2 to connect plate 308 to the positive reference voltage $+V_{ref}$ source.

The positive reference voltage $+V_{ref}$ on conductive plate 308 combined with the negative reference voltage $-V_{ref}$ on plate 307 on the measurement mass 309 preferably results in an electrostatic attraction between the measurement mass 309 and the conductive plate 308. The net effect of the attractive forces created within the sensor 205 is to apply an electrostatic force on the measurement mass 309. In a preferred embodiment, the electrostatic force applies a downward force to the measurement mass 309 during the FIRST MODULATOR FORCE DOWN STATE.

In another preferred embodiment, as illustrated in FIGS. 4, 12d, and 17, the controller 206 places the sensor 205 in the SECOND MODULATOR FORCE DOWN STATE during system 100 start-up by applying a voltage $V_{DDA}$ to conductive plate 305, applying a voltage $V_{SSA}$ to conductive plate 308, and applying the output Vsum from the loop filter 315 to plates 306 and 307 on the measurement mass 309. In a preferred embodiment, the controller 206 places the sensor 205 in the SECOND MODULATOR FORCE DOWN STATE when the output stream Vsum from the reduced-order loop filter 315 has a value of greater than zero volts. The voltage $V_{DDA}$ is preferably applied to the conductive plate 305 by turning on switch phsu1 to connect the plate 305 to the voltage $V_{DDA}$ source. The voltage VS is preferably applied to conductive plate 308 by turning on switch phsu2 to connect plate 308 to the voltage $V_{SSA}$ source. The voltage Vsum is preferably applied to plates 306 and 307 by turning on switch phloop to connect plates 306 and 307 to the output Vsum of the reduced-order loop filter 315.

The voltage $V_{DDA}$ on conductive plate 305 combined with the voltage $V_{SUM}$ on plate 306 on the measurement mass 309 preferably results in an electrostatic attraction between the measurement mass 309 and the conductive plate 305. The voltage $V_{SSA}$ on conductive plate 308 combined with the voltage $V_{SUM}$ on plate 307 on the measurement mass 309 preferably results in an electrostatic attraction between the measurement mass 309 and the conductive plate 308. The net attractive forces may, for example, move the measurement mass 309 upwards or downwards. In a preferred embodiment, the net effect of the attractive forces created within the sensor 205 is to apply a net force downward on the measurement mass 309 during the SECOND MODULATOR FORCE DOWN STATE. The amount of downward force applied to the measurement mass 309 preferably depends on the level of the voltage Vsum (>0 V).

Figure 13:
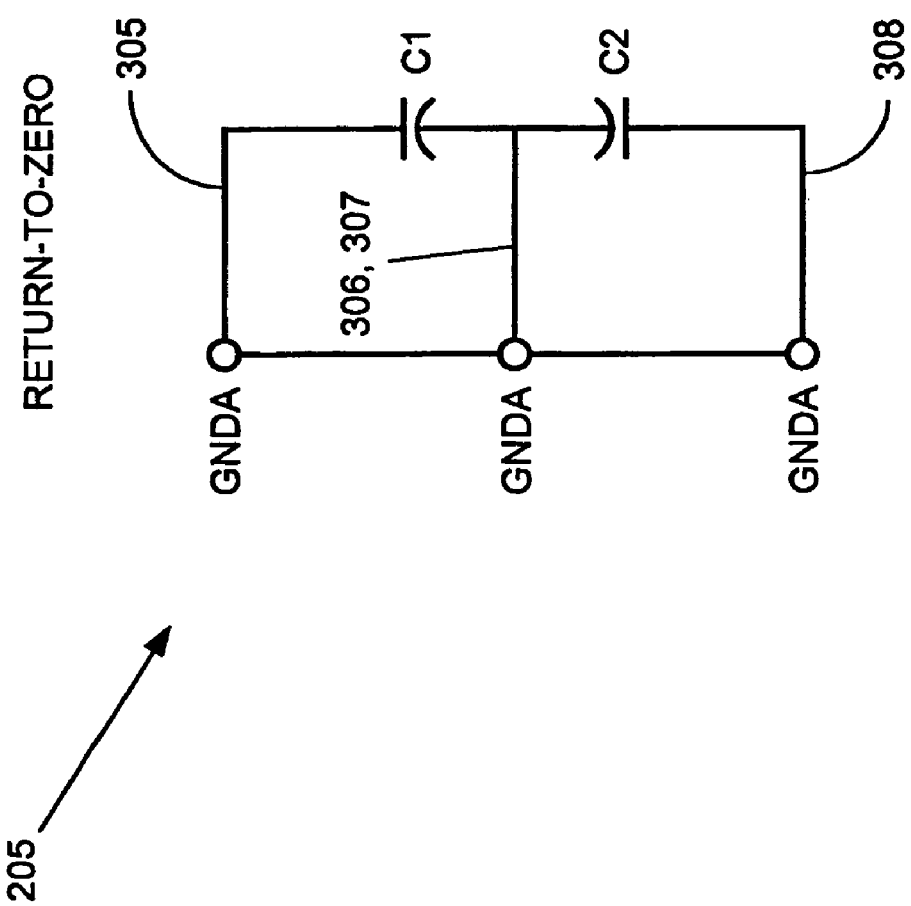
FIG. 13 illustrates an embodiment of the sensor of FIG. 9 operating in a RETURN-TO-ZERO STATE.

In a preferred embodiment, as illustrated in FIGS. 4, 13, and 17, the controller 206 places the sensor 205 in a RETURN-TO-ZERO STATE by grounding the conductive plates 305, 306, 307, and 308 to reduce signal dependent current draw from reference sources. In a preferred embodiment, the conductive plate 305 is grounded by turning on switch phg1 to connect the conductive plate 305 to a grounding source. In a preferred embodiment, conductive plates 306 and 307 are grounded by turning on switch phsg to connect the conductive plates 306 and 307 to a grounding source. In a preferred embodiment, the conductive plate 308 is grounded by turning on switch phg2 to connect the conductive plate 308 to a grounding source. In this configuration, the charges across capacitors C1 and C2 are preferably equal to zero. In a preferred embodiment, no net electrostatic force is applied to the measurement mass 309 in the RETURN-TO-ZERO STATE.

Figure 14:
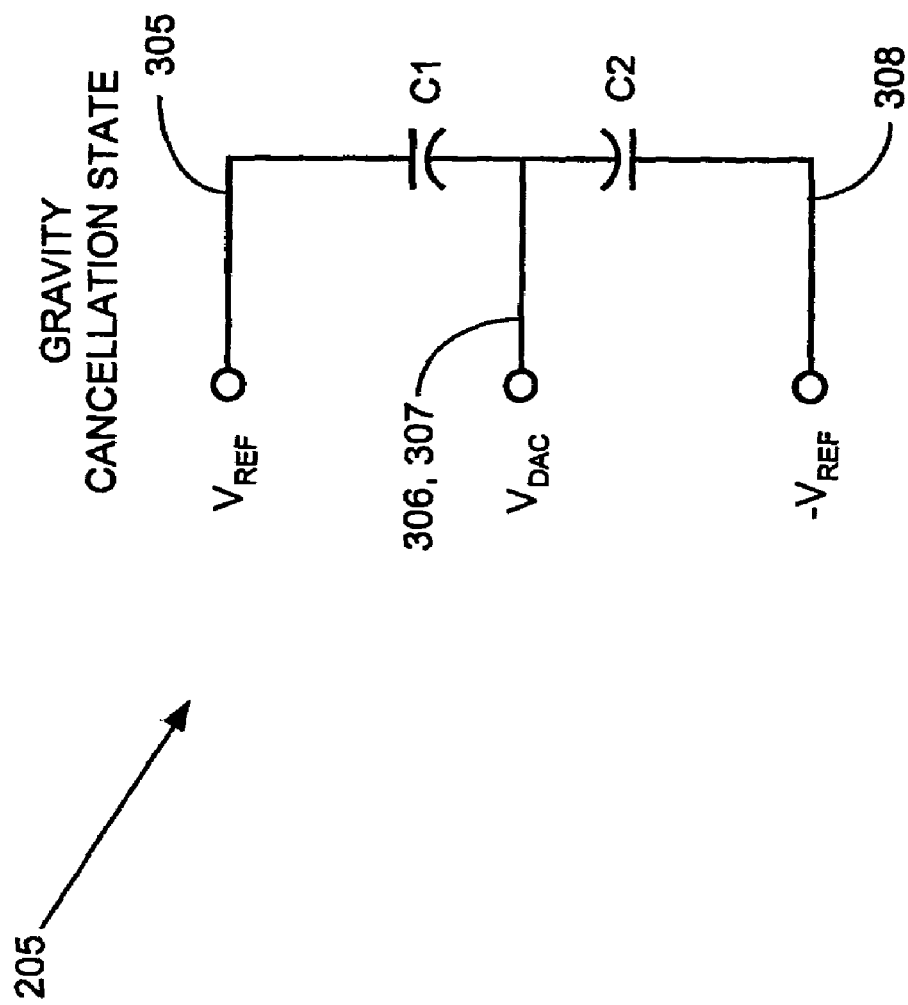
FIG. 14 illustrates an embodiment of the sensor of FIG. 9 operating in a GRAVITY CANCELLATION STATE.

In a preferred embodiment, as illustrated in FIGS. 4, 14, and 17, the controller 206 places the sensor 205 in the GRAVITY CANCELLATION STATE by applying a positive reference voltage $+V_{ref}$ to plate 305, applying a negative reference voltage $-V_{ref}$ to plate 308, and applying a voltage $V_{dac}$ or $V_{sum}$ on plates 306 and 307. The positive reference voltage $+V_{ref}$ is preferably applied to plate 305 by turning on switch phu1 to connect the conductive plate 305 to the positive reference voltage $+V_{ref}$ source. The negative reference voltage $-V_{ref}$ is preferably applied to the conductive plate 308 by turning on switch phu2 to connect the conductive plate 308 to the negative reference voltage $-V_{ref}$ source. The voltage $V_{dac}$ is preferably applied to the conductive plates 306 and 307 by turning on switch phf to connect the conductive plates 306 and 307 to a voltage $V_{dac}$ source. The voltage $V_{sum}$ is preferably applied to the conductive plates 306 and 307 by turning on switch phloop to connect the conductive plates 306 and 307 to a voltage $V_{sum}$ source.

The positive reference voltage $+V_{ref}$ on conductive plate 305 combined with the voltage $V_{dac}$ or $V_{sum}$ on the conductive plates 306 and 307 preferably results in an electrostatic attraction between the measurement mass 309 and the conductive plate 305. The negative reference voltage $-V_{ref}$ on the conductive plate 308 combined with the voltage $V_{dac}$ or $V_{sum}$ on the conductive plates 306 and 307 preferably results in an electrostatic attraction between the measurement mass 309 and the conductive plate 308. The net effect of the attractive forces created within the sensor 205 is to apply an electrostatic force on the measurement mass 309. The electrostatic force created by the attractive forces may, for example, move the measurement mass 309 upwards or downwards. In a preferred embodiment, the electrostatic force on the measurement mass 309 during the GRAVITY CANCELLATION STATE substantially cancels a 1-g static field experienced by the sensor 205.

Figure 15:
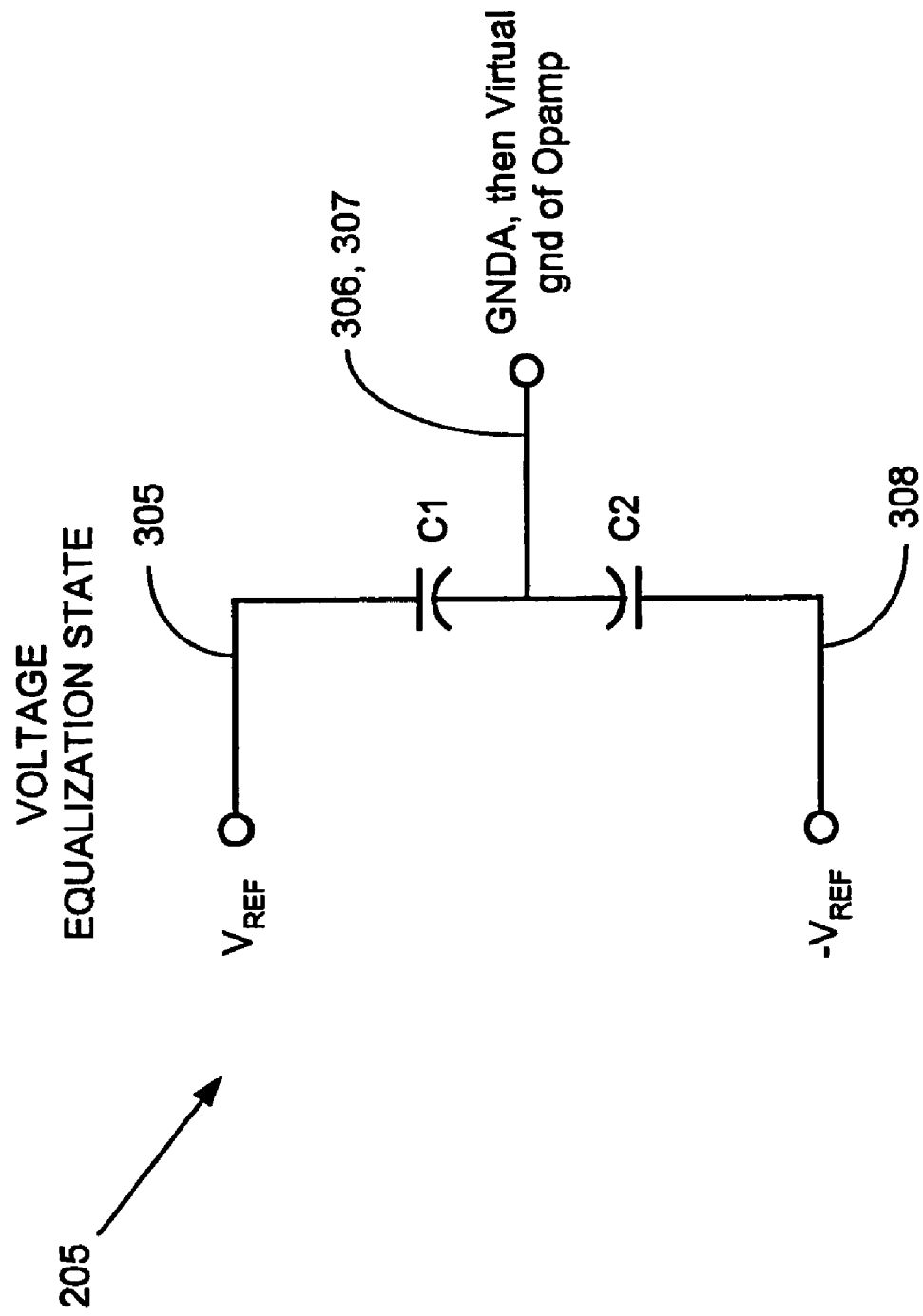
FIG. 15 illustrates an embodiment of the sensor of FIG. 9 operating in a VOLTAGE EQUALIZATION STATE.
Figure 18:
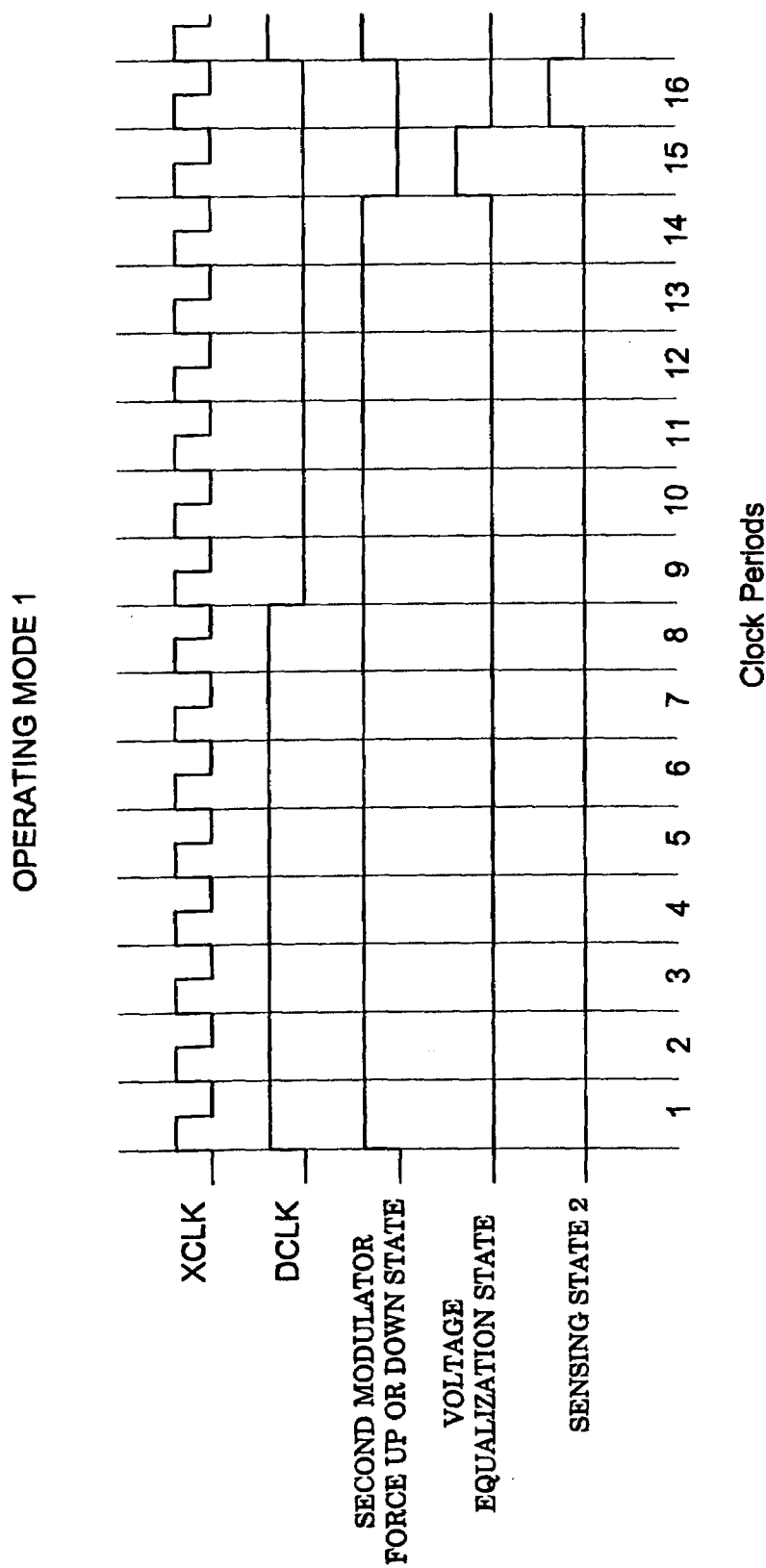
FIG. 18 is an embodiment of a clocking diagram of the sensor of FIG. 9 in OPERATING MODE 1.
Figure 19:
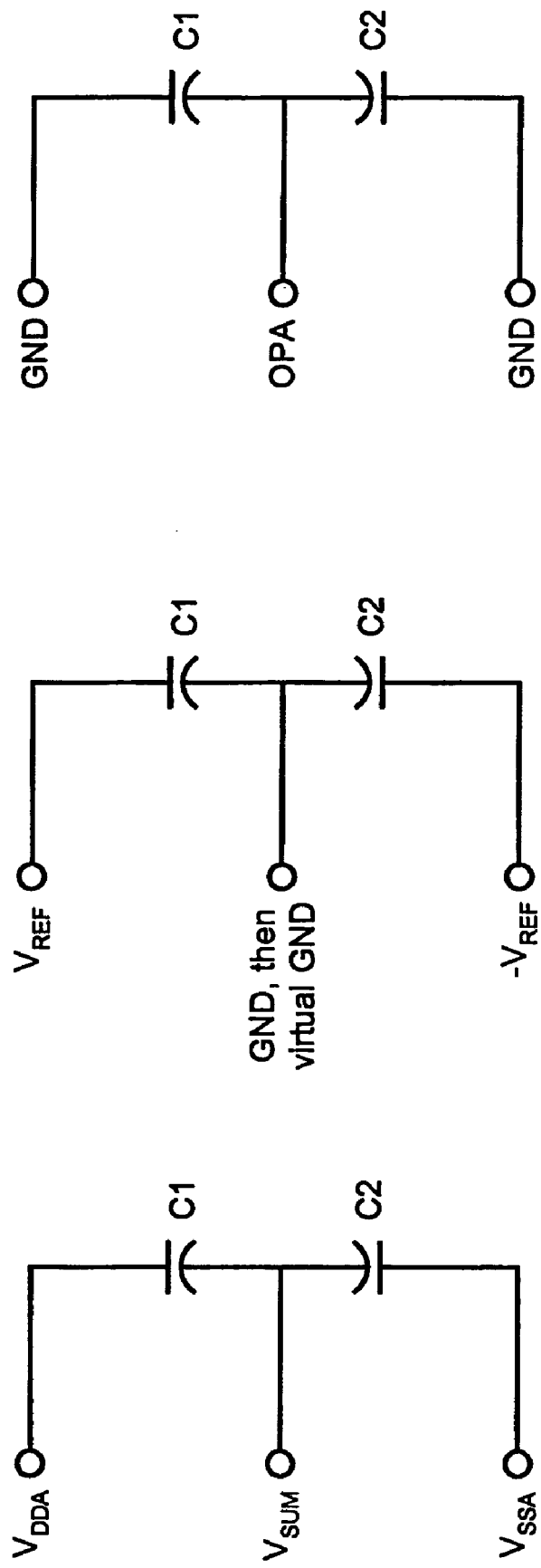
FIG. 19a illustrates an embodiment of the sensor of FIG. 9 operating in the SECOND MODULATOR FORCE UP STATE or the SECOND MODULATOR FORCE DOWN STATE during OPERATING MODE 1.
FIG. 19b illustrates an embodiment of the sensor of FIG. 9 operating in the VOLTAGE EQUALIZATION STATE during OPERATING MODE 1.
FIG. 19c illustrates an embodiment of the sensor of FIG. 9 operating in the SENSING state 2 during OPERATING MODE 1.

In a preferred embodiment, as illustrated in FIGS. 4, 15, and 17, the controller 206 places the sensor 205 in the VOLTAGE EQUALIZATION STATE by applying a positive reference voltage $+V_{ref}$ to the plate 305, applying a negative reference voltage $-V_{ref}$ to the plate 308, and by sequentially grounding the plates 306 and 307 to dissipate charges on the plates 306 and 307 and then connecting the plates 306 and 307 to the sense amplifier 405. The sense amplifier 405 input offset voltage is preferably stored for subsequent cancellation. The positive reference voltage $+V_{ref}$ is preferably applied to the plate 305 by turning on switch phu1 to connect the conductive plate 305 to the positive reference voltage $+V_{ref}$ source. The negative reference voltage $-V_{ref}$ is preferably applied to the conductive plate 308 by turning on switch phu2 to connect the conductive plate 308 to the negative reference voltage $-V_{ref}$ source. In a preferred embodiment, the conductive plates 306 and 307 are grounded by turning on switch phsg to connect the conductive plates 306 and 307 to a grounding source. In a preferred embodiment, the voltage equal to the offset of the sense amplifier is applied to the plates 306 and 307 by turning on switch phs to connect the conductive plates 306 and 307 to the sense amplifier 405.

In a preferred embodiment, the conductive plates 306 and 307 are initially grounded while the positive reference voltage $+V_{ref}$ is applied to plate 305 and the negative reference voltage $-V_{ref}$ is applied to the conductive plate 308. In a preferred embodiment, no electrostatic forces are applied to the sensor 205 and the charges across capacitors C1 and C2 are preferably substantially equal.

Next, the voltage equal to the offset of the sense amplifier 405 is applied to the plates 306 and 307 while the positive reference voltage $+V_{ref}$ is applied to plate 305 and the negative reference voltage $-V_{ref}$ is applied to the conductive plate 308. In this configuration, electrostatic forces are preferably applied to the sensor 205. The electrostatic forces alter the charges across capacitors C1 and C2. The magnitude of the variation in charges across capacitors C1 and C2 depends on the magnitude of the offset voltage of the sense amplifier 405.

In a preferred embodiment, as illustrated in FIGS. 4, 16a, and 17, the controller 206 places the sensor 205 in the SENSING state 1 (CHARGE SUMMATION STATE) by applying the negative reference voltage $-V_{ref}$ to the conductive plate 305, applying the positive reference voltage $+V_{ref}$ to the conductive plate 308, and connecting the sense amplifier 405 to the conductive plates 306 and 307. In a preferred embodiment, the controller 206 places the sensor 205 in the SENSING state 1 following the VOLTAGE EQUALIZATION STATE. During the SENSING state 1, the charge differential on capacitors C1 and C2 is measured to determine the position of the measurement mass 309 within the sensor 205. In a preferred embodiment, the negative reference voltage $-V_{ref}$ is applied to plate 305, the positive reference voltage $+V_{ref}$ is applied to plate 308, and the plates 306 and 307 are connected to the sense amplifier 405. The negative reference voltage $-V_{ref}$ is preferably applied to the plate 305 by turning on switch phd1 to connect the plate 305 to the negative reference voltage $-V_{ref}$ source. The positive reference voltage $+V_{ref}$ is preferably applied to the plate 308 by turning on switch phd2 to connect the plate 308 to the positive reference voltage $+V_{ref}$ source. The plates 306 and 307 are preferably connected to the sense amplifier by turning on switch phs to connect the plates 306 and 307 to the inverting terminal of the sense amplifier 405.

In a preferred embodiment, as illustrated in FIGS. 4, 16b, and 17, the controller 206 places the sensor 205 in the SENSING state 2 by grounding plates 305 and 308 while connecting plates 306 and 307 to inverting terminal of the sense amplifier 405. The controller 206 preferably grounds plate 305 by turning on switch phg1 to connect the plate 305 to the grounding source. The controller 206 preferably grounds plate 308 by turning on switch phg2 to connect the plate 308 to the grounding source. The controller 206 preferably connects plates 306 and 307 to the sense amplifier 405 by turning on switch phs.

The DUMMY FORCE DOWN STATE, the DUMMY FORCE UP STATE, the FIRST MODULATOR FORCE UP STATE, the SECOND MODULATOR FORCE UP STATE, the FIRST MODULATOR FORCE DOWN STATE, the SECOND MODULATOR FORCE DOWN STATE, the RETURN-TO-ZERO STATE, the GRAVITY CANCELLATION STATE, the VOLTAGE EQUALIZATION STATE, the SENSING state 1 and the SENSING state 2 may be used in any combination to create any number of operating modes for the sensor 205. Each operating mode is preferably implemented by setting up a forcing pattern during sixteen clock periods of a 2 MHZ dock. In a preferred embodiment, the sixteen clock periods of the 2 MHZ clock are broken down into thirty-two half-periods. In a preferred embodiment, the forcing pattern is repeated periodically at 128 kHz. In a preferred embodiment, the sensor 205 experiences four types of operating modes under the control of the controller 206: a measurement mass 309 setup operating mode (OPERATING MODE 1), a gravity cancellation operating mode (OPERATING MODE 2), a stray capacitance calibration operating mode (OPERATING MODE 3), and a sigma-delta operating mode (OPERATING MODE 4). The gravity cancellation mode (OPERATING MODE 2) and the stray capacitance calibration mode (OPERATING MODE 3) preferably work together to cancel the effects of gravity and stray capacitances on the sensor 205.

Referring to FIGS. 18, 19a, 19b, and 19c, the OPERATING MODE 1 will now be described. During the OPERATING MODE 1, the controller 206 preferably pulls the measurement mass 309 off stops within the sensor 205 and positions the measurement mass 309 so that capacitors C1 and C2 are substantially equal. The controller 206 may utilize any of the eleven generic operating states described above, and variations thereof, to create the OPERATING MODE 1. In a preferred embodiment, as illustrated in FIGS. 18, 19a, 19b, and 19c, the controller 206 places the sensor 205 in the MODULATOR FORCING STATE, the VOLTAGE EQUALIZATION STATE, and the SENSING STATE during the OPERATING MODE 1.

In a preferred embodiment, as illustrated in FIG. 19a, the controller 206 initially interacts with the sensor 205 to place the sensor 205 in one of the modulator forcing states. In this configuration, the system 100 is preferably operating in start-up mode, and the loop filter 315 is operating in reduced-order mode. Therefore, the controller 206 preferably places the sensor 205 in either the SECOND MODULATOR FORCE UP STATE or the SECOND MODULATOR FORCE DOWN STATE, depending on the value of the output Vsum of the reduced-order loop filter 315. The controller 206 may place the sensor 205 in the SECOND MODULATOR FORCE UP STATE or the SECOND MODULATOR FORCE DOWN STATE for any number of the sixteen clock periods within the operating cycle. In a preferred embodiment, the controller 206 places the sensor 205 in the SECOND MODULATOR FORCE UP STATE or the SECOND MODULATOR FORCE DOWN STATE for clock periods 1 through 14 of the OPERATING MODE 1.

Next, as illustrated in FIG. 19b, the controller 206 preferably places the sensor 205 in the VOLTAGE EQUALIZATION STATE. The controller 206 may place the sensor 205 in the VOLTAGE EQUALIZATION STATE for any number of the sixteen clock periods within the operating cycle. In a preferred embodiment, the controller 206 places the sensor 205 in the voltage equalization state during clock period 15 of the OPERATING MODE 1.

Finally, as illustrated in FIG. 19c, the controller 206 preferably completes the OPERATING MODE 1 by placing the sensor 205 in the SENSING state 2. The controller 206 may place the sensor 205 in the SENSING state 2 for any number of the sixteen clock periods within the operating cycle. In a preferred embodiment, the controller 206 places the sensor 205 in the SENSING state 2 during clock period 16 of the OPERATING MODE 1.

Referring to FIGS. 20, 21a, 21b, 21c, and 21d, the OPERATING MODE 2 will now be described. During the OPERATING MODE 2, the controller 206 preferably cancels the effects of gravitational forces on the sensor 205 and calibrates the voltage $V_{DAC}$ applied to plates 306 and 307 during normal sigma-delta mode so that the operating range of the sensor 205 is approximately +/−0.1 g. Also, during the OPERATING MODE 2, the voltage Vsum is digitized for use during the stray capacitance calibration of the OPERATING MODE 3. The controller 206 may utilize any of the eleven generic operating states, or variations thereof, to create the OPERATING MODE 2. In a preferred embodiment, as illustrated in FIGS. 20, 21a, 21b, 21c, and 21d, the controller 206 places the sensor 205 in the RETURN-TO-ZERO STATE, the GRAVITY CANCELLATION STATE, the VOLTAGE EQUALIZATION STATE, and the SENSING state 1 during the OPERATING MODE 2.

Figure 20:
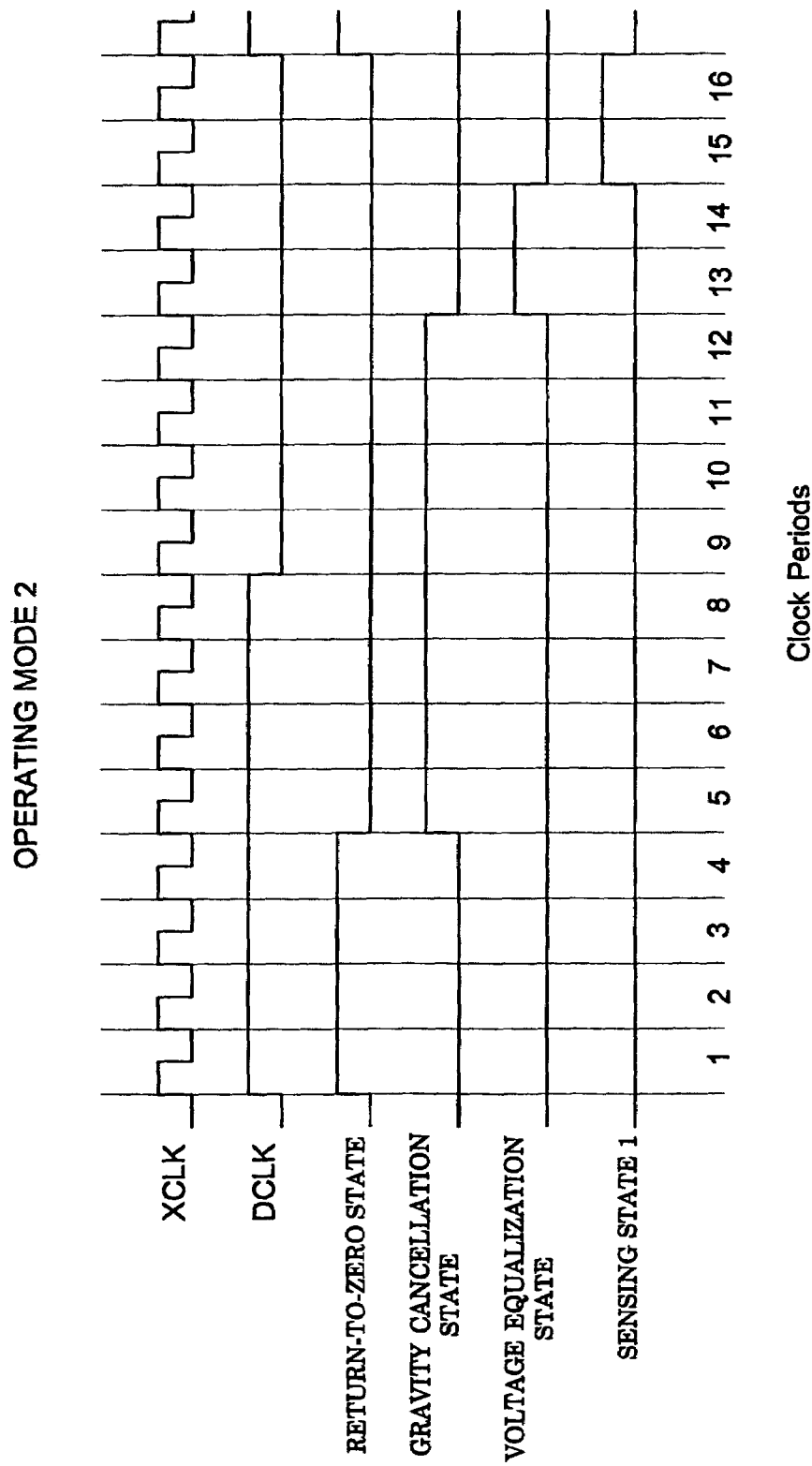
FIG. 20 is an embodiment of a clock diagram of the sensor of FIG. 9 in OPERATING MODE 2.
Figure 21:
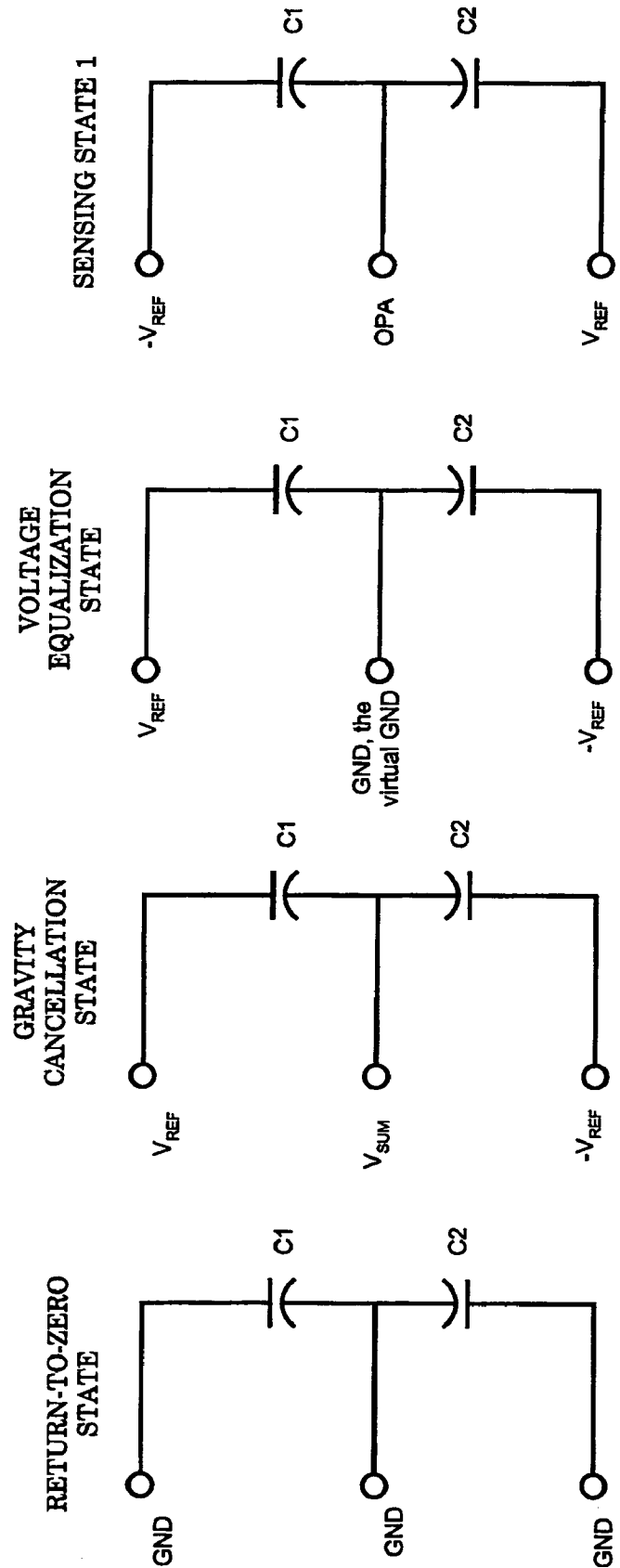
FIG. 21a illustrates an embodiment of the sensor of FIG. 9 operating in the RETURN-TO-ZERO STATE during OPERATING MODE 2.
FIG. 21b illustrates an embodiment of the sensor of FIG. 9 operating in the GRAVITY CANCELLATION STATE during OPERATING MODE 2.
FIG. 21c illustrates an embodiment of the sensor of FIG. 9 operating in the VOLTAGE EQUALIZATION STATE during OPERATING MODE 2.
FIG. 21d illustrates an embodiment of the sensor of FIG. 9 operating in the SENSING state 1 during OPERATING MODE 2.

In a preferred embodiment, as illustrated in FIGS. 20 and 21a, the controller 206 begins the OPERATING MODE 2 by placing the sensor 205 in the RETURN-TO-ZERO STATE to remove any charges from the conductive plates 305, 306, 307, and 308. The controller 206 may place the sensor 205 in the RETURN-TO-ZERO STATE for any number of the sixteen clock periods within the OPERATING MODE 2. In a preferred embodiment, the controller 206 places the sensor 205 in the RETURN-TO-ZERO STATE for clock periods 1 through 4 of the OPERATING MODE 2.

Next, as illustrated in FIGS. 20 and 21b, the controller 206 preferably places the sensor 205 in the GRAVITY CANCELLATION STATE to cancel the effects of the 1-g static field from within the sensor 205. The controller 206 may place the sensor 205 in the GRAVITY CANCELLATION STATE for any number of the sixteen clock periods within the OPERATING MODE 2. In a preferred embodiment, the controller 206 places the sensor 205 in the GRAVITY CANCELLATION STATE for the clock periods 5 through 12 of the OPERATING MODE 2.

Next, as illustrated in FIGS. 20 and 21c, the controller 206 preferably places the sensor 205 in the VOLTAGE EQUALIZATION STATE to equalize the voltage across capacitors C1 and C2 within the sensor 205. The controller 206 may place the sensor 205 in the VOLTAGE EQUALIZATION STATE for any number of the sixteen clock periods within the OPERATING MODE 2. In a preferred embodiment, the controller 206 places the sensor 205 in the VOLTAGE EQUALIZATION STATE for clock periods 13 and 14 of the OPERATING MODE 2.

Finally, as illustrated in FIGS. 20 and 21d, the controller 206 preferably places the sensor 205 in the SENSING state 1. The controller 206 may place the sensor 205 in the SENSING state 1 for any number of the sixteen clock periods within the OPERATING MODE 2. In a preferred embodiment, the controller 206 places the sensor 205 in the SENSING state 1 for clock periods 15 and 16 of the OPERATING MODE 2.

Referring to FIGS. 22, 23a, 23b, 24, 25a, 25b, 25c, 25d, and 25e, the OPERATING MODE 3 will now be described. In a preferred embodiment, the controller 206 cancels the effects of stray capacitances within the sensor 205 during the OPERATING MODE 3. In a preferred embodiment, the controller 206 utilizes the digitized voltage Vsum from the OPERATING MODE 2 during the stray capacitance calibration of the OPERATING MODE 3. In a preferred embodiment, the stray capacitance calibration is performed substantially as described in U.S. patent application Ser. No.

09/268,072, filed on Mar. 12, 1999, the disclosure of which is incorporated herein by reference.

Figure 22:
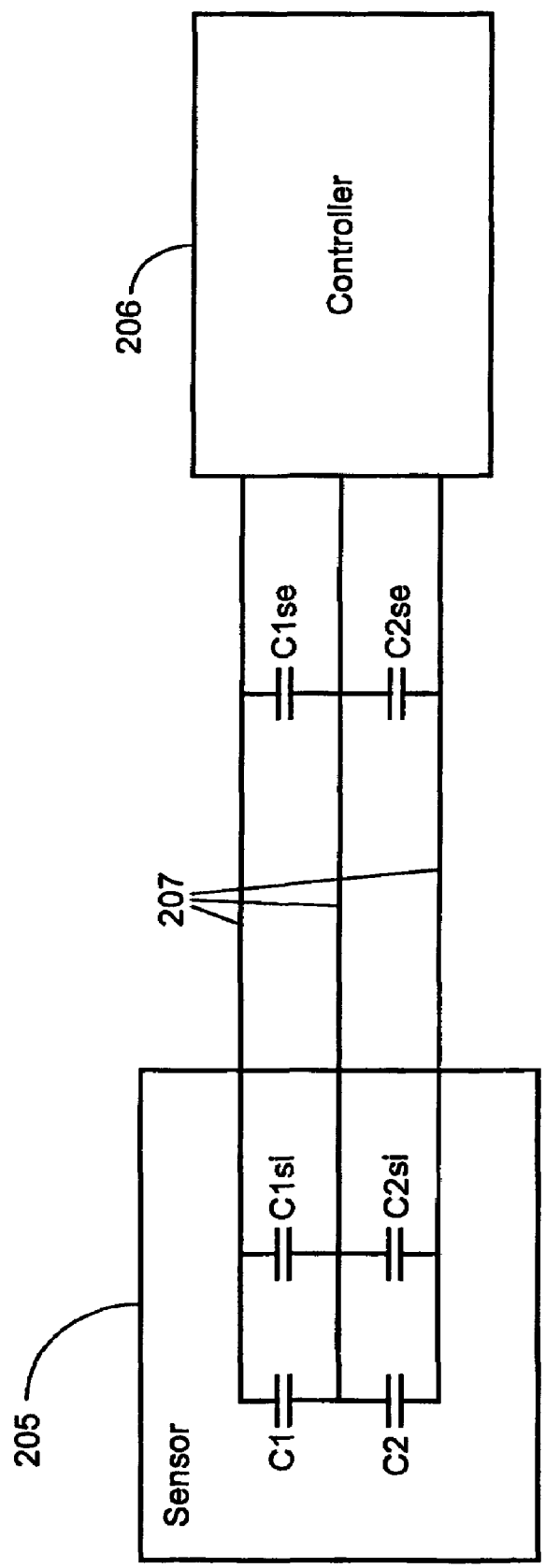
FIG. 22 illustrates an embodiment of the sensor of FIG. 9 including stray capacitances.

During the course of operation of the sensor 205, the performance of the sensor 205 may be affected, for example, by external factors known as stray capacitances. Stray capacitances may be caused by any number of sources, but two mechanisms typically responsible for the stray capacitances are process variations within or internal to the sensor 205 and the sensor 205 package, and external effects related to socketing PC board layout. As illustrated in FIG. 22, the external stray capacitances are lumped together and denoted as C1se and C2se, and the internal stray capacitances are lumped together and denoted as C1si and C2si.

Figure 23B:
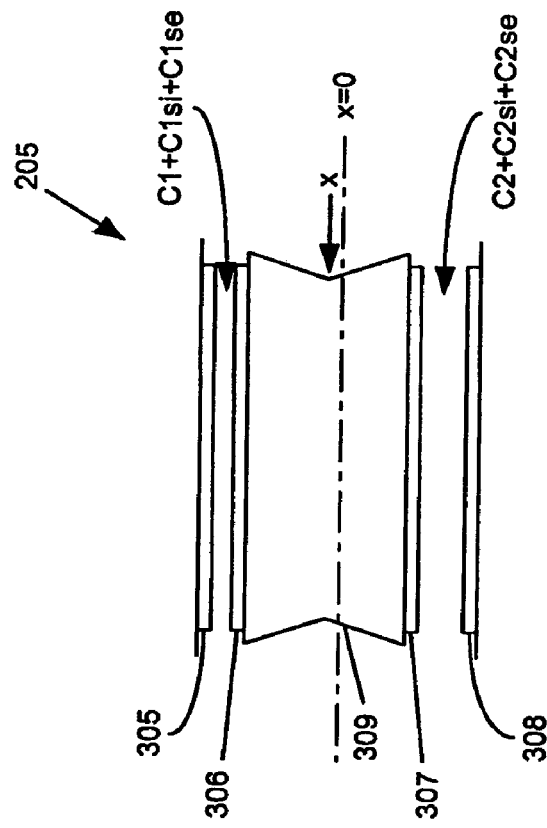
FIG. 23b illustrates an embodiment of the positioning of the measurement mass of FIG. 23a within the sensor of FIG. 9 containing stray capacitances.
Figure 23A:
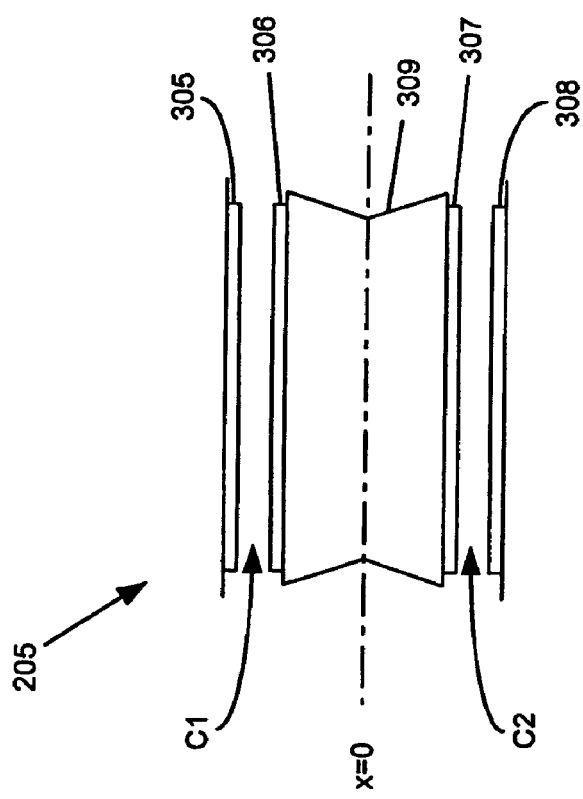
FIG. 23a illustrates an embodiment of the positioning of a measurement mass within the sensor of FIG. 9.

In a preferred embodiment, as illustrated in FIG. 23a, the measurement mass 309 is centered approximately at the mechanical center x=0 of the sensor 205 under normal operating conditions. Normal operating conditions occur when stray capacitances C1si, C1se, C2si, C2se are not present within the sensor 205, or when the stray capacitances C1si and C2se are approximately equally matched with stray capacitances C2si and C2se, canceling each other out. However, as illustrated in FIG. 23b, a mismatch in the stray capacitances C1si, C1se across plate 305 and the stray capacitances C2si, C2se across plate 308 may result in an offset in the position x of the measurement mass 309 away from the mechanical center x=0 of the sensor 205. An offset of the measurement mass 309 away from the mechanical center x=0 of the sensor 205 results in a degradation of sensor 205 performance.

During the OPERATING MODE 3, the controller 206 preferably utilizes the effects of the OPERATING MODE 2 to calibrate the voltage Vdac for 1-g cancellation and to cancel the effects of stray capacitances within the sensor 205. The controller 206 may utilize any of the eleven generic operating states described above, or variations thereof, to create the OPERATING MODE 3. In a preferred embodiment, the controller 206 places the sensor 205 in the DUMMY FORCE DOWN STATE, the DUMMY FORCE UP STATE, the GRAVITY CANCELLATION STATE, the VOLTAGE EQUALIZATION STATE, and the SENSING state 1 during the OPERATING MODE 3.

Figure 24:
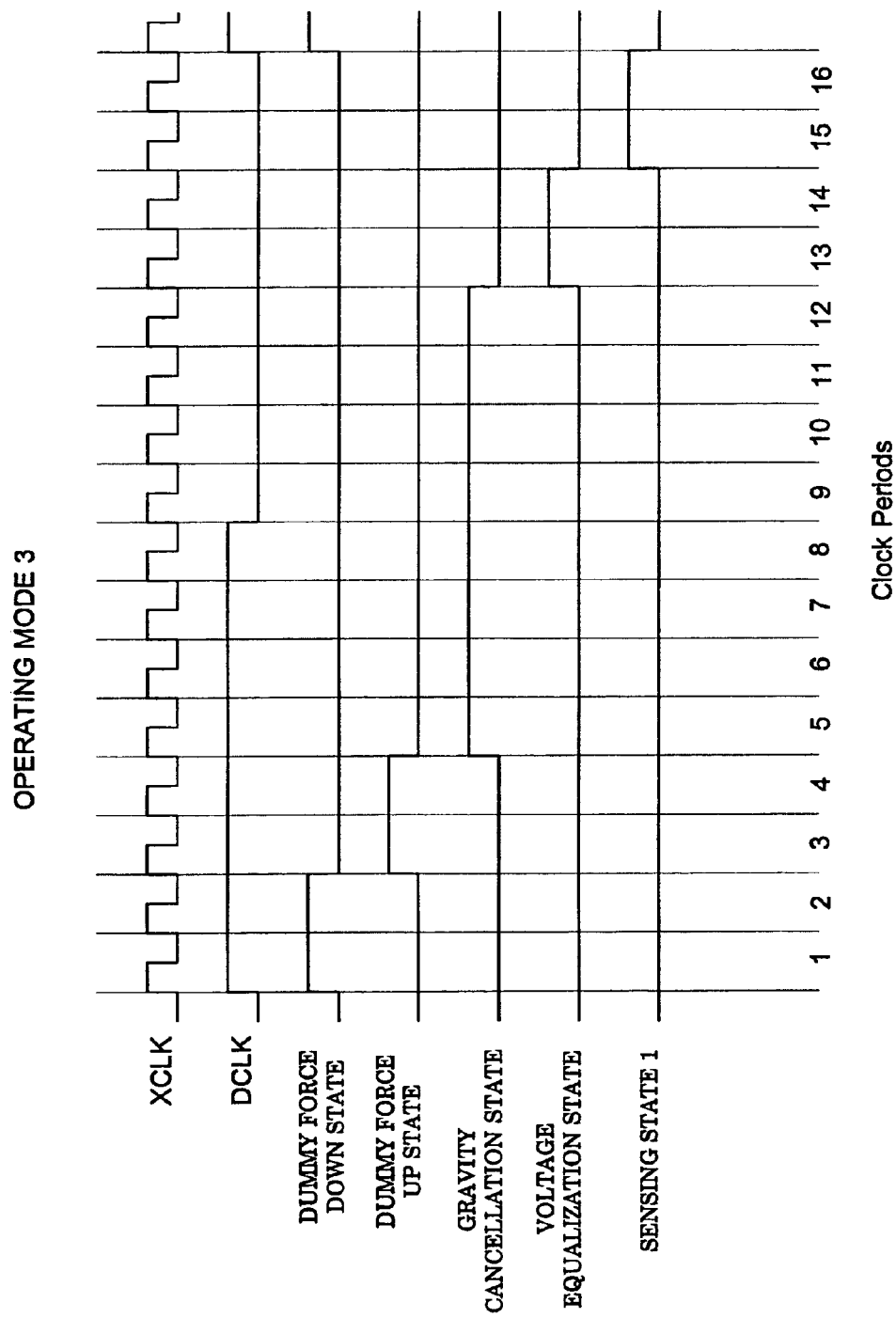
FIG. 24 is an embodiment of a clock diagram of the sensor of FIG. 9 in OPERATING MODE 3.
Figure 25:
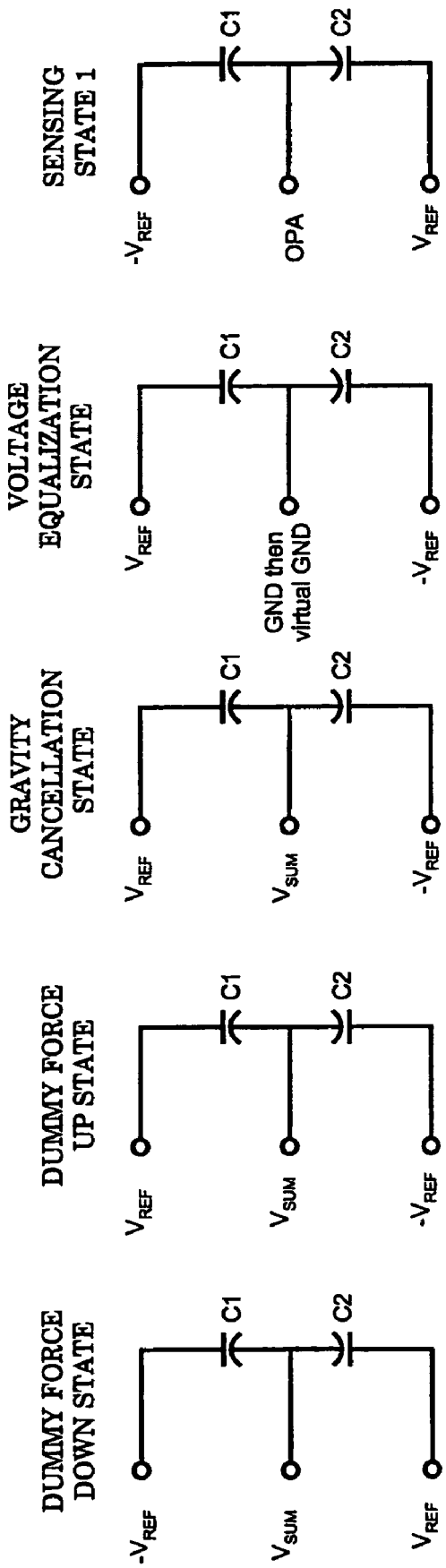
FIG. 25a illustrates an embodiment of the sensor of FIG. 9 operating in the DUMMY FORCE DOWN STATE during OPERATING MODE 3.
FIG. 25b illustrates an embodiment of the sensor of FIG. 9 operating in the DUMMY FORCE UP STATE during OPERATING MODE 3.
FIG. 25c illustrates an embodiment of the sensor of FIG. 9 operating in the GRAVITY CANCELLATION STATE during OPERATING MODE 3.
FIG. 25d illustrates an embodiment of the sensor of FIG. 9 operating in the VOLTAGE EQUALIZATION STATE during OPERATING MODE 3.
FIG. 25e illustrates an embodiment of the sensor of FIG. 9 operating in the SENSING state 1 during OPERATING MODE 3.

In a preferred embodiment, as illustrated in FIGS. 24 and 25a, the controller 206 begins the OPERATING MODE 3 by placing the sensor 205 in the DUMMY FORCE DOWN STATE to force the measurement mass 309 down away from plate 305 towards plate 308. The controller 206 may place the sensor 205 in the DUMMY FORCE DOWN STATE for any number of the sixteen clock periods within the OPERATING MODE 3. In a preferred embodiment, the controller 206 places the sensor 205 in the DUMMY FORCE DOWN STATE for clock periods 1 and 2 of the OPERATING MODE 3.

Next, as illustrated in FIGS. 24 and 25b, the controller 206 preferably places the sensor 205 in the DUMMY FORCE UP STATE to force the measurement mass 309 up away from plate 308 and towards plate 305. The controller 206 may place the sensor 205 in the DUMMY FORCE UP STATE for any number of the sixteen clock periods within the OPERATING MODE 3. In a preferred embodiment, the controller 206 places the sensor 205 in the DUMMY FORCE UP STATE for clock periods 3 and 4 of the OPERATING MODE 3.

Next, as illustrated in FIGS. 24 and 25c, the controller 206 preferably places the sensor 205 in the GRAVITY CANCELLATION STATE. The controller 206 may place the sensor 205 in the GRAVITY CANCELLATION STATE for any number of the sixteen clock periods within the OPERATING MODE 3. In a preferred embodiment, the controller 206 places the sensor 205 in the GRAVITY CANCELLATION STATE for clock periods 5 through 12 of the OPERATING MODE 3.

Next, as illustrated in FIGS. 24 and 25d, the controller 206 preferably places the sensor 205 in the VOLTAGE EQUALIZATION STATE. The controller 206 may place the sensor 205 in the VOLTAGE EQUALIZATION STATE for any number of the sixteen clock periods within the OPERATING MODE 3. In a preferred embodiment, the controller 206 places the sensor 205 in the VOLTAGE EQUALIZATION STATE for clock periods 13 and 14 of the OPERATING MODE 3.

Finally, as illustrated in FIGS. 24 and 25e, the controller 206 preferably completes the OPERATING MODE 3 by placing the sensor 205 in the SENSING state 1 to measure the differential charge on capacitors $C_1$ and $C_2$. During the SENSING state 1, the controller 206 preferably analyzes the differential charges to determine the position of the measurement mass 309 within the sensor 205. The differential charges across capacitors C1 and C2 may, for example, be equal or unequal. The controller 206 may place the sensor 205 in the SENSING state 1 for any number of the sixteen clock periods within the OPERATING MODE 3. In a preferred embodiment, the controller 206 places the sensor 205 in the SENSING state 1 for clock periods 15 and 16 of the OPERATING MODE 3.

Referring to FIGS. 26, 27, 28, 29, 30, 31, 32, and 33, the OPERATING MODE 4 will now be described. During the OPERATING MODE 4, the sensor 205 preferably operates in a sigma-delta operating mode. The controller 206 may alter the arrangement of the eleven generic operating states described above, or variations thereof, to create any number of different sigma-delta operating modes. In a preferred embodiment, the controller 206 utilizes eight different configurations to create sub-modes of the OPERATING MODE 4, including: (1) a long forcing mode with dummy forces in OPERATING MODE 4.1, (2) a long forcing mode with dummy forces and test bit interleaving in OPERATING MODE 4.2, (3) a short forcing mode with dummy forces in OPERATING MODE 4.3, (4) a long forcing mode with return-to-zero forces in OPERATING MODE 4.4, (5) a long forcing mode with return-to-zero forces and test bit interleaving in OPERATING MODE 4.5, (6) a short forcing mode with return-to-zero forces in OPERATING MODE 4.6, (7) a short forcing mode with return-to-zero forces and test bit interleaving in OPERATING MODE 4.7, and (8) a very long forcing mode with return-to-zero forces in OPERATING MODE 4.8.

Figure 26:
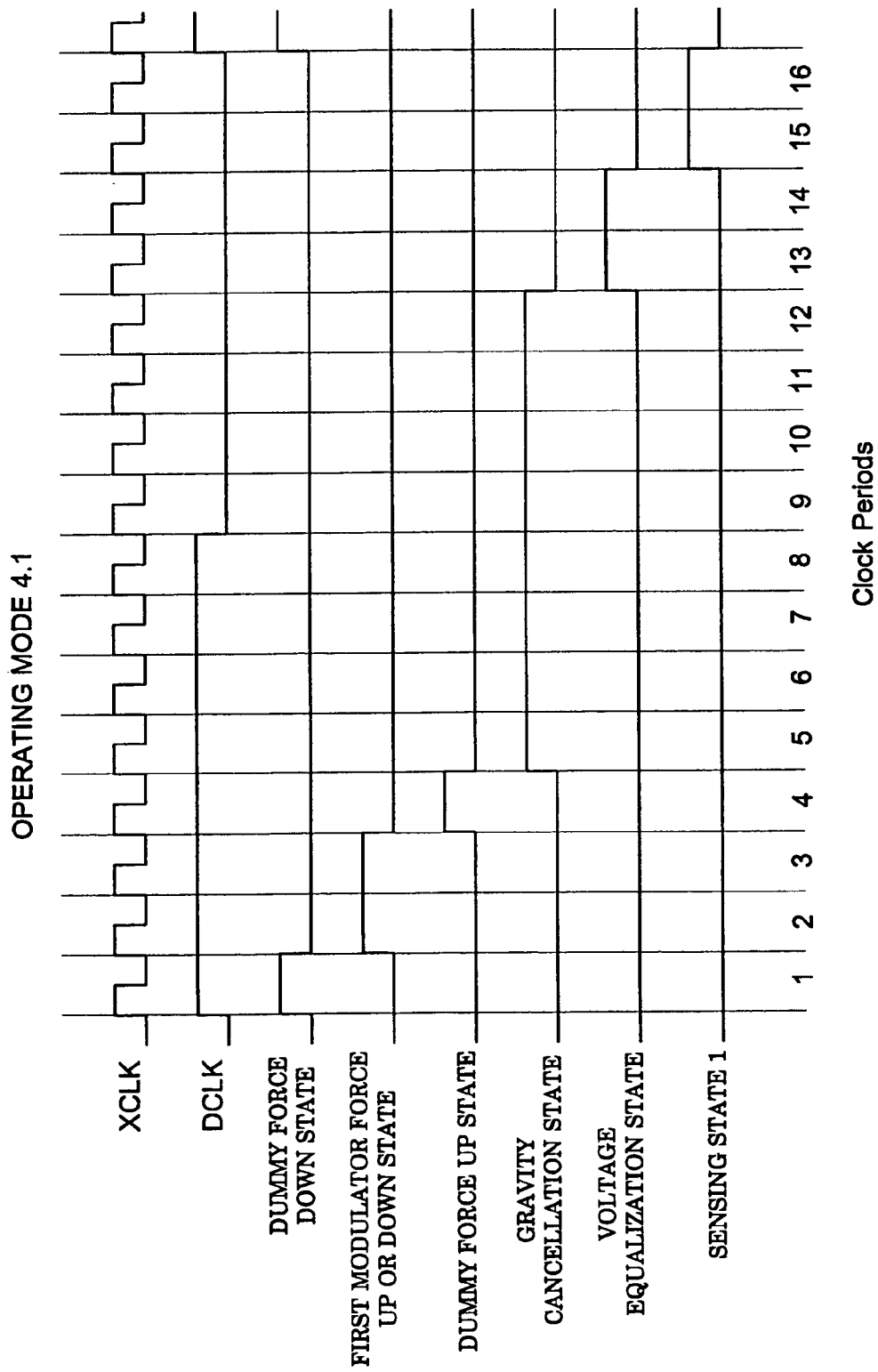
FIG. 26 illustrates an embodiment of a clocking diagram of the sensor of FIG. 9 during OPERATING MODE 4.1.

In a preferred embodiment, as illustrated in FIG. 26, the controller 206 utilizes a long forcing mode with dummy forces during the OPERATING MODE 4.1. The controller 206 may utilize any number of the eleven generic operating states described above, or variations thereof, to create the OPERATING MODE 4.1. In a preferred embodiment, the controller 206 utilizes the DUMMY FORCE DOWN STATE, the FIRST MODULATOR FORCE UP STATE or the FIRST MODULATOR FORCE DOWN STATE, the DUMMY FORCE UP STATE, the GRAVITY CANCELLATION STATE, the VOLTAGE EQUALIZATION STATE, and the SENSING state 1 to create the OPERATING MODE 4.1.

In a preferred embodiment, the controller 206 begins the OPERATING MODE 4.1 by placing the sensor 205 in the DUMMY FORCE DOWN STATE to force the measurement mass 309 down away from plate 305 towards plate 308. The controller 206 may place the sensor 205 in the DUMMY FORCE DOWN STATE for any number of the sixteen clock periods within the OPERATING MODE 4.1. In a preferred embodiment, in the OPERATING MODE 4.1, the controller 206 places the sensor 205 in the DUMMY FORCE DOWN STATE for clock period 1 of the OPERATING MODE 4.1.

Next, the controller 206 preferably places the sensor 205 in the FIRST MODULATOR FORCE UP STATE or the FIRST MODULATOR FORCE DOWN STATE to force the measurement mass 309 as a function of the position of the measurement mass 309 within the sensor 205. The controller 206 may place the sensor 205 in the FIRST MODULATOR FORCE UP STATE or the FIRST MODULATOR FORCE DOWN STATE for any number of the sixteen clock periods within the OPERATING MODE 4.1. In a preferred embodiment, in the OPERATING MODE 4.1, the controller 206 places the sensor 205 in the FIRST MODULATOR FORCE UP STATE or the FIRST MODULATOR FORCE DOWN STATE for clock periods 2 and 3 of the OPERATING MODE 4.1.

Next, the controller 206 preferably places the sensor 205 in the DUMMY FORCE UP STATE to force the measurement mass 309 up away from plate 308 towards plate 305. The controller 206 may place the sensor 205 in the DUMMY FORCE UP STATE for any number of the sixteen clock periods within the OPERATING MODE 4.1. In a preferred embodiment, the controller 206 places the sensor 205 in the DUMMY FORCE UP STATE for clock period 4 of the OPERATING MODE 4.1.

Next, the controller 206 preferably places the sensor 205 in the GRAVITY CANCELLATION STATE. The controller 206 may place the sensor 205 in the GRAVITY CANCELLATION STATE for any number of the sixteen clock periods within the OPERATING MODE 4.1. In a preferred embodiment, the controller 206 places the sensor 205 in the GRAVITY CANCELLATION STATE for clock periods 5 through 12 of the OPERATING MODE 4.1.

Next, the controller 206 preferably places the sensor 205 in the VOLTAGE EQUALIZATION STATE. The controller 206 may place the sensor 205 in the VOLTAGE EQUALIZATION STATE for any number of the sixteen clock periods within the OPERATING MODE 4.1. In a preferred embodiment, the controller 206 places the sensor 205 in the VOLTAGE EQUALIZATION STATE for clock periods 13 and 14 of the OPERATING MODE 4.1.

Finally, the controller 206 preferably places the sensor 205 in the SENSING state 1. The controller 206 may place the sensor 205 in the SENSING state 1 for any number of the sixteen clock periods within the OPERATING MODE 4.1. In a preferred embodiment, the controller 206 places the sensor 205 in the SENSING state 1 for clock periods 15 and 16 of the OPERATING MODE 4.1.

Figure 27:
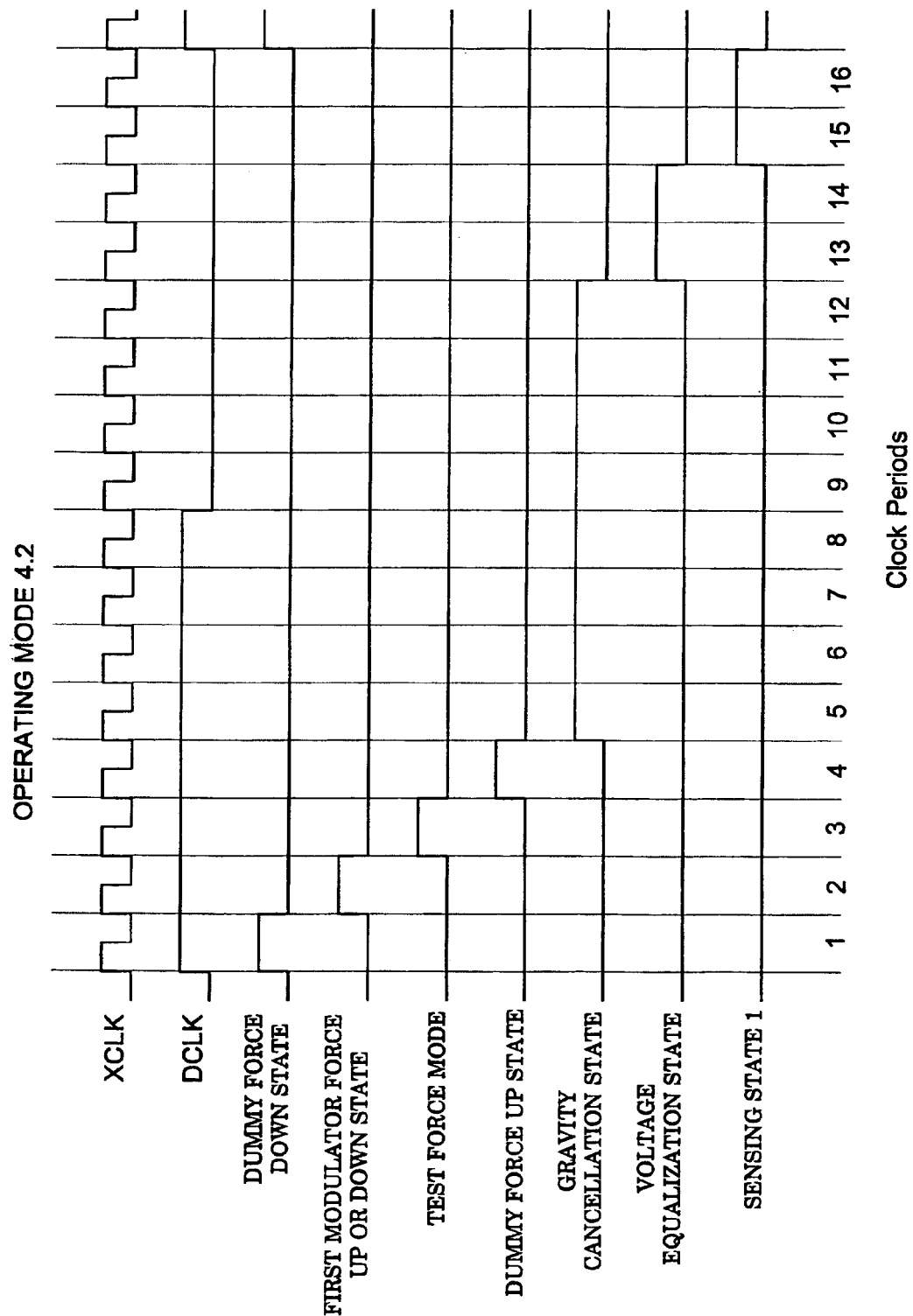
FIG. 27 illustrates an embodiment of a clocking diagram of the sensor of FIG. 9 during OPERATING MODE 4.2.

In another preferred embodiment, as illustrated in FIG. 27, the controller 206 utilizes a long forcing mode with dummy forces and test interleaving during the OPERATING MODE 4.2. The controller 206 may utilize any number of the eleven generic operating states described above, or variations thereof, to create the OPERATING MODE 4.2. In a preferred embodiment, the controller 206 utilizes the DUMMY FORCE DOWN STATE, the FIRST MODULATOR FORCE UP STATE or the FIRST MODULATOR FORCE DOWN STATE, a test force state, the DUMMY FORCE UP STATE, the GRAVITY CANCELLATION STATE, the VOLTAGE EQUALIZATION STATE, and the SENSING state 1 to create the OPERATING MODE 4.2.

In a preferred embodiment, the controller 206 begins the OPERATING MODE 4.2 by placing the sensor 205 in the DUMMY FORCE DOWN STATE to force the measurement mass 309 down away from plate 305 towards plate 308. The controller 206 may place the sensor 205 in the DUMMY FORCE DOWN STATE for any number of the sixteen clock periods within the OPERATING MODE 4.2. In a preferred embodiment, the controller 206 places the sensor 205 in the DUMMY FORCE DOWN STATE for clock period 1 of the OPERATING MODE 4.2.

Next, the controller 206 preferably places the sensor 205 in the FIRST MODULATOR FORCE UP STATE or the FIRST MODULATOR FORCE DOWN STATE to force the measurement mass 309 as a function of the position of the measurement mass 309 within the sensor 205. The controller 206 may place the sensor 205 in the FIRST MODULATOR FORCE UP STATE or the FIRST MODULATOR FORCE DOWN STATE for any number of the sixteen clock periods within the OPERATING MODE 4.2. In a preferred embodiment, the controller 206 places the sensor 205 in the FIRST MODULATOR FORCE UP STATE or the FIRST MODULATOR FORCE DOWN STATE for clock period 2 of the OPERATING MODE 4.2.

Next, the controller 206 preferably places the sensor 205 in a test forcing state. The controller 206 preferably creates the test state by interleaving a test bit input into the data stream in place of the FIRST MODULATOR FORCE UP STATE or the FIRST MODULATOR FORCE DOWN STATE, depending on the value of the output stream IMOD from the loop filter 315. In a preferred embodiment, the controller 206 interleaves the test bit stream substantially as described in U.S. Pat. No. 6,023,960, the disclosure of which is incorporated herein by reference. The controller 206 may place the sensor 205 in the test forcing state for any number of the sixteen clock periods within the OPERATING MODE 4.2. In a preferred embodiment, the controller 206 places the sensor 205 in the test forcing state for clock period 3 of the OPERATING MODE 4.2.

Next, the controller 206 preferably places the sensor 205 in the DUMMY FORCE UP STATE to force the measurement mass 309 up away from plate 308 towards plate 305. The controller 206 may place the sensor 205 in the DUMMY FORCE UP STATE for any number of the sixteen clock periods within the OPERATING MODE 4.2. In a preferred embodiment, the controller 206 places the sensor 205 in the DUMMY FORCE UP STATE for clock period 4 of the OPERATING MODE 4.2.

Next, the controller 206 preferably places the sensor 205 in the GRAVITY CANCELLATION STATE. The controller 206 may place the sensor 205 in the GRAVITY CANCELLATION STATE for any number of the sixteen clock periods within the OPERATING MODE 4.2. In a preferred embodiment, the controller 206 places the sensor 205 in the GRAVITY CANCELLATION STATE for clock periods 5 through 12 of the OPERATING MODE 4.2.

Next, the controller preferably places the sensor 205 in the VOLTAGE EQUALIZATION STATE. The controller 206 may place the sensor 205 in the VOLTAGE EQUALIZATION STATE for any number of the sixteen clock periods within the OPERATING MODE 4.2. In a preferred embodiment, the controller 206 places the sensor 205 in the VOLTAGE EQUALIZATION STATE for clock periods 13 and 14 of the OPERATING MODE 4.2.

Finally, the controller 206 preferably places the sensor 205 in the SENSING state 1. The controller 206 may place the sensor 205 in the SENSING state 1 for any number of the sixteen clock periods within the OPERATING MODE 4.2. In a preferred embodiment, the controller 206 places the sensor 205 in the SENSING state 1 for clock periods 15 and 16 of the OPERATING MODE 4.2.

Figure 28:
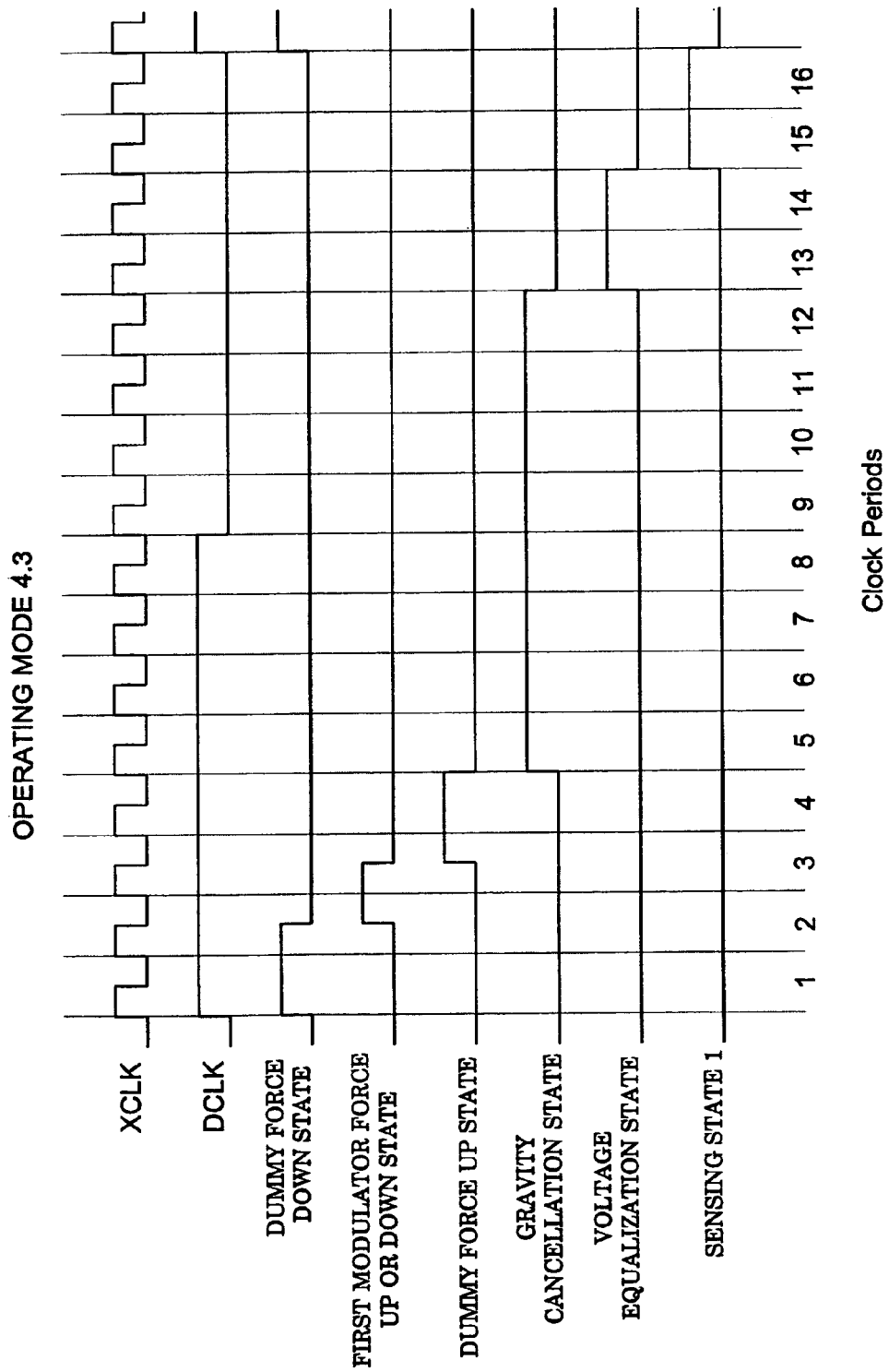
FIG. 28 illustrates an embodiment of a clocking diagram of the sensor of FIG. 9 during OPERATING MODE 4.3.

In another preferred embodiment, as illustrated in FIG. 28, the controller 206 utilizes a short forcing mode with dummy forces during the OPERATING MODE 4.3. The controller 206 may utilize any number of the eleven generic operating states described above, or variations thereof, to create the OPERATING MODE 4.3. In a preferred embodiment, the controller 206 utilizes the DUMMY FORCE DOWN STATE, the FIRST MODULATOR FORCE UP STATE or the FIRST MODULATOR FORCE DOWN STATE, the DUMMY FORCE UP STATE, the GRAVITY CANCELLATION STATE, the VOLTAGE EQUALIZATION STATE, and the SENSING state 1 to create the OPERATING MODE 4.3.

In a preferred embodiment, the controller 206 begins the OPERATING MODE 4.3 by placing the sensor 205 in the DUMMY FORCE DOWN STATE to force the measurement mass 309 down away from plate 305 towards plate 308. The controller 206 may place the sensor 205 in the DUMMY FORCE DOWN STATE for any number of the sixteen clock periods within the OPERATING MODE 4.3. In a preferred embodiment, the controller 206 places the sensor 205 in the DUMMY FORCE DOWN STATE for clock period 1 and the first half of clock period 2 of the OPERATING MODE 4.3.

Next, the controller 206 preferably places the sensor 205 in the FIRST MODULATOR FORCE UP STATE or the FIRST MODULATOR FORCE DOWN STATE to force the measurement mass 309 as a function of the position of the measurement mass 309 within the sensor 205. The controller 206 may place the sensor 205 in the FIRST MODULATOR FORCE UP STATE or the FIRST MODULATOR FORCE DOWN STATE for any number of the sixteen clock periods within the OPERATING MODE 4.3. In a preferred embodiment, the controller 206 places the sensor 205 in the FIRST MODULATOR FORCE UP STATE or the FIRST MODULATOR FORCE DOWN STATE for the second half of clock period 2 and the first half of clock period 3 within the OPERATING MODE 4.3.

Next, the controller 206 preferably places the sensor 205 in the DUMMY FORCE UP STATE to force the measurement mass 309 up away from plate 308 towards plate 305. The controller 206 may place the sensor 205 in the DUMMY FORCE UP STATE for any number of the sixteen clock periods within the OPERATING MODE 4.3. In a preferred embodiment, the controller 206 places the sensor 205 in the DUMMY FORCE UP STATE for the second half of clock period 3 and clock period 4 of the OPERATING MODE 4.3.

Next, the controller 206 preferably places the sensor 205 in the GRAVITY CANCELLATION STATE. The controller 206 may place the sensor 205 in the GRAVITY CANCELLATION STATE for any number of the sixteen clock periods within the OPERATING MODE 4.3. In a preferred embodiment, the controller 206 places the sensor 205 in the GRAVITY CANCELLATION STATE for clock periods 5 through 12 of the OPERATING MODE 4.3.

Next, the controller 206 preferably places the sensor 205 in the VOLTAGE EQUALIZATION STATE. The controller 206 may place the sensor 205 in the VOLTAGE EQUALIZATION STATE for any number of the sixteen clock periods within the OPERATING MODE 4.3. In a preferred embodiment, the controller 206 places the sensor 205 in the VOLTAGE EQUALIZATION STATE for clock periods 13 and 14 of the OPERATING MODE 4.3.

Finally, the controller 206 preferably places the sensor 205 in the SENSING state 1. The controller 206 may place the sensor 205 in the SENSING state 1 for any number of the sixteen clock periods within the OPERATING MODE 4.3. In a preferred embodiment, the controller 206 places the sensor 205 in the SENSING state 1 for clock periods 15 and 16 of the OPERATING MODE 4.3.

Figure 29:
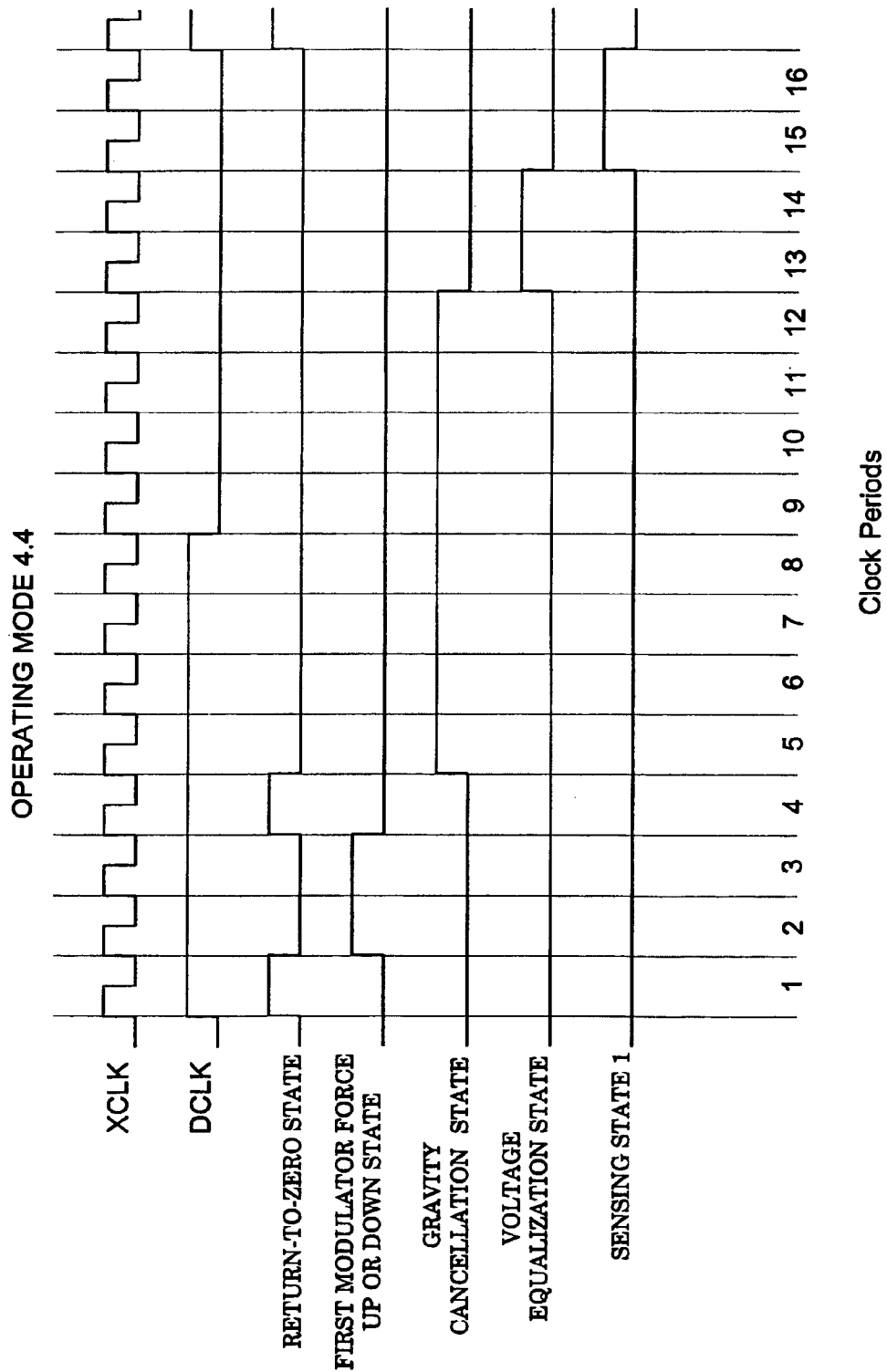
FIG. 29 illustrates an embodiment of a clocking diagram of the sensor of FIG. 9 during OPERATING MODE 4.4.

In another preferred embodiment, as illustrated in FIG. 29, the controller 206 utilizes a long forcing mode with return-to-zero forces during the OPERATING MODE 4.4. The controller 206 may utilize any number of the eleven generic operating states described above, or variations thereof, to create the OPERATING MODE 4.4. In a preferred embodiment, the controller 206 utilizes the RETURN-TO-ZERO STATE, the FIRST MODULATOR FORCE UP STATE or the FIRST MODULATOR FORCE DOWN STATE, the GRAVITY CANCELLATION STATE, the VOLTAGE EQUALIZATION STATE, and the SENSING state 1 to create the OPERATING MODE 4.4.

In a preferred embodiment, the controller 206 begins the OPERATING MODE 4.4 by placing the sensor 205 in the RETURN-TO-ZERO STATE to remove charges from the conductive plates 305, 306, 307, and 308. The controller 206 may place the sensor 205 in the RETURN-TO-ZERO STATE for any number of the sixteen clock periods within the OPERATING MODE 4.4. In a preferred embodiment, the controller 206 places the sensor 205 in the RETURN-TO-ZERO STATE for clock periods 1 and 4 of the OPERATING MODE 4.4.

Next, the controller 206 preferably places the sensor 205 in the FIRST MODULATOR FORCE UP STATE or the FIRST MODULATOR FORCE DOWN STATE to force the measurement mass 309 as a function of the position of the measurement mass 309 within the sensor 205. The controller 206 may place the sensor 205 in the FIRST MODULATOR FORCE UP STATE or the FIRST MODULATOR FORCE DOWN STATE for any number of the sixteen clock periods within the OPERATING MODE 4.4. In a preferred embodiment, the controller 206 places the sensor 205 in the FIRST MODULATOR FORCE UP STATE or the FIRST MODULATOR FORCE DOWN STATE for clock periods 2 and 3 of the OPERATING MODE 4.4.

Next, the controller 206 preferably places the sensor 205 in the GRAVITY CANCELLATION STATE. The controller 206 may place the sensor 205 in the GRAVITY CANCELLATION STATE for any number of the sixteen clock periods within the OPERATING MODE 4.4. In a preferred embodiment, the controller 206 places the sensor 205 in the GRAVITY CANCELLATION STATE for clock periods 5 through 12 of the OPERATING MODE 4.4.

Next, the controller 206 preferably places the sensor 205 in the VOLTAGE EQUALIZATION STATE. The controller 206 may place the sensor 205 in the VOLTAGE EQUALIZATION STATE for any number of the sixteen clock periods within the OPERATING MODE 4.4. In a preferred embodiment, the controller 206 places the sensor 205 in the VOLTAGE EQUALIZATION STATE for clock periods 13 and 14 of the OPERATING MODE 4.4.

Finally, the controller 206 preferably places the sensor 205 in the SENSING state 1. The controller 206 may place the sensor 205 in the SENSING state 1 for any number of the sixteen clock periods within the OPERATING MODE 4.4. In a preferred embodiment, the controller 206 places the sensor 205 in the SENSING state 1 for clock periods 15 and 16 of the OPERATING MODE 4.4.

Figure 30:
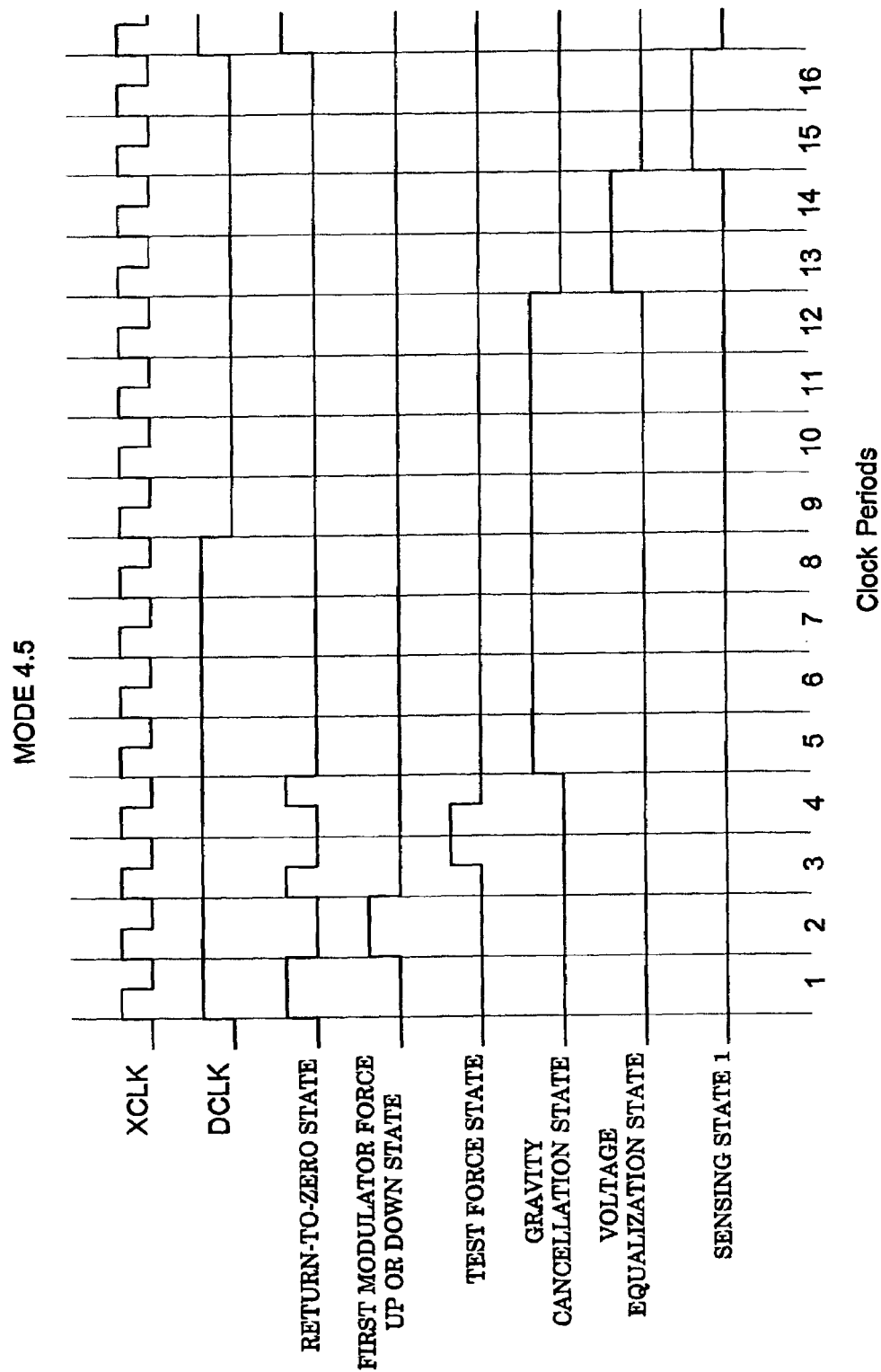
FIG. 30 illustrates an embodiment of a clocking diagram of the sensor of FIG. 9 during OPERATING MODE 4.5.

In a preferred embodiment, as illustrated in FIG. 30, the controller 206 utilizes a long forcing mode with return-to-zero forces and test bit interleaving during the OPERATING MODE 4.5. The controller 206 may utilize any number of the eleven generic operating states described above, or variations thereof, to create the OPERATING MODE 4.5. In a preferred embodiment, the controller 206 utilizes the RETURN-TO-ZERO STATE, the FIRST MODULATOR FORCE UP STATE or the FIRST MODULATOR FORCE DOWN STATE, the test forcing state, the GRAVITY CANCELLATION STATE, the VOLTAGE EQUALIZATION STATE, and the SENSING state 1 to create the OPERATING MODE 4.5.

In a preferred embodiment, the controller 206 begins the OPERATING MODE 4.5 by placing the sensor 205 in the RETURN-TO-ZERO STATE to remove charges from the conductive plates 305, 306, 307, and 308. The controller 206 may place the sensor 205 in the RETURN-TO-ZERO STATE for any number of the sixteen clock periods within the OPERATING MODE 4.5. In a preferred embodiment, the controller 206 places the sensor 205 in the RETURN-TO-ZERO STATE for clock period 1, the first half of clock period 3, and the second half of clock period 4 of the OPERATING MODE 4.5.

Next, the controller 206 preferably places the sensor 205 in the FIRST MODULATOR FORCE UP STATE or the FIRST MODULATOR FORCE DOWN STATE to force the measurement mass 309 as a function of the position of the measurement mass 309 within the sensor 205. The controller 206 may place the sensor 205 in the FIRST MODULATOR FORCE UP STATE or the FIRST MODULATOR FORCE DOWN STATE for any number of the sixteen clock periods within the OPERATING MODE 4.5. In a preferred embodiment, the controller 206 places the sensor 205 in the FIRST MODULATOR FORCE UP STATE or the FIRST MODULATOR FORCE DOWN STATE for clock period 2 of the OPERATING MODE 4.5.

Next, the controller 206 preferably places the sensor 205 in the test forcing state. The controller 206 preferably creates the test state by interleaving a test bit input into the data stream in place of the FIRST MODULATOR FORCE UP STATE or the FIRST MODULATOR FORCE DOWN STATE, depending on the value of the output stream IMOD from the loop filter 315. In a preferred embodiment, the controller 206 interleaves the test bit stream substantially as described in U.S. Pat. No. 6,023,960, the disclosure of which is incorporated herein by reference. The controller 206 may place the sensor 205 in the test forcing state for any number of the sixteen clock periods within the OPERATING MODE 4.5. In a preferred embodiment, the controller 206 places the sensor 205 in the test forcing state for the second half of clock period 3 and the first half of clock period 4 of the OPERATING MODE 4.5.

Next, the controller 206 preferably places the sensor 205 in the GRAVITY CANCELLATION STATE. The controller 206 may place the sensor 205 in the GRAVITY CANCELLATION STATE for any number of the sixteen clock periods within the OPERATING MODE 4.5. In a preferred embodiment, the controller 206 places the sensor 205 in the GRAVITY CANCELLATION STATE for clock periods 5 through 12 of the OPERATING MODE 4.5.

Next, the controller 206 preferably places the sensor 205 in the VOLTAGE EQUALIZATION STATE. The controller 206 may place the sensor 205 in the VOLTAGE EQUALIZATION STATE for any number of the sixteen clock periods within the OPERATING MODE 4.5. In a preferred embodiment, the controller 206 places the sensor 205 in the VOLTAGE EQUALIZATION STATE for clock periods 13 and 14 of the OPERATING MODE 4.5.

Finally, the controller 206 preferably places the sensor 205 in the SENSING state 1. The controller 206 may place the sensor 205 in the SENSING state 1 for any number of the sixteen clock periods within the OPERATING MODE 4.5. In a preferred embodiment, the controller 206 places the sensor 205 in the SENSING state 1 for clock periods 15 and 16 of the OPERATING MODE 4.5.

Figure 31:
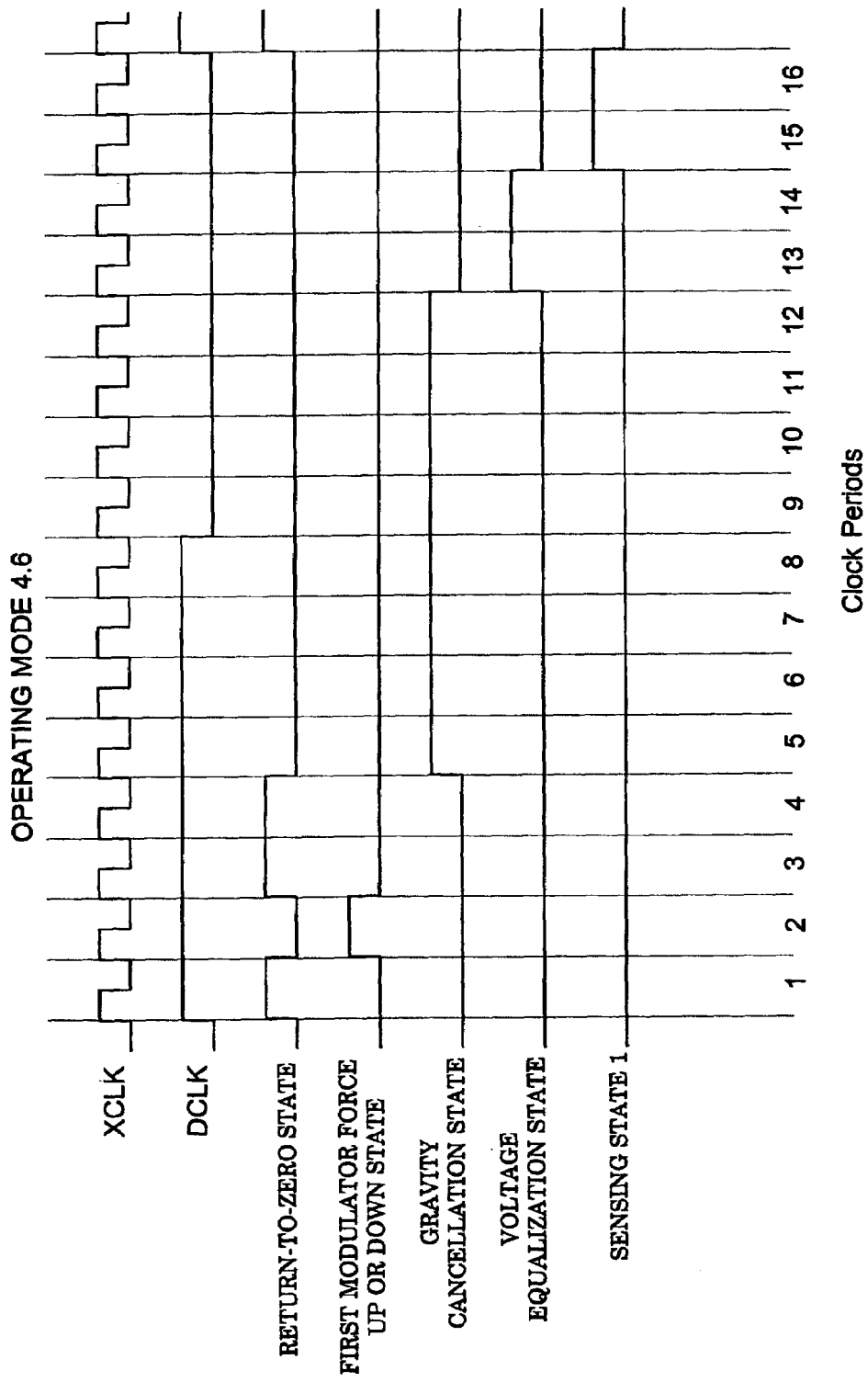
FIG. 31 illustrates an embodiment of a clocking diagram of the sensor of FIG. 9 during OPERATING MODE 4.6.

In another preferred embodiment, as illustrated in FIG. 31, the controller 206 utilizes a short forcing mode with return-to-zero forces during the OPERATING MODE 4.6. The controller 206 may utilize any number of the eleven generic operating states described above, or variations thereof, to create the OPERATING MODE 4.6. In a preferred embodiment, the controller 206 utilizes the RETURN-TO-ZERO STATE, the FIRST MODULATOR FORCE UP STATE or the FIRST MODULATOR FORCE DOWN STATE, the GRAVITY CANCELLATION STATE, the VOLTAGE EQUALIZATION STATE, and the SENSING state 1 to create the OPERATING MODE 4.6.

In a preferred embodiment, the controller 206 begins the OPERATING MODE 4.6 by placing the sensor 205 in the RETURN-TO-ZERO STATE to remove charges from the conductive plates 305, 306, 307, and 308. The controller 206 may place the sensor 205 in the RETURN-TO-ZERO STATE for any number of the sixteen clock periods within the OPERATING MODE 4.6. In a preferred embodiment, the controller 206 places the sensor 205 in the RETURN-TO-ZERO STATE for clock periods 1, 3 and 4 of the OPERATING MODE 4.6.

Next, the controller 206 preferably places the sensor 205 in the FIRST MODULATOR FORCE UP STATE or the FIRST MODULATOR FORCE DOWN STATE to force the measurement mass 309 as a function of the position of the measurement mass 309 within the sensor 205. The controller 206 may place the sensor 205 in the FIRST MODULATOR FORCE UP STATE or the FIRST MODULATOR FORCE DOWN STATE for any number of the sixteen clock periods within the OPERATING MODE 4.6. In a preferred embodiment, the controller 206 places the sensor 205 in the FIRST MODULATOR FORCE UP STATE or the FIRST MODULATOR FORCE DOWN STATE for clock period 2 of the OPERATING MODE 4.6.

Next, the controller 206 preferably places the sensor 205 in the GRAVITY CANCELLATION STATE. The controller 206 may place the sensor 205 in the GRAVITY CANCELLATION STATE for any number of the sixteen clock periods within the OPERATING MODE 4.6. In a preferred embodiment, the controller 206 places the sensor 205 in the GRAVITY CANCELLATION STATE for clock periods 5 through 12 of the OPERATING MODE 4.6.

Next, the controller 206 preferably places the sensor 205 in the VOLTAGE EQUALIZATION STATE. The controller 206 may place the sensor 205 in the VOLTAGE EQUALIZATION STATE for any number of the sixteen clock periods within the OPERATING MODE 4.6. In a preferred embodiment, the controller 206 places the sensor 205 in the VOLTAGE EQUALIZATION STATE for clock periods 13 and 14 of the OPERATING MODE 4.6.

Finally, the controller 206 preferably places the sensor 205 in the SENSING state 1. The controller 206 may place the sensor 205 in the SENSING state 1 for any number of the sixteen clock periods within the OPERATING MODE 4.6. In a preferred embodiment, the controller 206 places the sensor 205 in the SENSING state 1 for clock periods 15 and 16 of the OPERATING MODE 4.6.

Figure 32:
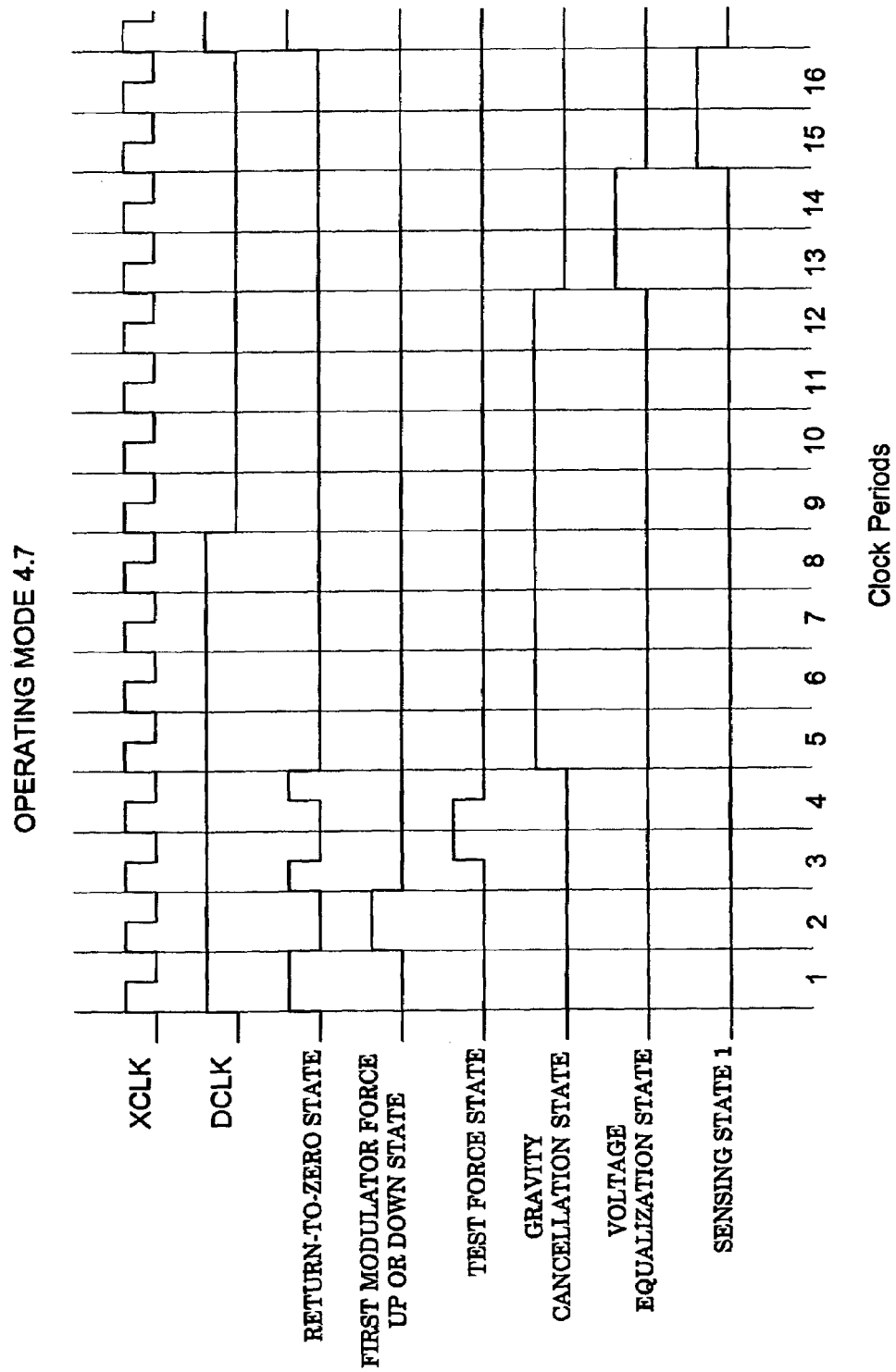
FIG. 32 illustrates an embodiment of a clocking diagram of the sensor of FIG. 9 during OPERATING MODE 4.7.

In another preferred embodiment, as illustrated in FIG. 32, the controller 206 utilizes a short forcing mode with return-to-zero forces and test bit interleaving during the OPERATING MODE 4.7. The controller 206 may utilize any number of the eleven generic operating states described above, or variations thereof, to create the OPERATING MODE 4.7. In a preferred embodiment, the controller 206 utilizes the RETURN-TO-ZERO STATE, the FIRST MODULATOR FORCE UP STATE or the FIRST MODULATOR FORCE DOWN STATE, the test forcing state, the GRAVITY CANCELLATION STATE, the VOLTAGE EQUALIZATION STATE, and the SENSING state 1 to create the OPERATING MODE 4.7.

In a preferred embodiment, the controller 206 begins the OPERATING MODE 4.7 by placing the sensor 205 in the RETURN-TO-ZERO STATE to remove charges from the conductive plates 305, 306, 307, and 308. The controller 206 may place the sensor 205 in the RETURN-TO-ZERO STATE for any number of the sixteen clock periods within the OPERATING MODE 4.7. In a preferred embodiment, the controller 206 places the sensor 205 in the RETURN-TO-ZERO STATE for clock period 1, the first half of clock period 3, and the second half of clock period 4 of the OPERATING MODE 4.7.

Next, the controller 206 preferably places the sensor 205 in the FIRST MODULATOR FORCE UP STATE or the FIRST MODULATOR FORCE DOWN STATE to force the measurement mass 309 as a function of the position of the measurement mass 309 within the sensor 205. The controller 206 may place the sensor 205 in the FIRST MODULATOR FORCE UP STATE or the FIRST MODULATOR FORCE DOWN STATE for any number of the sixteen clock periods within the OPERATING MODE 4.7. In a preferred embodiment, the controller 206 places the sensor 205 in the FIRST MODULATOR FORCE UP STATE or the FIRST MODULATOR FORCE DOWN STATE for clock period 2 of the OPERATING MODE 4.7.

Next, the controller 206 preferably places the sensor 205 in the test forcing state. The controller 206 preferably creates the test state by interleaving a test bit input into the data stream in place of the FIRST MODULATOR FORCE UP STATE or the FIRST MODULATOR FORCE DOWN STATE, depending on the value of the output stream IMOD. In a preferred embodiment, the controller 206 interleaves the test bit stream substantially as described in U.S. Pat. No. 6,023,960, the disclosure of which is incorporated herein by reference. The controller 206 may place the sensor 205 in the test forcing state for any number of the sixteen clock periods within the OPERATING MODE 4.7. In a preferred embodiment, the controller 206 places the sensor 205 in the test forcing state for the second half of clock period 3 and the first half of clock period 4 of the OPERATING MODE 4.7.

Next, the controller 206 preferably places the sensor 205 in the GRAVITY CANCELLATION STATE. The controller 206 may place the sensor 205 in the GRAVITY CANCELLATION STATE for any number of the sixteen clock periods within the OPERATING MODE 4.7. In a preferred embodiment, the controller 206 places the sensor 205 in the GRAVITY CANCELLATION STATE for clock periods 5 through 12 of the OPERATING MODE 4.7.

Next, the controller 206 preferably places the sensor 205 in the VOLTAGE EQUALIZATION STATE. The controller 206 may place the sensor 205 in the VOLTAGE EQUALIZATION STATE for any number of the sixteen clock periods within the OPERATING MODE 4.7. In a preferred embodiment, the controller 206 places the sensor 205 in the VOLTAGE EQUALIZATION STATE for clock periods 13 and 14 of the OPERATING MODE 4.7.

Finally, the controller 206 preferably places the sensor 205 in the SENSING state 1. The controller 206 may place the sensor 205 in the SENSING state 1 for any number of the sixteen clock periods within the OPERATING MODE 4.7. In a preferred embodiment, the controller 206 places the sensor 205 in the SENSING state 1 for clock periods 15 and 16 of the OPERATING MODE 4.7.

Figure 33:
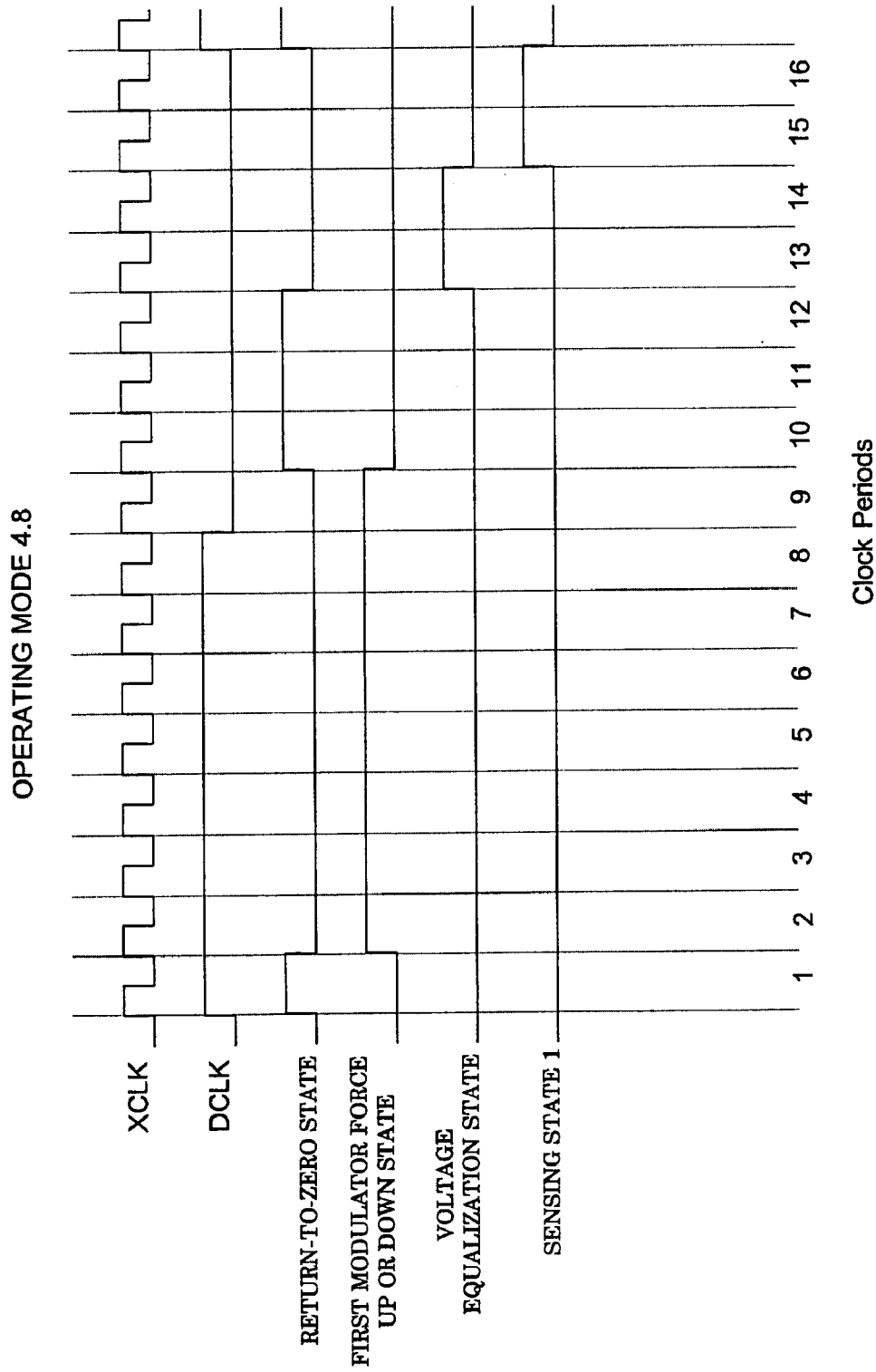
FIG. 33 illustrates an embodiment of a clocking diagram of the sensor of FIG. 9 during OPERATING MODE 4.8.

In another preferred embodiment, as illustrated in FIG. 33, the controller 206 utilizes a very long forcing mode with return-to-zero forces during the OPERATING MODE 4.8. The controller 206 may utilize any number of the eleven generic operating states described above, or variations thereof, to create the OPERATING MODE 4.8. In a preferred embodiment, the controller 206 utilizes the RETURN-TO-ZERO STATE, the FIRST MODULATOR FORCE UP STATE or the FIRST MODULATOR FORCE DOWN STATE, the VOLTAGE EQUALIZATION STATE, and the SENSING state 1 to create the OPERATING MODE 4.8.

In a preferred embodiment, the controller 206 begins the OPERATING MODE 4.8 by placing the sensor 205 in the RETURN-TO-ZERO STATE to remove charges from the conductive plates 305, 306, 307, and 308. The controller 206 may place the sensor 205 in the RETURN-TO-ZERO STATE for any number of the sixteen clock periods within the OPERATING MODE 4.8. In a preferred embodiment, the controller 206 places the sensor 205 in the RETURN-TO-ZERO STATE for clock periods 1, 10, 11, and 12 of the OPERATING MODE 4.8.

Next, the controller 206 preferably places the sensor 205 in the FIRST MODULATOR FORCE UP STATE or the FIRST MODULATOR FORCE DOWN STATE to force the measurement mass 309 as a function of the position of the measurement mass 309 within the sensor 205. The controller 206 may place the sensor 205 in the FIRST MODULATOR FORCE UP STATE or the FIRST MODULATOR FORCE DOWN STATE for any number of the sixteen clock periods within the OPERATING MODE 4.8. In a preferred embodiment, the controller 206 places the sensor 205 in the FIRST MODULATOR FORCE UP STATE or the FIRST MODULATOR FORCE DOWN STATE for clock periods 2 through 9 of the OPERATING MODE 4.8.

Next, the controller 206 preferably places the sensor 205 in the VOLTAGE EQUALIZATION STATE. The controller 206 may place the sensor 205 in the VOLTAGE EQUALIZATION STATE for any number of the sixteen clock periods within the OPERATING MODE 4.8. In a preferred embodiment, the controller 206 places the sensor 205 in the VOLTAGE EQUALIZATION STATE for clock periods 13 and 14 of the OPERATING MODE 4.8.

Finally, the controller 206 preferably places the sensor 205 in the SENSING state 1. The controller 206 may place the sensor 205 in the SENSING state 1 for any number of the sixteen clock periods within the OPERATING MODE 4.8. In a preferred embodiment, the controller 206 places the sensor 205 in the SENSING state 1 for clock periods 15 and 16 of the OPERATING MODE 4.8.

The controller 206 preferably uses the OPERATING MODE 1, the OPERATING MODE 2, the OPERATING MODE 3, and the OPERATING MODE 4 to create a startup sequence for the system 100. The controller 206 may arrange the OPERATING MODE 1, the OPERATING MODE 2, the OPERATING MODE 3, and the OPERATING MODE 4 in any number of combinations suitable for creating a start-up sequence for the sensor system 100. The controller 206 preferably applies the OPERATING MODE 1, the OPERATING MODE 2, the OPERATING MODE 3, and the OPERATING MODE 4 in four arrangements to create four different startup sequences, including (1) a startup sequence 3400 without stray capacitance calibration, (2) a startup sequence 3500 with stray capacitance calibration, (3) a startup sequence 3600 without stray capacitance calibration where the controller 206 remains in an analog output mode, and (4) a startup sequence 3700 with stray capacitance calibration where the controller 206 remains in an analog output mode.

Figure 34:
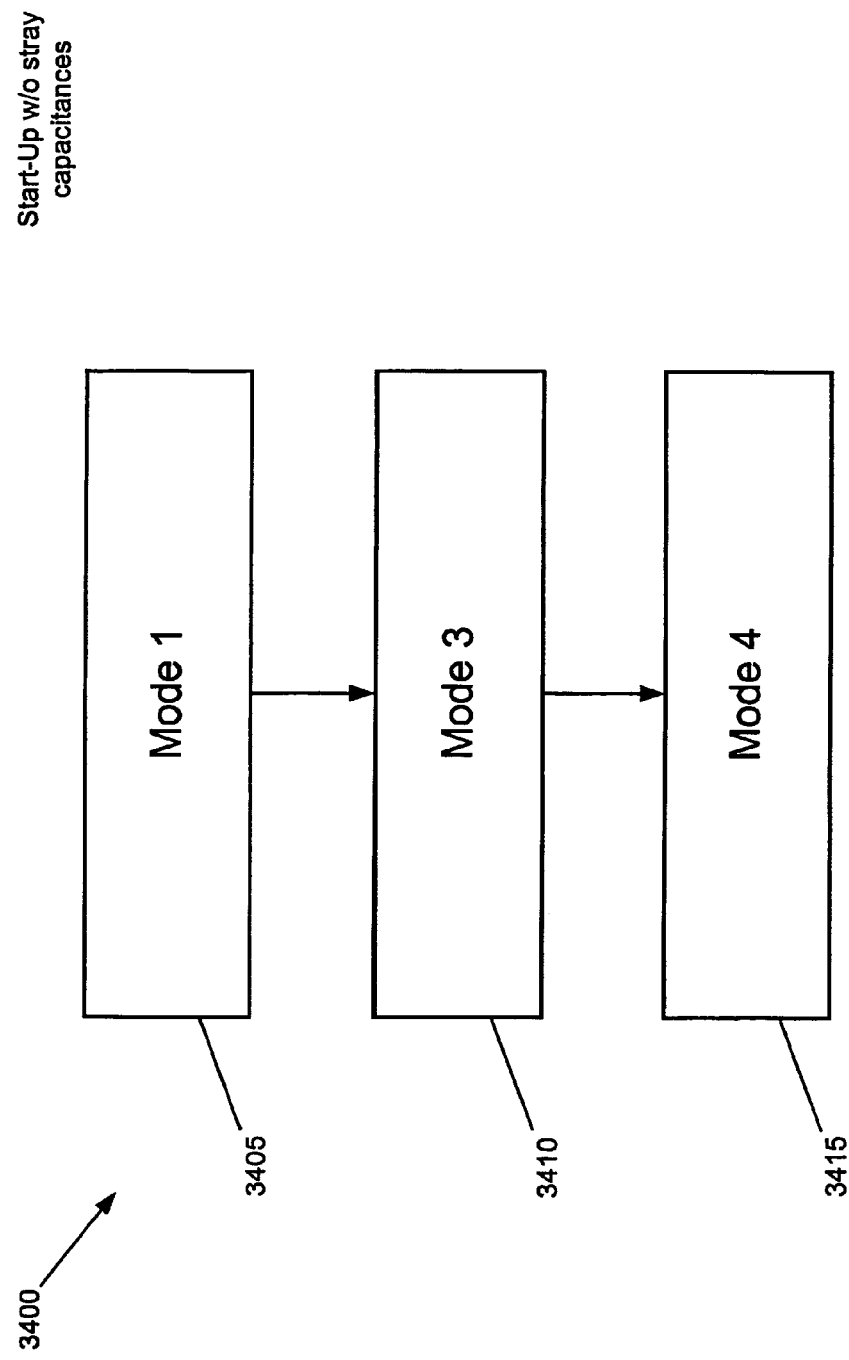
FIG. 34 illustrates an embodiment of a startup sequence for the sensor and controller of FIG. 2 without a stray capacitance calibration step.

Referring to FIG. 34, a startup sequence 3400 without stray capacitance calibration will be described. In a preferred embodiment, the startup sequence 3400 includes: using the OPERATING MODE 1 to set up the measurement mass 309 within the sensor 205 in step 3405, using the OPERATING MODE 3 to calibrate the sensor 205 in step 3410, and using the OPERATING MODE 4 to run the controller 206 with the sensor 205 inside a delta-sigma modulator loop in step 3415.

In a preferred embodiment, in step 3405 the controller 206 begins the startup sequence 3400 by utilizing the OPERATING MODE 1. The controller 206 preferably uses the OPERATING MODE 1 to pull the measurement mass 309 from a resting position within the sensor 205 and to position the measurement mass 309 within the sensor 205 so that the charges across capacitor C1 and capacitor C2 are substantially equal in magnitude.

Next, in step 3410, the controller 206 preferably utilizes the OPERATING MODE 3 to cancel the effects of gravitational forces on the sensor 205 and to calibrate the sensor 205. In a preferred embodiment, the controller 206 calibrates the sensor 205 so that the operating range of the sensor 205 is approximately +/−0.1 g.

Finally, in step 3415 the controller 206 preferably concludes the startup sequence 3400 by operating the sensor system 100 in the OPERATING MODE 4. In a preferred embodiment, the controller 206 operates the sensor system 100 in a sigma-delta operating mode during the OPERATING MODE 4. The controller 206 may utilize any of the eight sub-modes of the OPERATING MODE 4 described above, such as, for example, the OPERATING MODE 4.1, the OPERATING MODE 4.2, the OPERATING MODE 4.3, the OPERATING MODE 4.4, the OPERATING MODE 4.5, the OPERATING MODE 4.6, the OPERATING MODE 4.7, or the OPERATING MODE 4.8. In a preferred embodiment, during the OPERATING MODE 4, the controller 206 applies electrostatic forces to the sensor 205 designed to offset the effects of external acceleration forces experienced by the sensor 205.

Figure 35:
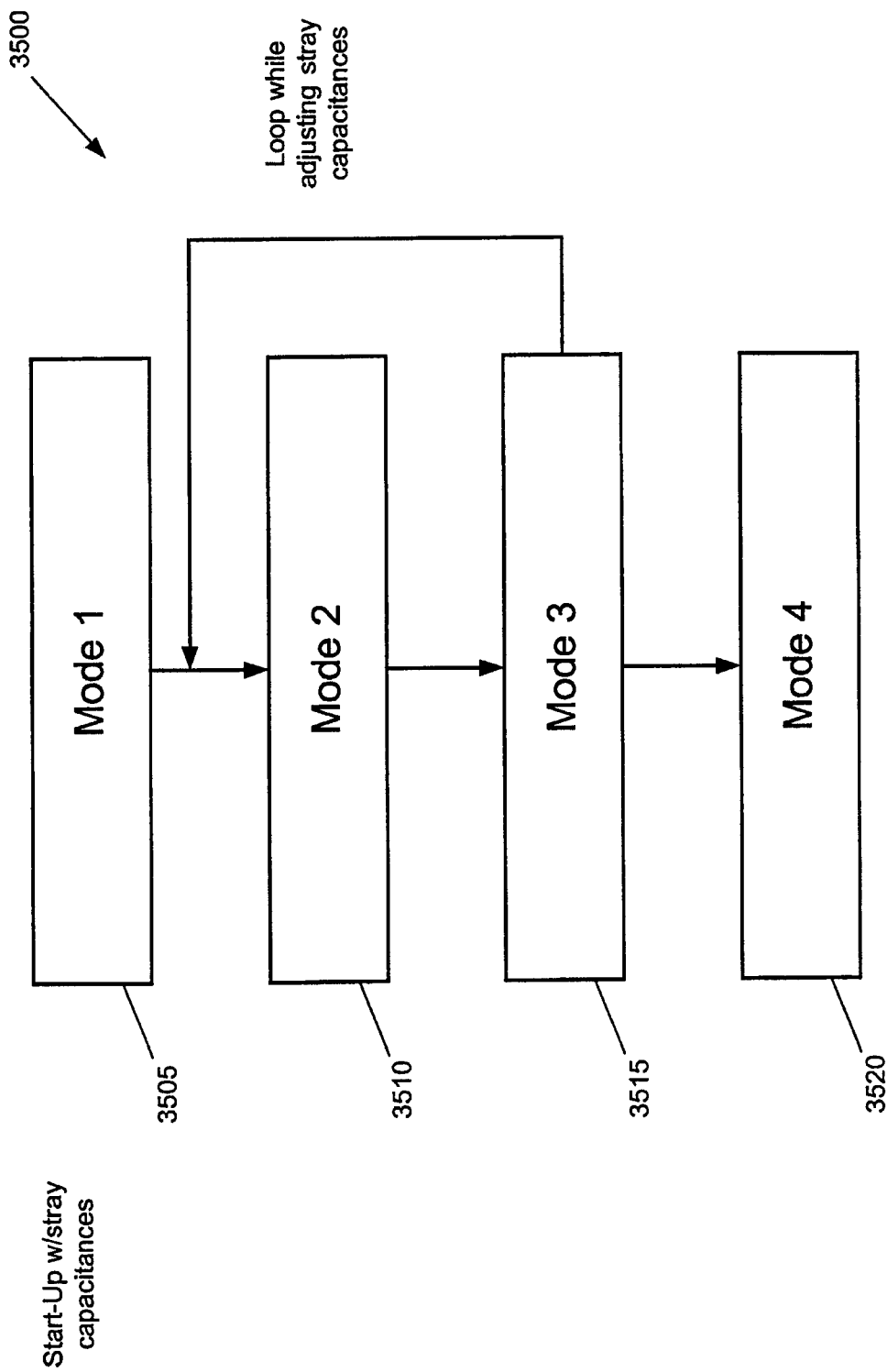
FIG. 35 illustrates an embodiment of a startup sequence for the sensor and controller of FIG. 2 including a stray capacitance calibration step.

Referring to FIG. 35, a startup sequence 3500 with stray capacitance calibration will now be described. In a preferred embodiment, the startup sequence 3500 includes: using the OPERATING MODE 1 to set up the measurement mass 309 within the sensor 205 in step 3505, using the OPERATING MODE 2 to calibrate the sensor 205 in step 3510, applying the OPERATING MODE 3 to cancel the effects of stray capacitance within the sensor 205 in step 3515, and using the OPERATING MODE 4 to run the controller 206 with the sensor 205 inside a delta-sigma modulator loop in step 3520.

In a preferred embodiment, in step 3505 the controller 206 begins the startup sequence 3500 by utilizing the OPERATING MODE 1. The controller 206 preferably uses the OPERATING MODE 1 to pull the measurement mass 309 from a resting position within the sensor 205 and to position the measurement mass 309 within the sensor 205 so that the capacitor C1 and capacitor C2 are substantially equal in magnitude.

Next, in step 3510 the controller 206 preferably utilizes the OPERATING MODE 2 to cancel the effects of gravitational forces on the sensor 205 and to calibrate the sensor 205. In a preferred embodiment, the controller 206 calibrates the sensor 205 so that the operating range of the sensor 205 is approximately +/−0.1 g.

Next, in step 3515 the controller 206 preferably utilizes the OPERATING MODE 3 to optimize the performance of the sensor 205 by canceling the effects of stray capacitances within the sensor 205. The controller 206 preferably utilizes the OPERATING MODE 2 and the OPERATING MODE 3 together to calibrate the sensor 205 and cancel the effects of gravity and stray capacitances on the sensor 205.

Finally, in step 3520 the controller 206 preferably concludes the startup sequence 3500 by operating the sensor system 100 in the OPERATING MODE 4. In a preferred embodiment, the controller 206 operates the sensor system 100 in a sigma-delta operating mode during the OPERATING MODE 4. The controller 206 may utilize any of the eight sub-modes of the OPERATING MODE 4 described above, such as, for example, the OPERATING MODE 4.1, the OPERATING MODE 4.2, the OPERATING MODE 4.3, the OPERATING MODE 4.4, the OPERATING MODE 4.5, the OPERATING MODE 4.6, the OPERATING MODE 4.7, or the OPERATING MODE 4.8. In a preferred embodiment, during the OPERATING MODE 4, the controller 206 applies electrostatic forces to the sensor 205 designed to offset the effects of external acceleration forces experienced by the sensor 205.

Figure 36:
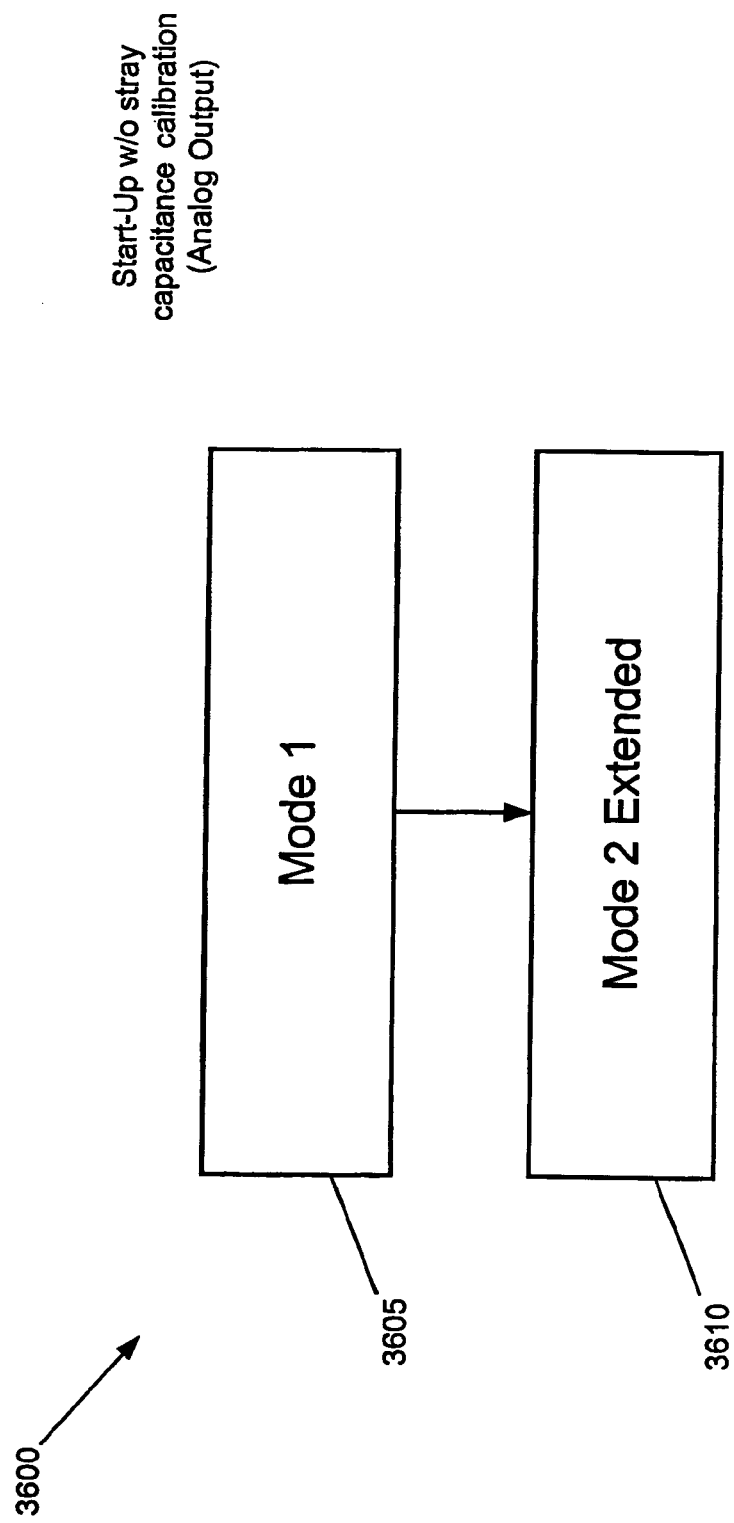
FIG. 36 illustrates an embodiment of a startup sequence for the sensor and controller of FIG. 2 without a stray capacitance step in which the controller remains in analog output mode.

Referring to FIG. 36, a startup sequence 3600 without stray capacitance calibration where the controller 206 remains in an analog output mode will now be described. In a preferred embodiment, the startup sequence 3600 includes: using the OPERATING MODE 1 to set up the measurement mass 309 within the sensor 205 in step 3605, and applying an OPERATING MODE 2 Extended to continuously servo the measurement mass 309 to the center position between plates 305 and 308 in response to external accelerations in step 3610. The startup sequence 3600 is preferably used when the sensor 205 is to operate as an approximately +/−2 g analog output accelerometer.

In a preferred embodiment, in step 3605 the controller 206 begins the startup sequence 3600 by utilizing the OPERATING MODE 1. The controller 206 preferably uses the OPERATING MODE 1 to pull the measurement mass 309 from a resting position within the sensor 205 and to position the measurement mass 309 within the sensor 205 so that the capacitor C1 and the capacitor C2 are substantially equal in magnitude.

In step 3610, the controller 206 preferably concludes the startup sequence 3600 by utilizing an extended version of the OPERATING MODE 2. In a preferred embodiment, the extended version of the OPERATING MODE 2 cancels the effects of external acceleration forces on the sensor 205 within a range of approximately +/−2 g.

Figure 37:
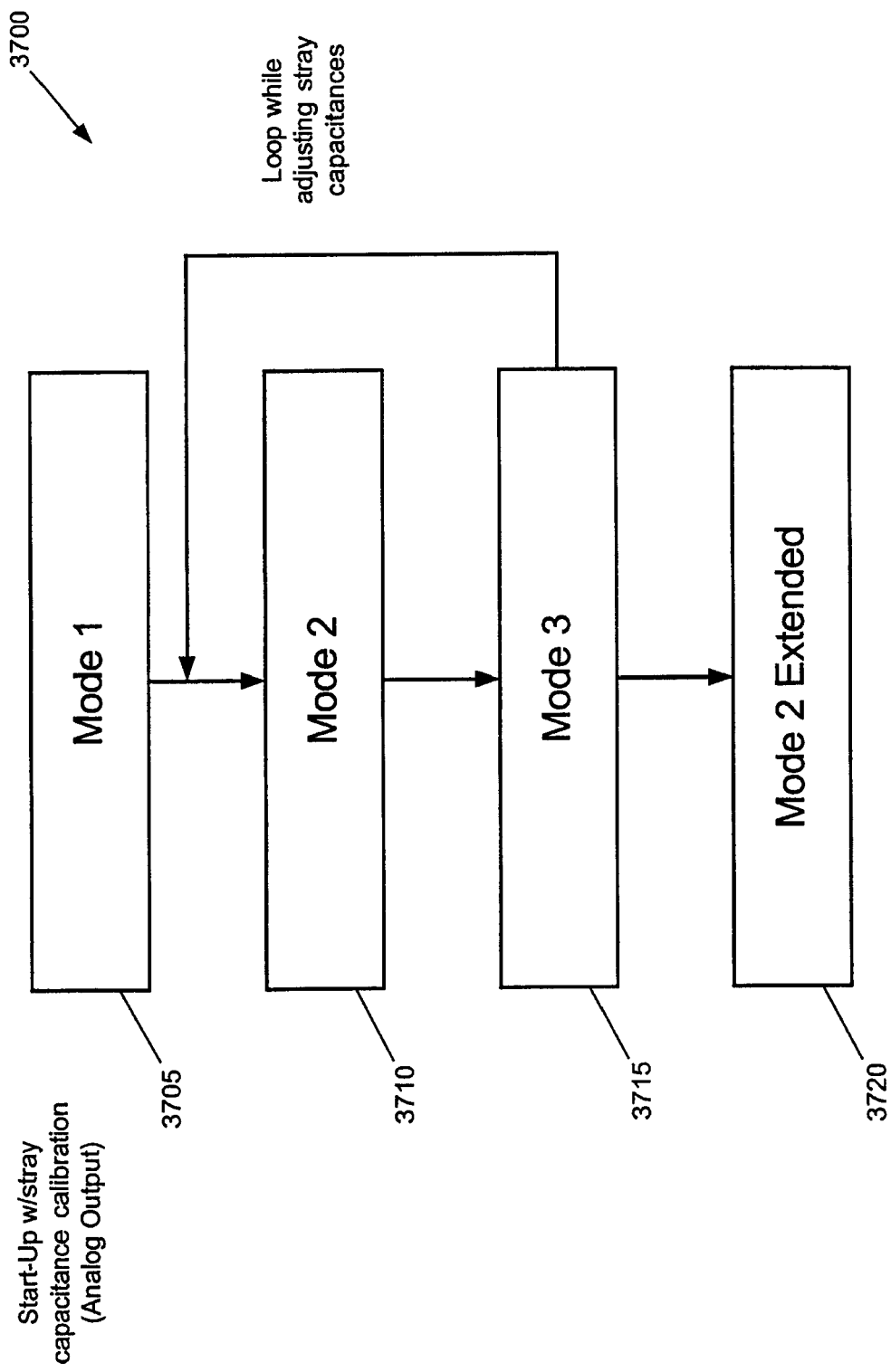
FIG. 37 illustrates an embodiment of a startup sequence for the sensor and controller of FIG. 2 including a stray capacitance step in which the controller remains in analog output mode.

Referring to FIG. 37, a startup sequence 3700 with stray capacitance calibration where the controller 206 remains in an analog output mode will now be described. In a preferred embodiment, the startup sequence 3700 includes: using the OPERATING MODE 1 to set up the measurement mass 309 within the sensor 205 in step 3705, using the OPERATING MODE 2 to calibrate the sensor 205 in step 3710, applying the OPERATING MODE 3 to cancel the effects of stray capacitance within the sensor 205 in step 3715, and using the OPERATING MODE 2 Extended to continuously servo the measurement mass 309 to the center position between plates 305 and 308 in response to external accelerations in step 3720.

In a preferred embodiment, in step 3705 the controller 206 begins the startup sequence 3700 by utilizing the OPERATING MODE 1. The controller 206 preferably uses the OPERATING MODE 1 to pull the measurement mass 309 from a resting position within the sensor 205 and to position the measurement mass 309 within the sensor 205 so that the capacitor C1 and the capacitor C2 are substantially equal in magnitude.

Next, in step 3710 the controller 206 preferably utilizes the OPERATING MODE 2 to cancel the effects of gravitational forces on the sensor 205 and to calibrate the sensor 205. In a preferred embodiment, the controller 206 calibrates the sensor 205 so that the operating range of the sensor 205 is approximately +/−0.1 g.

Next, in step 3715 the controller 206 preferably utilizes the OPERATING MODE 3 to optimize the performance of the sensor 205 by canceling the effects of stray capacitances within the sensor 205. The controller 206 preferably utilizes the OPERATING MODE 2 and the OPERATING MODE 3 together to calibrate the sensor 205 and cancel the effects of gravity and stray capacitances on the sensor 205.

Finally, in step 3720 the controller 206 preferably concludes the startup sequence 3700 by utilizing an extended version of the OPERATING MODE 2. In a preferred embodiment, the extended version of the OPERATING MODE 2 cancels the effects of external acceleration forces on the sensor 205 within a range of approximately +/−2 g.

During normal operation of the sensor system 100, the sensor 205 preferably experiences external acceleration forces that cause the measurement mass 309 to move around within the sensor 205. In a preferred embodiment, the controller 206 cancels the effects of acceleration forces experienced by the sensor 205 by utilizing the OPERATING MODE 4 during normal sigma-delta operation. The controller 206 may cancel the effects of the acceleration forces on the sensor 205 during the OPERATING MODE 4 using any number of methods suitable for canceling the acceleration forces, such as, for example, pulse width modulation or multi-bit sigma-delta modulation. In a preferred embodiment, the controller 206 uses a 1-bit sigma-delta modulated dynamic acceleration canceling force to cancel the effects of acceleration on the sensor 205.

Referring to FIGS. 38, 39, 40, and 41, the dynamic acceleration canceling force will now be described. In a preferred embodiment, the dynamic acceleration canceling forcing uses orientation-independent electrostatic forcing to offset the effects of acceleration forces on the sensor 205.

Figure 38:
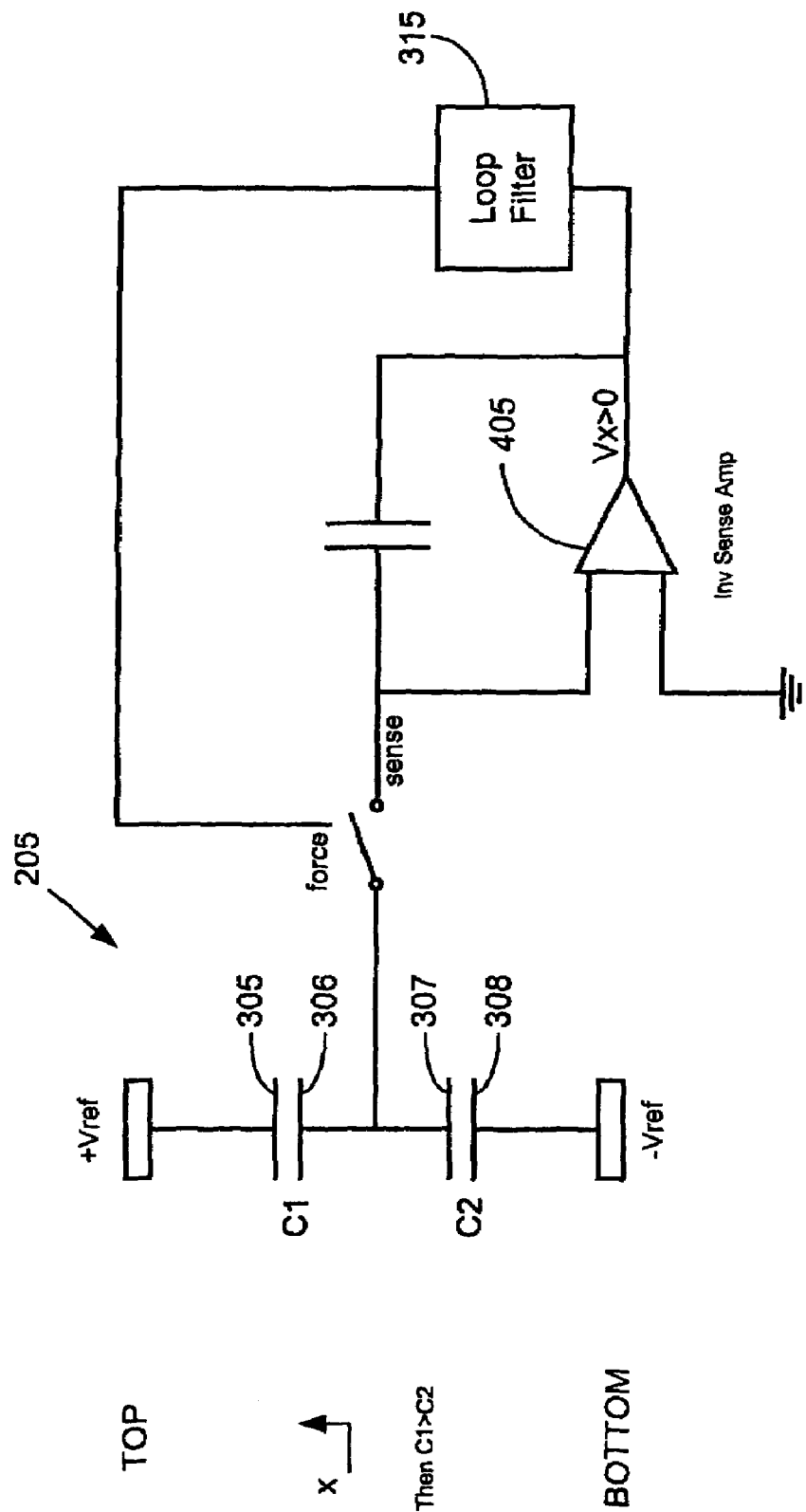
FIG. 38 illustrates an embodiment of the sensor and controller of FIG. 2 positioned in an upright manner and experiencing a downward acceleration force.

In a preferred embodiment, as illustrated in FIG. 38, the sensor 205 is positioned in an upright manner and a downward acceleration force is applied to the sensor 205. The position of the conductive plates 305, 306, 307, and 308 within the sensor 205 preferably creates the variable capacitors C1 and C2 within the sensor 205. In a preferred embodiment, the conductive plates 305 and 306 interact to create the capacitor C1. In a preferred embodiment, the conductive plates 307 and 308 interact to form the capacitor C2. In a preferred embodiment, the downward acceleration force applied to the upright sensor 205 causes the measurement mass 309 to move upward. The upward movement of the measurement mass 309 causes the conductive plate 306 to move towards the conductive plate 305, and the conductive plate 307 to move away from the conductive plate 308. As a result, when the upright sensor 205 experiences a downward acceleration force, the capacitance across the capacitor C1 becomes greater than the capacitance across the capacitor C2. The sense amplifier 405 preferably senses the capacitances across the capacitors C1 and C2 when the controller 206 operates in a sensing mode. When the capacitor C1 is greater than the capacitor C2, the output $V_x$ from the sense amplifier 405 in the front-end circuit 310 is preferably positive.

Figure 39:
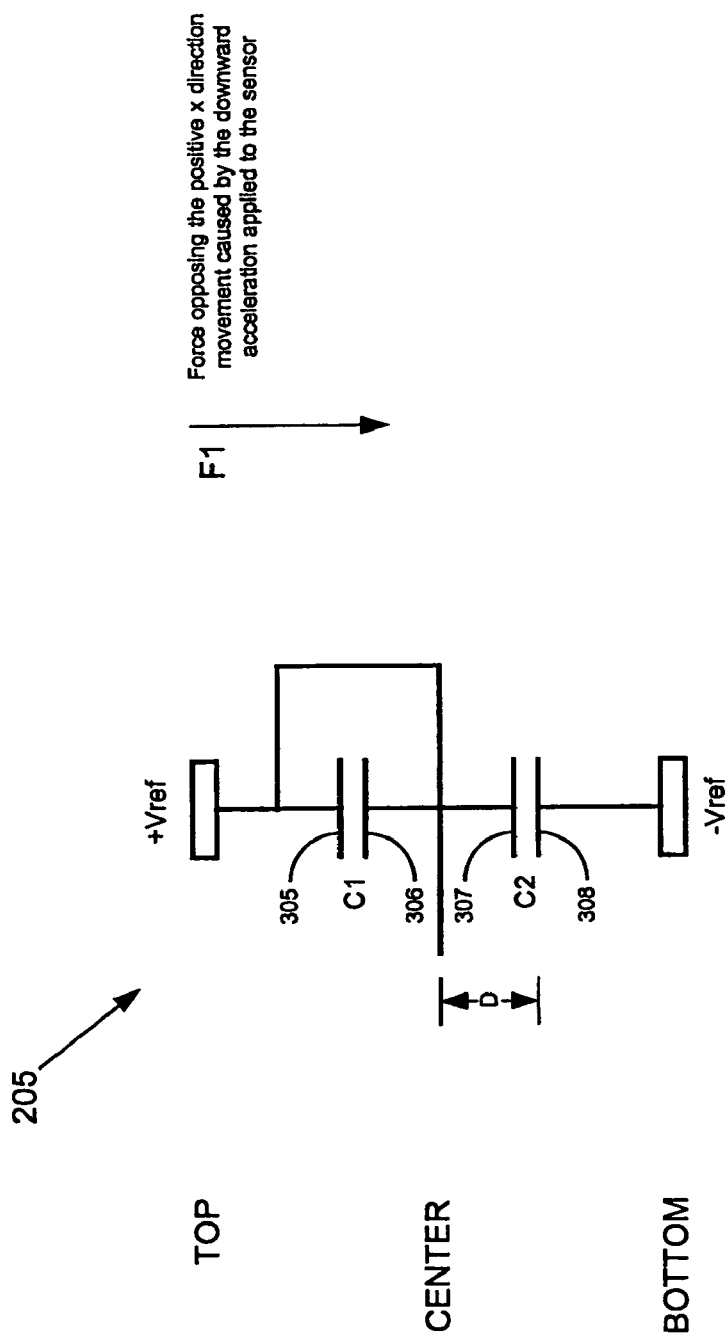
FIG. 39 illustrates a downward electrostatic force applied to the upright sensor of FIG. 38 by the controller to offset the effects of the downward acceleration force.

In a preferred embodiment, during sigma-delta operation, the positive output $V_x$ from the sense amplifier 405 in the front-end circuit 310 is sent to the loop filter 315. The loop filter 315 preferably receives the positive output Vx from the sense amplifier 405 and converts it into an output signal IMOD. The output signal IMOD from the loop filter 315 is preferably supplied by the comparator 530. When the output Vx from the sense amplifier 405 is positive, the output signal IMOD from the loop filter 315 preferably equals, on the average, zero. In a preferred embodiment, when the output signal IMOD equals zero, the controller 206 switches from the sensing mode to a forcing mode and applies the FIRST MODULATOR FORCE DOWN STATE to the sensor 205. In a preferred embodiment, as illustrated in FIG. 39, the FIRST MODULATOR FORCE DOWN STATE is created by applying the positive reference voltage $+V_{ref}$ to the conductive plate 305, the positive reference voltage $+V_{ref}$ to the conductive plates 306 and 307 on the measurement mass 309, and the negative reference voltage $-V_{ref}$ to the conductive plate 308. The electrostatic force resulting from the voltages $+V_{ref}$ and $-V_{ref}$ preferably moves the measurement mass 309 downward away from the conductive plate 305 and towards the conductive plate 308, canceling the upward movement of the measurement mass 309 caused by the downward acceleration force on the sensor 205. The magnitude of the electrostatic force, F1, used to cancel the effects of the downward acceleration on the upright sensor 205 is preferably given by:

$$F1 = \frac{1}{2}\varepsilon A \frac{[V_p + V_n]^2}{D^2} \qquad (1)$$

where:
∈=the dielectric constant of the gaps between the plates 305, 306, 307, and 308,
A=area of the plates 305, 306, 307, and 308,
$V_p$=magnitude of the positive reference voltage applied to conductive plates 305, 306, and 307,
$V_n$=magnitude of the negative reference voltage applied to conductive plate 308, and
D=distance between the center of the measurement mass 309 and the conductive plate 308, as illustrated in FIG. 39.

Figure 40:
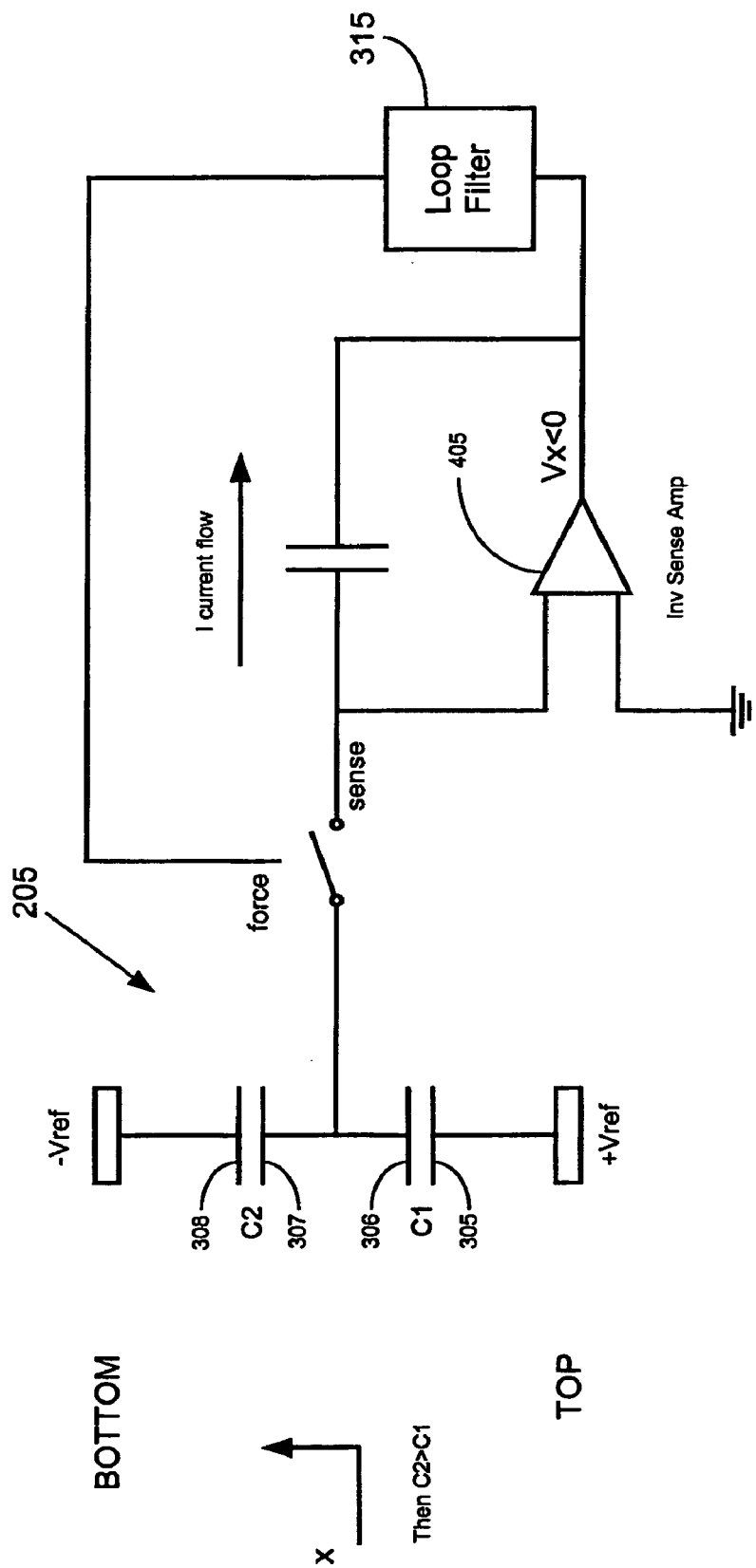
FIG. 40 illustrates an embodiment of the sensor and controller of FIG. 2 positioned in an upside-down manner and experiencing a downward acceleration force.
Figure 41:
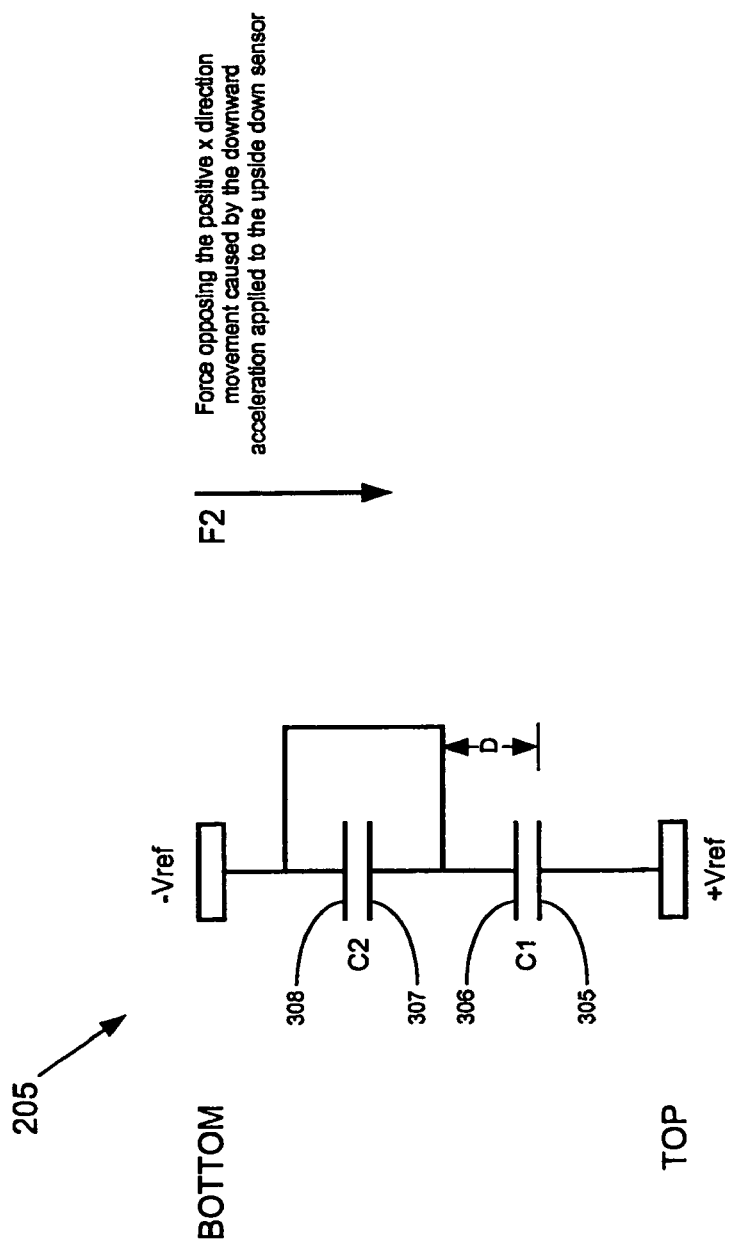
FIG. 41 illustrates a downward electrostatic force applied to the upside-down sensor of FIG. 38 by the controller to offset the effects of the downward acceleration force.

In another preferred embodiment, as illustrated in FIGS. 40 and 41, the sensor 205 is positioned in an upside down manner and a downward acceleration force is applied to the sensor 205. The position of the conductive plates 305, 306, 307, and 308 within the sensor 205 preferably creates variable capacitors C1 and C2 within the sensor 205. In a preferred embodiment, the conductive plates 305 and 306 interact to create the capacitor C1. In a preferred embodiment, the conductive plates 307 and 308 interact to form the capacitor C2. In a preferred embodiment, the downward acceleration force applied to the upside down sensor 205 causes the measurement mass 309 to move upward, which corresponds to a downward movement of the measurement mass 309 in an upright sensor 205. The upward movement of the measurement mass 309 causes the conductive plate 307 to move towards the conductive plate 308, and the conductive plate 306 to move away from the conductive plate 305. Therefore, when the upside down sensor 205 experiences a downward acceleration force, the capacitance across the capacitor C2 becomes greater than the capacitance across the capacitor C1. The sense amplifier 405 preferably senses the capacitances across the capacitors C1 and C2 when the controller 206 operates in the sensing mode. When the capacitor C2 is greater than the capacitor C1, the output $V_x$ from the sense amplifier 405 is preferably negative.

In a preferred embodiment, during sigma-delta operation, the negative output $V_x$ from the sense amplifier 405 in the front-end circuit 310 is sent to the loop filter 315. The loop filter 315 preferably receives the negative output Vx from the sense amplifier 405 and converts it into an output signal IMOD. The output signal IMOD from the loop filter 315 is preferably supplied by the comparator 530. When the output Vx from the sense amplifier 405 is negative, the output signal IMOD from the loop filter 315 preferably equals, on the average, one. In a preferred embodiment, when the output signal IMOD from the loop filter 315 equals one, the controller 206 switches from the sensing mode to the forcing mode and applies the FIRST MODULATOR FORCE UP STATE to the sensor 205. In a preferred embodiment, as illustrated in FIG. 41, the FIRST MODULATOR FORCE UP STATE is created by applying the positive reference voltage $+V_{ref}$ to plate 305, the negative reference voltage $-V_{ref}$ to plates 306 and 307 on the measurement mass 309, and the negative reference voltage $-V_{ref}$ to plate 308. The electrostatic force resulting from the application of the voltages $+V_{ref}$ and $-V_{ref}$ preferably moves the measurement mass 309 down away from plate 308 and towards plate 305, canceling the upward movement of the measurement mass 309 caused by the acceleration force on the sensor 205. The magnitude of the electrostatic force, F2, used to cancel the effects of the downward acceleration applied to the upside-down sensor 205 is preferably given by:

$$F2 = \frac{1}{2}\varepsilon A \frac{[V_p + V_n]^2}{D^2} \quad (2)$$

where:
  $\varepsilon$=dielectric constant of the gaps between the plates 305, 306, 307, and 308,
  A=area of the plates 305, 306, 307, and 308,
  $V_p$=magnitude of the positive reference voltage applied to conductive plate 305,
  $V_n$=magnitude of the negative reference voltage applied to conductive plates 306, 307, and 308, and
  D=distance between the center of the measurement mass 309 and the conductive plate 308, as illustrated in FIG. 41.

In a preferred embodiment, the magnitude of the electrostatic force F2 applied to cancel the effects of the downward acceleration force on the upside down sensor 205 is substantially the same as the electrostatic force F1 applied to cancel the effects of an upward acceleration force of the same magnitude on the upright sensor 205. Likewise, the electrostatic force applied to cancel the effects of the upward acceleration force on the upside down sensor 205 is preferably substantially identical to the force applied to cancel the effects of an downward acceleration force of the same magnitude on the upright sensor 205. Therefore, in a preferred embodiment, the electrostatic forces required to offset the effects of acceleration forces on the sensor 205 are dependent on the directional movement of the measurement mass 309 with respect to the conductive plates 305, 306, 307, and 308 and are independent of the orientation of the sensor 205.

Figure 42:
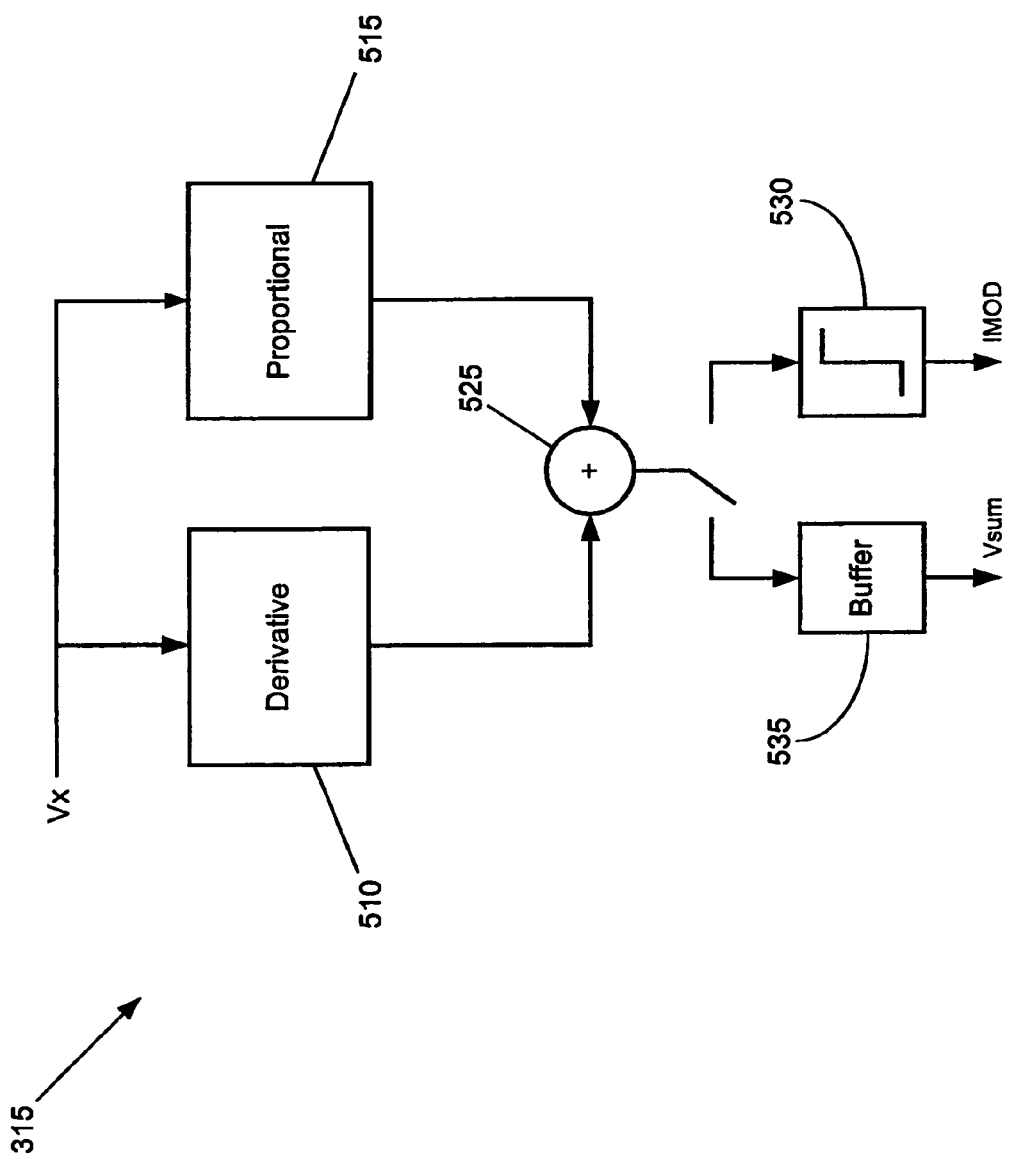
FIG. 42 illustrates an embodiment of the loop filter of FIG. 5 operating in a reduced-order mode.
Figure 43:
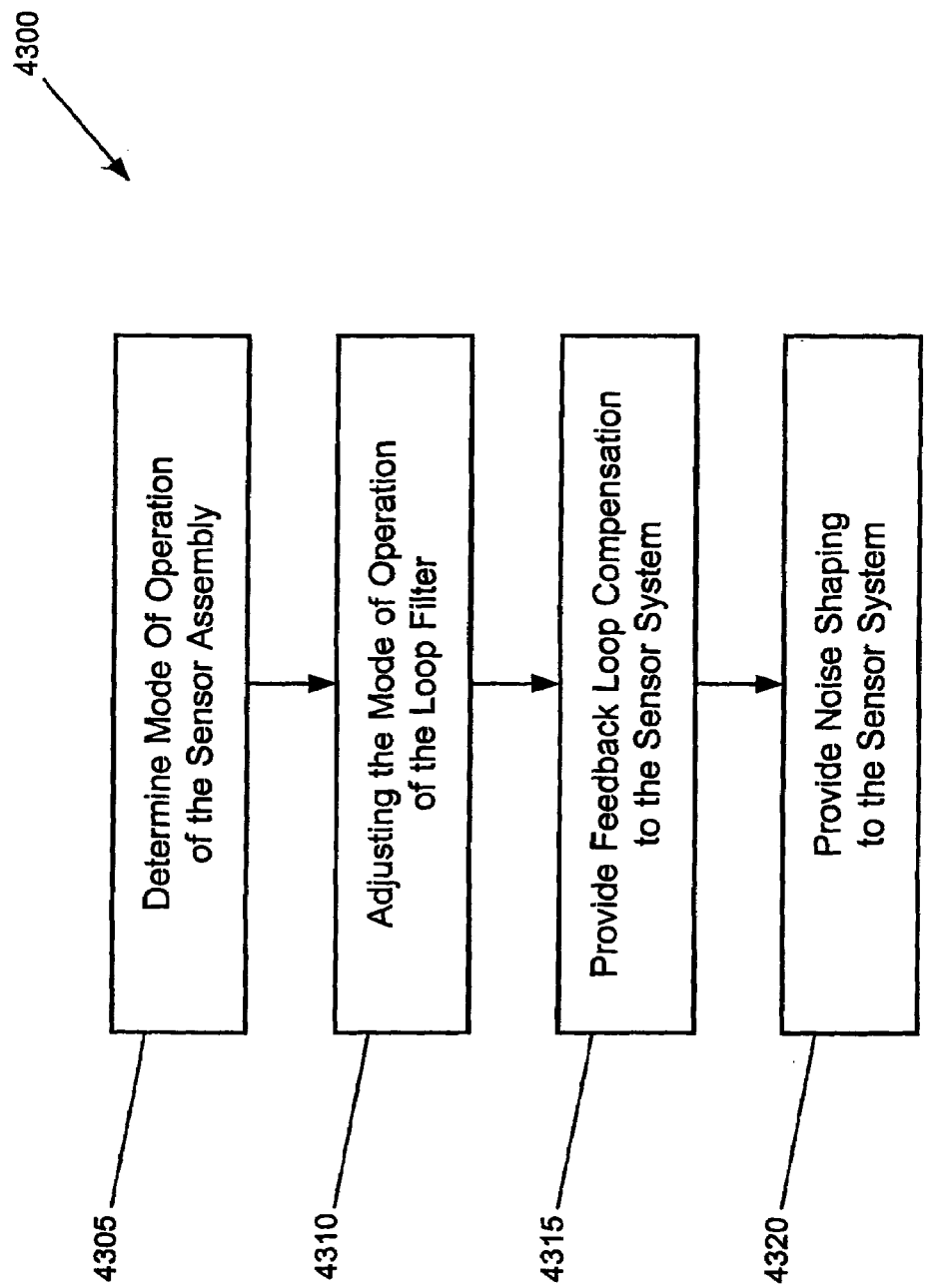
FIG. 43 is an embodiment of a method of providing control to the sensor system of FIG. 1.

Referring to FIGS. 5, 42, and 43, the operation of the loop filter 315 in the controller 206 will now be described. The operation of the loop filter 315 may, for example, vary as a function of the operating mode of the sensor 205. The loop filter 315 may, for example, operate in a normal operating mode or in a reduced-order mode. In a preferred embodiment, the loop filter 315 operates in the reduced-order mode during the OPERATING MODE 1, the OPERATING MODE 2, the OPERATING MODE 3, and parts of the OPERATING MODE 4. In a preferred embodiment, the loop filter 315 operates in the normal operating mode during parts of the OPERATING MODE 4.

In a preferred embodiment, the loop filter 315 preferably operates in normal operating mode and provides noise shaping for the sensor 205 during sigma-delta operation (OPERATING MODE 4). The loop filter 315 may provide noise shaping to the sensor 205 using any number of methods suitable for providing noise shaping to a measurement device, such as, for example, $n^{th}$ order 1-bit sigma-delta modulation or $n^{th}$ order multi-bit sigma-delta modulation. In a preferred embodiment, as illustrated in FIG. 5, the loop filter 315 provides noise shaping to the sensor 205 by utilizing the output streams supplied by the integrators 505, the derivative controller 510, and the proportional controller 515. In a preferred embodiment, the loop filter 315 receives the output Vx of the sense amplifier 405 in the front-end circuit 310 as the input into the loop filter 315. The derivative controller 510 preferably generates a velocity term as the first derivative of the x position of the measurement mass 309 as determined by the output Vx of the sense amplifier 405. The proportional controller 515 preferably generates a displacement term by applying a proportional constant to the output Vx of the sense amplifier 405. The integrators 505 preferably use the output Vx of the sense amplifier 405 to generate a third, fourth, and fifth integral term for fifth-order noise shaping of the 1-bit quantization noise. The output streams from the integrators 505, the derivative controller 510, and the proportional controller 515 are preferably scaled as needed and received by the summer 525. The summer 525 preferably combines the output streams from the integrators 505, the derivative controller 510, and the proportional controller 515 into a single output stream. During the normal sigma-delta operating mode (OPERATING MODE 4), the output stream from the summer 525 is preferably sent to the comparator 530. The comparator 530 preferably converts the output stream from the summer 525 into an output stream IMOD from the loop filter 315. In a preferred embodiment, the output IMOD from the loop filter 315 is a sigma-delta modulated 1-bit signal representing the external acceleration forces on the sensor 205, excluding the approximately 1-g static field. In a preferred embodiment, the output IMOD from the loop filter 315 equals, on the average, either zero or one.

In another preferred embodiment, the loop filter 315 preferably operates in reduced-order mode and provides feedback loop compensation for the sensor 205 during the OPERATING MODE 1, the OPERATING MODE 2, and the OPERATING MODE 3, and noise shaping during parts of the OPERATING MODE 4. The loop filter 315 may provide feedback loop control or noise shaping to the sensor 205 using any number of methods of providing feedback loop control or noise shaping to a sensor. The loop filter 315 preferably provides feedback loop control to the sensor 205 by operating in the reduced-order mode. In a preferred embodiment, as illustrated in FIG. 42, the loop filter 315 operates in reduced-order mode by holding the integrators 505 in reset and utilizing the output streams supplied by the derivative controller 510 and the proportional controller 515. In a preferred embodiment, the loop filter 315 receives the output Vx of the sense amplifier 405 in the front-end circuit 310 as the input into the loop filter 315. The derivative controller 510 preferably generates a velocity term as the first derivative of the x position of the measurement mass 309 as determined by the output Vx of the sense amplifier 405. The proportional controller 515 preferably generates a displacement term by applying a proportional constant to the output Vx of the sense amplifier 405. The output streams from the derivative controller 510 and the proportional controller 515 are preferably scaled as needed and received by the summer 525. The summer 525 preferably combines the output streams from the derivative controller 510 and the proportional controller 515 into a single output stream. During the OPERATING MODE 1, the OPERATING MODE 2, and the OPERATING MODE 3, the output stream from the summer 525 is preferably sent to the buffer 535. The buffer 535 preferably converts the output stream from the summer 525 into an output stream Vsum from the buffer 535. In a preferred embodiment, the output Vsum from the buffer 535 is applied to the plated 306 and 307 during the GRAVITY CANCELLATION STATE.

In a preferred embodiment, the loop filter 315 operates in the reduced-order mode while the system 100 switches from a system 100 start-up operating mode to the system 100 sigma-delta operating mode. In a preferred embodiment, the loop filter 315 further operates in the reduced-order mode for a predetermined amount of time after the system 100 switches into sigma-delta operating mode. The reduced-order loop filter 315 may, for example, reduce spurious instabilities that occur during the transition of the system 100 from the start-up operating mode to the sigma-delta operating mode.

Referring to FIG. 43, a method 4300 of providing control to the sensor system 100 will now be described. In a preferred embodiment, as illustrated in FIG. 43, the method 4300 of providing control to the sensor system 100 includes: determining the mode of operation of the sensor system 100 in step 4305, adjusting the mode of operation of the loop filter 315 in step 4310, providing feedback loop compensation to the sensor system 100 during the OPERATING MODE 1, the OPERATING MODE 2, the OPERATING MODE 3, and parts of the OPERATING MODE 4 in step 4315, and providing noise shaping to the sensor system 100 during parts of the OPERATING MODE 4 in step 4320.

In a preferred embodiment, in step 4305 the mode of operation of the sensor system 100 is determined. The system 100 may, for example, operate in a start-up mode (the OPERATING MODE 1, the OPERATING MODE 2, and the OPERATING MODE 3) or in a normal sigma-delta mode (the OPERATING MODE 4). In a preferred embodiment, the startup sequencer 325 is used to determine the operating mode of the sensor system 100. The startup sequencer 325 may determine the operating state of the system 100 using any number of methods suitable for determining the operating mode of the system 100. In a preferred embodiment, the startup sequencer 325 determines the operating state of the system 100 by using a state machine implemented in digital logic.

In a preferred embodiment, in step 4310 the startup sequencer 325 adjusts the mode of operation of the loop filter 315. The startup sequencer 325 may, for example, place the loop filter 315 in a reduced-order mode or allow the loop filter 315 to operate in normal operating mode. When the start-up sequencer 325 detects that the system 100 is in the OPERATING MODE 1, the OPERATING MODE 2, or the OPERATING MODE 3, the start-up sequencer 325 preferably sends a signal to the loop filter 315 that holds the integrators 505 within the loop filter 315 in reset and places the loop filter 315 in reduced-order mode.

The startup sequencer 325 may, for example, also signal the loop filter 315 to operate in the reduced-order mode when the system 100 is in normal sigma-delta mode during the OPERATING MODE 4. The loop filter 315 preferably holds the integrators 505 in reset when the loop filter 315 operates in the reduced-order mode. The integrators 505 are typically a source of instability within the system 100 because the integrators 505 tend to overload when the input into the system 100 exceeds a system 100 limit. By holding the integrators 505 in reset, the loop filter 315 preferably provides additional stability to the system 100 by eliminating a potential source of instability. Therefore, the loop filter 315 preferably operates in reduced-order mode while the system 100 operates in sigma-delta mode during the OPERATING MODE 4 to help the system 100 recover from an unexpected system 100 overload. In another preferred embodiment, the loop filter 315 operates in reduced-order mode while the system 100 is operating in sigma-delta mode during OPERATING MODE 4 to prevent instability within the system 100 when high input levels into the system 100 are expected.

The start-up sequencer 325 allows the loop filter 315 to operate in the normal operating mode when the start-up sequencer 325 detects that the system 100 is operating in normal sigma-delta mode during the OPERATING MODE 4 without high input levels or system 100 overloading. When the start-up sequencer 325 stops sending the signal to the loop filter 315, the loop filter 315 preferably takes the integrators 505 out of reset and operates in the normal operating mode.

In a preferred embodiment, in step 4315 feedback loop compensation is provided to the system 100. The feedback loop compensation may be provided using any number of methods suitable for supplying feedback loop compensation to the system 100. In a preferred embodiment, the feedback loop compensation is provided by the loop filter 315 when the loop filter 315 operates in the reduced-order mode. In a preferred embodiment, the startup sequencer 325 holds the integrators 505 in reset during the reduced-order operating mode, and the loop filter 315 provides feedback loop compensation to the system 100.

In a preferred embodiment, in step 4320 noise shaping is provided to the system 100. The noise shaping is preferably provided when the system 100 is operating in normal sigma-delta mode. The noise shaping may be provided using any number of methods of providing noise shaping to the system 100. In a preferred embodiment, the noise shaping is provided by the loop filter 315, which operates in normal operating mode when the system 100 operates in normal sigma-delta mode during the OPERATING MODE 4. In another preferred embodiment, the noise shaping is provided by the loop filter 315, which operates in reduced-order mode when the system 100 operates in normal sigma-delta mode during the OPERATING MODE 4. In a preferred embodiment, the loop filter 315 utilizes the integrators 505, the derivative controller 510, and the proportional controller 515 to supply noise shaping to the system 100.

Referring to FIGS. 44, 45a, 45b, 45c, 45d, 45e, 46, 47, 48, 49, and 50, a preferred embodiment of the operation of the multiphase clock generator 320 in the controller 206 will now be described. The multiphase clock generator 320 preferably provides clock signals that are used to control the switches phsu1, phsu2, phu1, phu2, phd1, phd2, phg1, phtc, phbc, phg2, phsg, phs, phf, phloop, phsim, phxbuf, phz, and pha in the front-end circuit 310.

Figure 44:
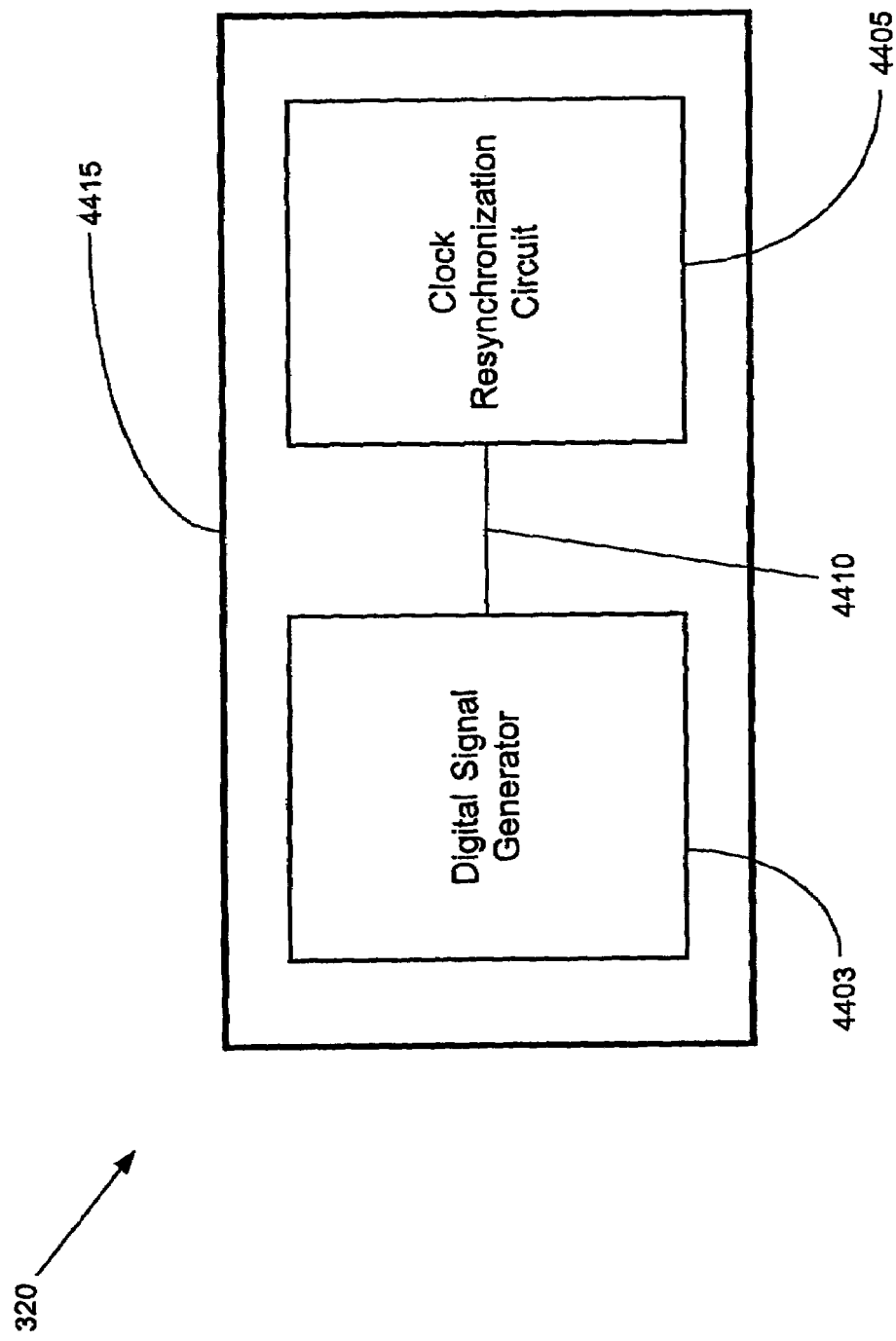
FIG. 44 illustrates a preferred embodiment of the multiphase clock generator of FIG. 6.
Figure 45A:
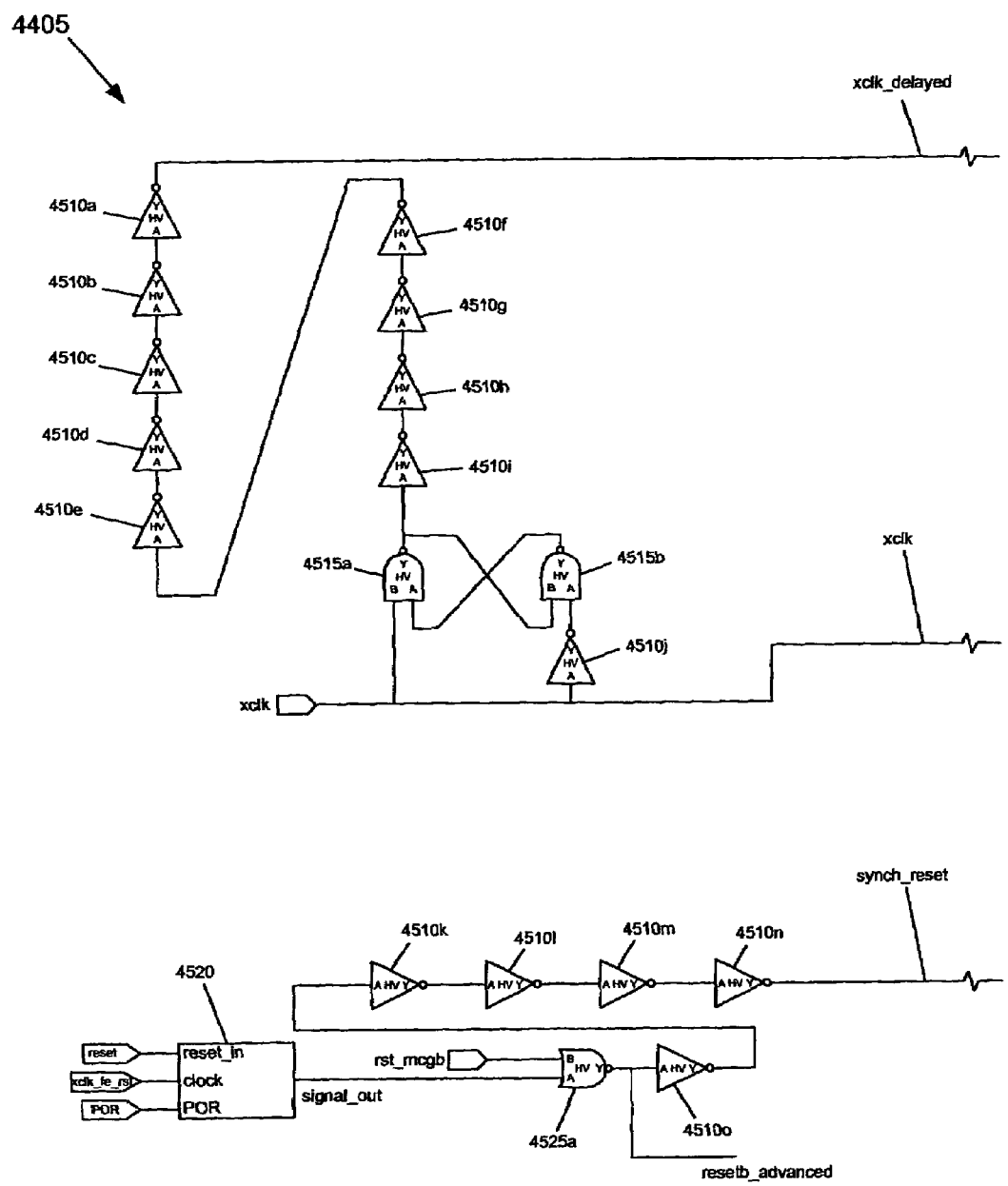
FIG. 45a illustrates a portion of an embodiment of a clock resynchronization circuit used in the multiphase clock generator of FIG. 44.
Figure 45B:
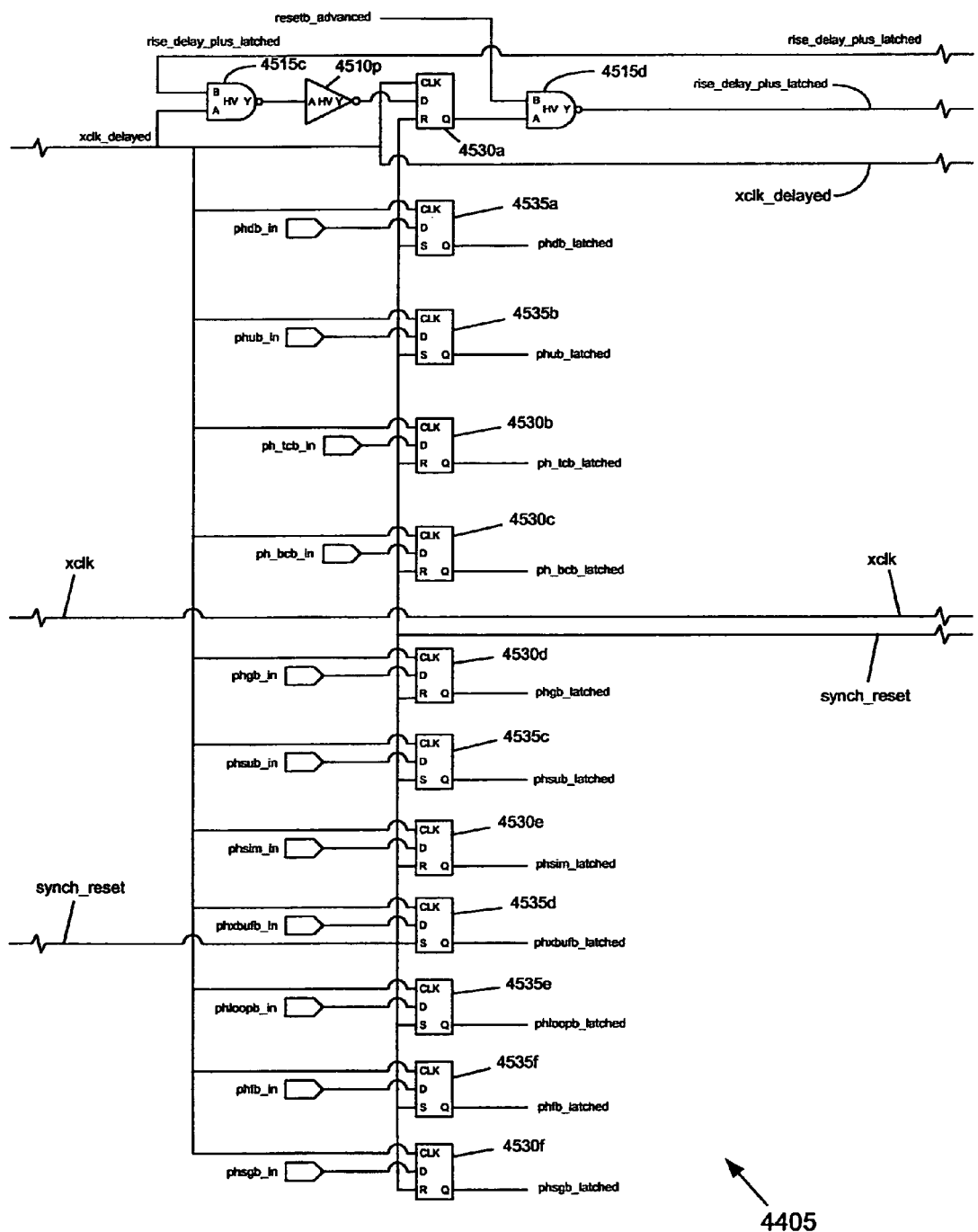
Figure 45C:
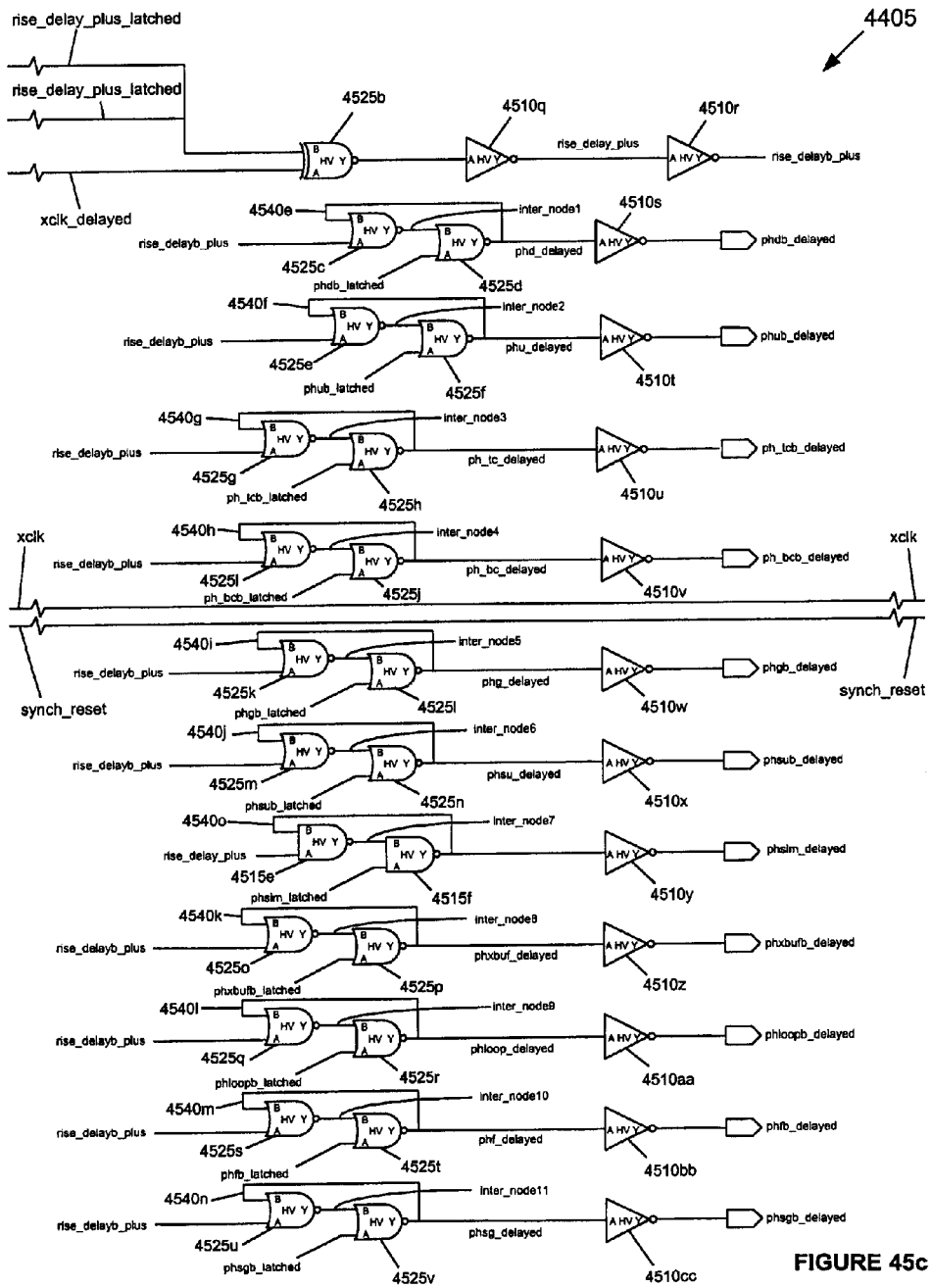
Figure 45D:
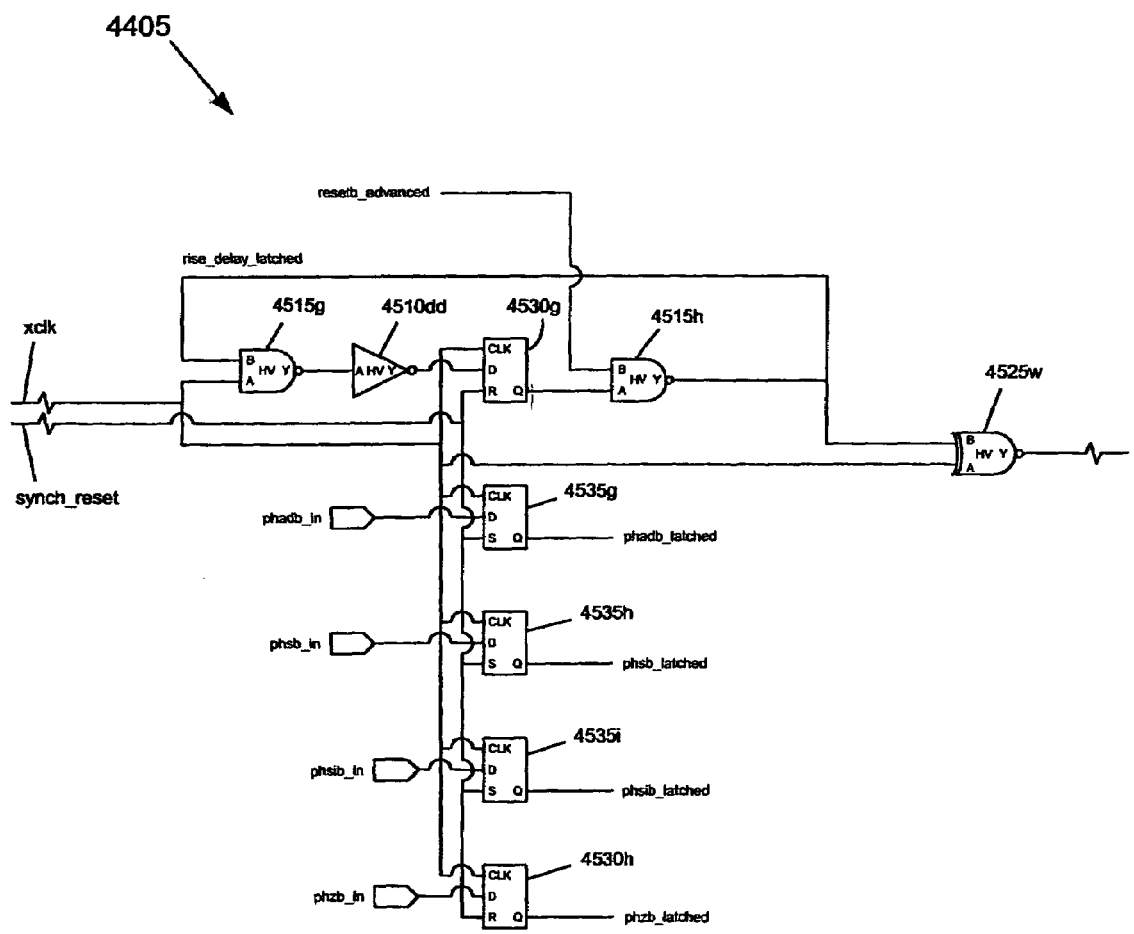
Figure 45E:
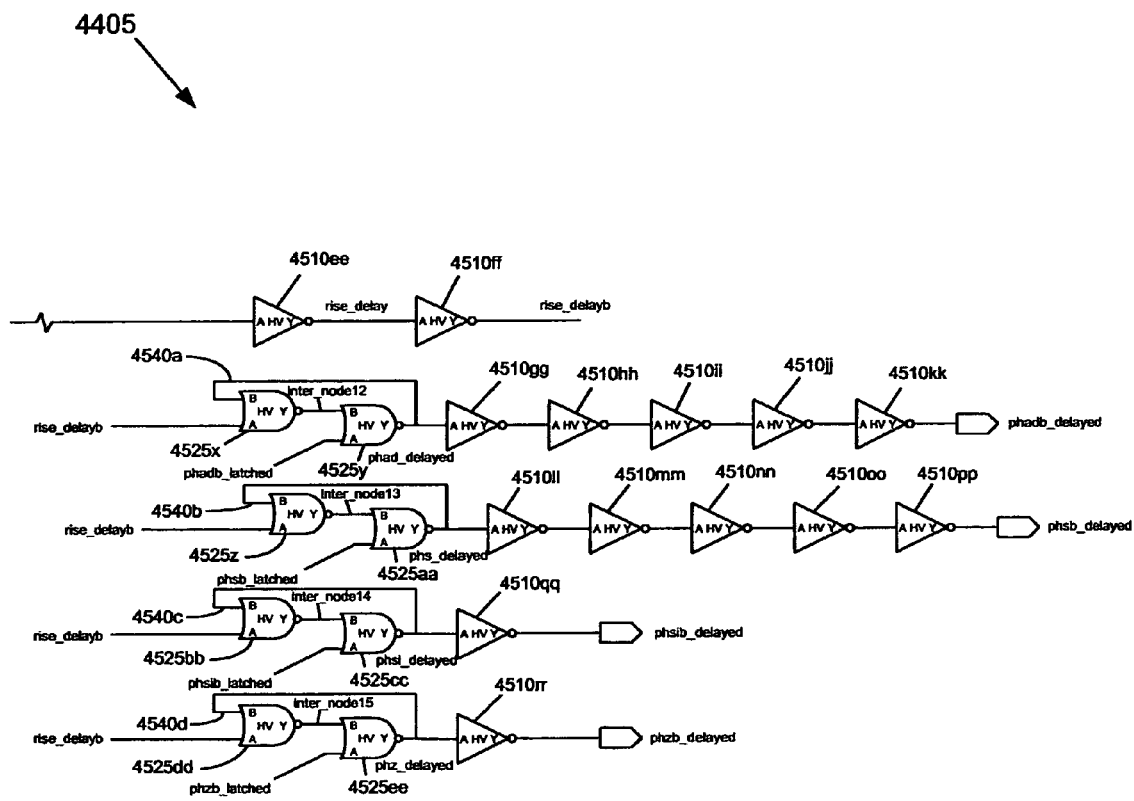

In a preferred embodiment, as illustrated in FIG. 44, the multiphase clock generator 320 includes a digital signal generator 4403, a clock resynchronization circuit 4405, a communication interface 4410, and a substrate 4415.

The digital signal generator 4403 preferably generates original clock signals. In a preferred embodiment, the digital signal generator 4403 is positioned on the substrate 4415. The digital signal generator 4403 is preferably operably coupled to the clock resynchronization circuit 4405 by the communication interface 4410. The digital signal generator 4403 may include any number of conventional commercially available signal generators suitable for generating clock signals for the sensor system 100 such as, for example, a state machine, a mux decoder, or a digital decoder. In a preferred embodiment, the digital signal generator 4403 is a state machine.

In a preferred embodiment, the clock resynchronization circuit 4405 resamples the clock signals generated by the digital signal generator 4403 using a delayed clock reference for the front-end circuit 310. The clock resynchronization circuit 4405 is preferably positioned on the substrate 4415. In a preferred embodiment, the clock resynchronization circuit 4405 is operably coupled to the digital signal generator 4403 by the communication interface 4410. The clock resynchronization circuit 4405 may include any number of circuits suitable for resampling the clock signals used to control the switches phsu1, phsu2, phu1, phu2, phd1, phd2, phg1, phtc, phbc, phg2, phsg, phs, phf, phloop, phsim, phxbuf, phz, and pha in the front-end circuit 310. In a preferred embodiment, as illustrated in FIGS. 45a, 45b, 45c, 45d, and 45e, the clock resynchronization circuit 4405 includes a signal generator 4520, inverters 4510a, 4510b, 4510c, 4510d, 4510e, 4510f, 4510g, 4510h, 4510i, 4510j, 4510k, 4510l, 4510m, 4510n, 4510o, 4510p, 4510q, 4510r, 4510s, 4510t, 4510u, 4510v, 4510w, 4510x, 4510y, 4510z, 4510aa, 4510bb, 4510cc, 4510dd, 4510ee, 4510ff, 4510gg, 4510hh, 4510ii, 4510jj, 4510kk, 4510ll, 4510mm, 4510nn, 4510oo, 4510pp, 4510qq, and 4510rr, NAND Gates 4515a, 4515b, 4515c, 4515d, 4515e, 4515f, 4515g, and 4515h, NOR Gates 4525a, 4525c, 4525d, 4525e, 4525f, 4525g, 4525h, 4525i, 4525j, 4525k, 4525l, 4525m, 4525n, 4525o, 4525p, 4525q, 4525r, 4525s, 4525t, 4525u, 4525v, 4525x, 4525y, 4525z, 4525aa, 4525bb, 4525cc, 4525dd, and 4525ee, XNOR gates 4525b and 4525w, asynchronous reset double edge flip-flops 4530a, 4530b, 4530c, 4530d, 4530e, 4530f, 4530g, and 4530h, and asynchronous set double edge flip-flops 4535a, 4535b, 4535c, 4535d, 4535e, 4535f, 4535g, 4535h, and 4535i.

The signal generator 4520 preferably receives one or more input signals and generates an output signal signal_out for use in the clock resynchronization circuit 4405. The signal generator 4520 may include any number of signal generators suitable for use in the clock resynchronization circuit 4405. In a preferred embodiment, the signal generator 4520 is a complimentary metal oxide semiconductor (CMOS).

The inverters 4510a, 4510b, 4510c, 4510d, 4510e, 4510f, 4510g, 4510h, 4510i, 4510j, 4510k, 4510l, 4510m, 4510n, 4510o, 4510p, 4510q, 4510r, 4510s, 4510t, 4510u, 4510v, 4510w, 4510x, 4510y, 4510z, 4510aa, 4510bb, 4510cc, 4510dd, 4510ee, 4510ff, 4510gg, 4510hh, 4510ii, 4510jj, 4510kk, 4510ll, 4510mm, 4510nn, 4510oo, 4510pp, 4510qq, and 4510rr are preferably used to achieve an appropriate drive strength for different switch loads and metal trace loads on the substrate 4415. The inverters 4510a, 4510b, 4510c, 4510d, 4510e, 4510f, 4510g, 4510h, 4510i, 4510j, 4510k, 4510l, 4510m, 4510n, 4510o, 4510p, 4510q, 4510r, 4510s, 4510t, 4510u, 4510v, 4510w, 4510x, 4510y, 4510z, 4510aa, 4510bb, 4510cc, 4510dd, 4510ee, 4510ff, 4510gg, 4510hh, 4510ii, 4510jj, 4510kk, 4510ll, 4510mm, 4510nn, 4510oo, 4510pp, 4510qq, and 4510rr may be any number of conventional commercially available inverters suitable for use in the clock resynchronization circuit 4405. In a preferred embodiment, the inverters 4510a, 4510b, 4510c, 4510d, 4510e, 4510f, 4510g, 4510h, 4510i, 4510j, 4510k, 4510l, 4510m, 4510n, 4510o, 4510p, 4510q, 4510r, 4510s, 4510t, 4510u, 4510v, 4510w, 4510x, 4510y, 4510z, 4510aa, 4510bb, 4510cc, 4510dd, 4510ee, 4510ff, 4510gg, 4510hh, 4510ii, 4510jj, 4510kk, 4510ll, 4510mm, 4510nn, 4510oo, 4510pp, 4510qq, and 4510rr are CMOS.

The NAND Gates 4515a, 4515b, 4515c, 4515d, 4515e, 4515f, 4515g, and 4515h are preferably used to perform a required digital functionality within the clock resynchronization circuit 4405. The NAND Gates 4515a, 4515b, 4515c, 4515d, 4515e, 4515f, 4515g, and 4515h may be any number of conventional commercially available NAND gates suitable for use in the clock resynchronization circuit 4405. In a preferred embodiment, the NAND Gates 4515a, 4515b, 4515c, 4515d, 4515e, 4515f, 4515g, and 4515h are CMOS.

The NOR Gates 4525a, 4525c, 4525d, 4525e, 4525f, 4525g, 4525h, 4525i, 4525j, 4525k, 4525l, 4525m, 4525n, 4525o, 4525p, 4525q, 4525r, 4525s, 4525t, 4525u, 4525v, 4525x, 4525y, 4525z, 4525aa, 4525bb, 4525cc, 4525dd, and 4525ee are preferably used to perform a required digital functionality within the clock resynchronization circuit 4405. The NOR Gates 4525a, 4525c, 4525d, 4525e, 4525f, 4525g, 4525h, 4525i, 4525j, 4525k, 4525l, 4525m, 4525n, 4525o, 4525p, 4525q, 4525r, 4525s, 4525t, 4525u, 4525v, 4525x, 4525y, 4525z, 4525aa, 4525bb, 4525cc, 4525dd, and 4525ee may be any number of conventional commercially available NOR gates suitable for use in the clock resynchronization circuit 4405. In a preferred embodiment, the NOR Gates 4525a, 4525c, 4525d, 4525e, 4525f, 4525g, 4525h, 4525i, 4525j, 4525k, 4525l, 4525m, 4525n, 4525o, 4525p, 4525q, 4525r, 4525s, 4525t, 4525u, 4525v, 4525x, 4525y, 4525z, 4525aa, 4525bb, 4525cc, 4525dd, and 4525ee are CMOS.

The XNOR Gates 4525b and 4525w are preferably used to perform a required digital functionality within the clock resynchronization circuit 4405. The XNOR Gates 4525b and 4525w may be any number of conventional commercially available XNOR gates suitable for use in the clock resynchronization circuit 4405. In a preferred embodiment, the XNOR Gates 4525b and 4525w are CMOS.

Figure 46:
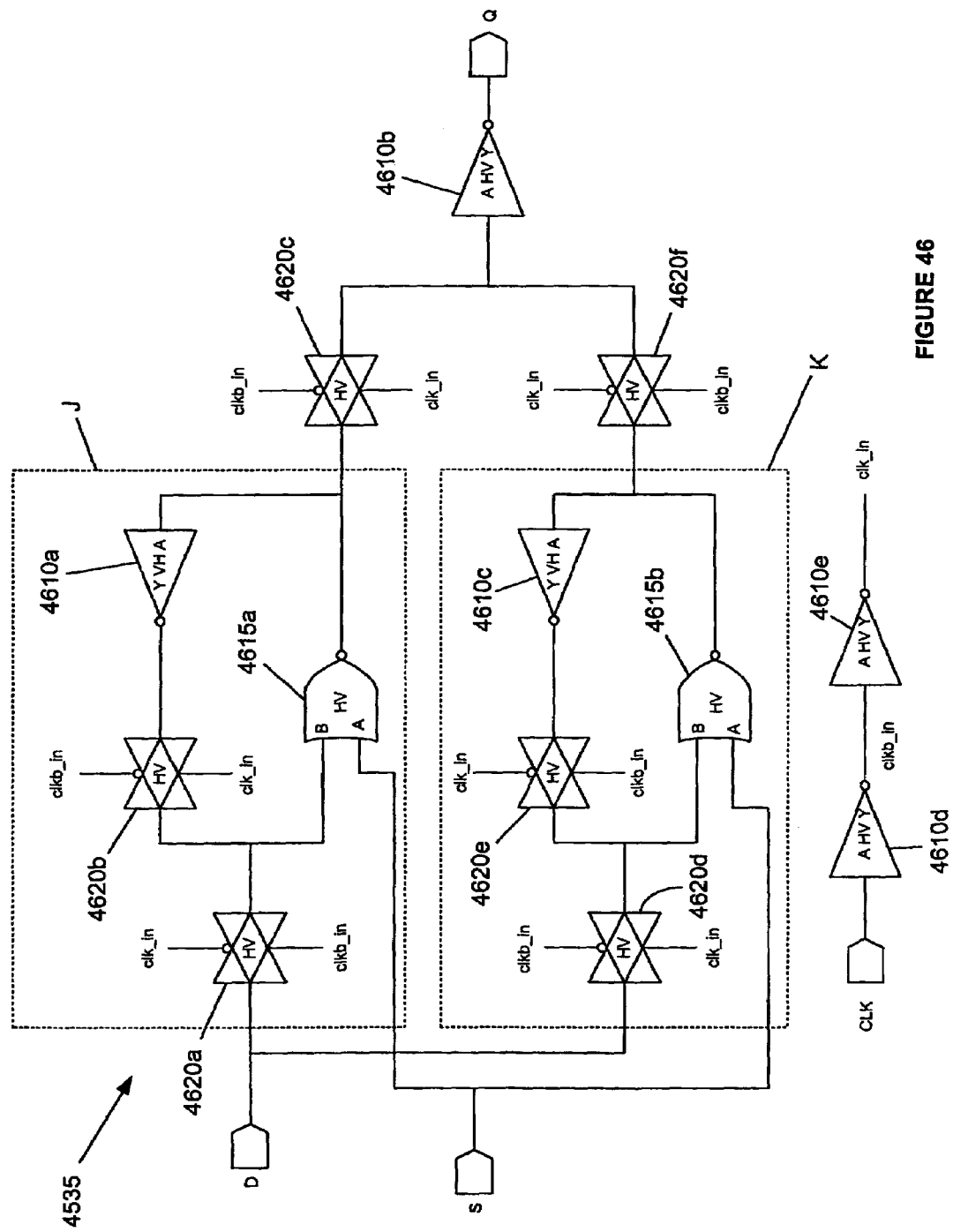
FIG. 46 illustrates an embodiment of a set dual edge flip-flop used in the multiphase clock generator of FIG. 44.

The asynchronous set double edge flip-flops 4535a, 4535b, 4535c, 4535d, 4535e, 4535f, 4535g, 4535h, and 4535i are preferably D flip-flops that pass data on both clock edges with asynchronous set inputs. In a preferred embodiment, the asynchronous set double edge flip-flops 4535a, 4535b, 4535c, 4535d, 4535e, 4535f, 4535g, 4535h, and 4535i are used to resample clock signals. The asynchronous set double edge flip-flops 4535a, 4535b, 4535c, 4535d, 4535e, 4535f, 4535g, 4535h, and 4535i preferably allow the clock resynchronization circuit 4405 to clock data through the circuit 4405 at approximately twice the speed of a conventional single-edge flip-flop. In a preferred embodiment, as illustrated in FIG. 46, the asynchronous set double edge flip-flops 4535a, 4535b, 4535c, 4535d, 4535e, 4535f, 4535g, 4535h, and 4535i include inverters 4610a, 4610b, 4610c, 4610d, and 4610e, NOR Gates 4615a and 4615b, and transmission gates 4620a, 4620b, 4620c, 4620d, 4620e, and 4620f.

The inverters 4610a, 4610b, 4610c, 4610d, and 4610e may be any number of inverters suitable for use in the asynchronous set double edge flip-flops 4535a, 4535b, 4535c, 4535d, 4535e, 4535f, 4535g, 4535h, and 4535i. In a preferred embodiment, the inverters 4610a, 4610b, 4610c, 4610d, and 4610e are CMOS.

The NOR gates 4615a and 4615b may be any number of NOR gates suitable for use in the asynchronous set double edge flip-flops 4535a, 4535b, 4535c, 4535d, 4535e, 4535f, 4535g, 4535h, and 4535i. In a preferred embodiment, the NOR gates 4615a and 4615b are CMOS.

The transmission gates 4620a, 4620b, 4620c, 4620d, 4620e, and 4620f may be any number of transmission gates suitable for use in the asynchronous set double edge flip-flops 4535a, 4535b, 4535c, 4535d, 4535e, 4535f, 4535g, 4535h, and 4535i. In a preferred embodiment, the transmission gates 4620a, 4620b, 4620c, 4620d, 4620e, and 4620f are CMOS.

Figure 47:
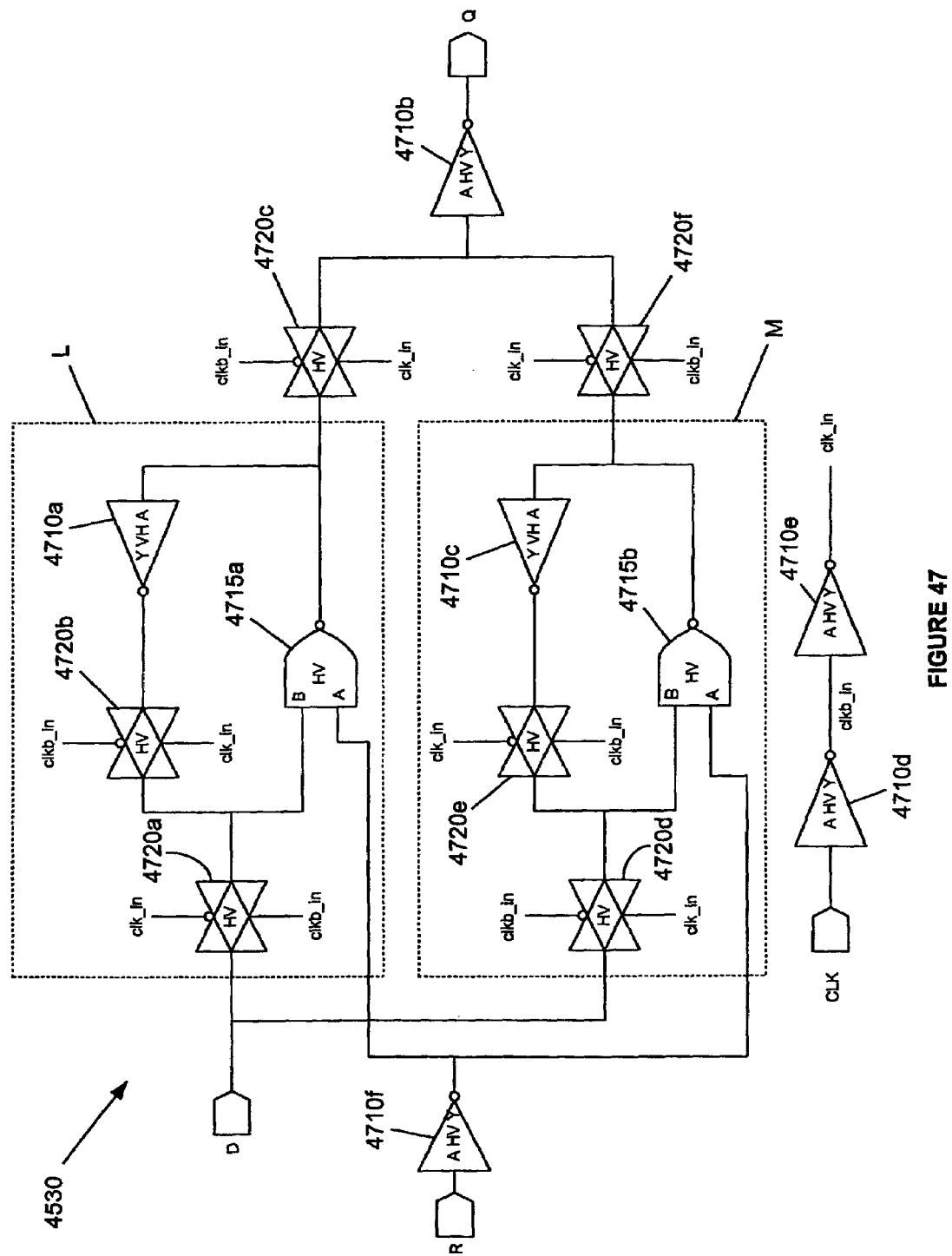
FIG. 47 illustrates an embodiment of a reset dual edge flip-flop used in the multiphase clock generator of FIG. 44.

The asynchronous reset double edge flip-flops 4530a, 4530b, 4530c, 4530d, 4530e, 4530f, 4530g, and 4530h are preferably D flip-flops that pass data on both clock edges with asynchronous reset inputs. In a preferred embodiment, the asynchronous reset double edge flip-flops 4530a, 4530b, 4530c, 4530d, 4530e, 4530f, 4530g, and 4530h are used to resample clock signals. The asynchronous reset double edge flip-flops 4530a, 4530b, 4530c, 4530d, 4530e, 4530f, 4530g, and 4530h preferably allow the clock resynchronization circuit 4405 to clock data through the circuit at approximately twice the speed of a normal single-edge flip-flop. In a preferred embodiment, as illustrated in FIG. 47, the asynchronous reset double edge flip-flops 4530a, 4530b, 4530c, 4530d, 4530e, 4530f, 4530g, and 4530h include inverters 4710a, 4710b, 4710c, 4710d, 4710e, and 4710f, NAND Gates 4715a and 4715b, and transmission gates 4720a, 4720b, 4720c, 4720d, 4720e, and 4720f.

The inverters 4710a, 4710b, 4710c, 4710d, 4710e, and 4710f may be any number of inverters suitable for use in the asynchronous reset double edge flip-flops 4530a, 4530b, 4530c, 4530d, 4530e, 4530f, 4530g, and 4530h. In a preferred embodiment, the inverters 4710a, 4710b, 4710c, 4710d, 4710e, and 4710f are CMOS.

The NAND Gates 4715a and 4715b may be any number of NAND gates suitable for use in the asynchronous reset double edge flip-flops 4530a, 4530b, 4530c, 4530d, 4530e, 4530f, 4530g, and 4530h. In a preferred embodiment the NAND Gates 4715a and 4715b are CMOS.

The transmission gates 4720a, 4720b, 4720c, 4720d, 4720e, and 4720f may be any number of transmission gates suitable for use in the asynchronous reset double edge flip-flops 4530a, 4530b, 4530c, 4530d, 4530e, 4530f, 4530g, and 4530h. In a preferred embodiment, the transmission gates 4720a, 4720b, 4720c, 4720d, 4720e, and 4720f are CMOS.

The various components within the clock resynchronization circuit 4405 may interact to perform any number of functions.

In a preferred embodiment, the signal generator 4520 receives one or more input signals and generates an output signal signal_out for use in the clock resynchronization circuit 4405. The signal generator 4520 may receive any number of input signals. In a preferred embodiment, the input signals into the signal generator 4520 include an input reset signal POR from a power-on reset circuit, an input reset signal reset from a state sequencer, and an input clock signal xclk_fe_rst. The output signal signal_out from the signal generator 4520 is preferably sent to the NOR gate 4525a along with a signal rst_mcgb. The signal rst_mcgb is preferably a reset signal generated by the multiphase clock generator 320. The NOR gate 4525a preferably processes the input signals signal_out and rst_mcgb to create an output signal resetb_advanced. In a preferred embodiment, the output signal resetb_advanced is sent to the NAND gates 4515d and 4515h. In another preferred embodiment, the output signal resetb_advanced is sent to the inverters 4510o, 4510k, 4510l, 4510m, and 4510n. The inverters 4510o, 4510k, 4510l, 4510m, and 4510n preferably strengthen the drive capability of the output signal resetb_advanced to create an input signal synch_reset for the asynchronous set double edge flip-flops 4535a, 4535b, 4535c, 4535d, 4535e, 4535f, 4535g, 4535h, and 4535i and the asynchronous reset double edge flip_flops 4530a, 4530b, 4530c, 4530d, 4530e, 4530f, 4530g, and 4530h. The input signal synch_reset preferably resets the asynchronous reset double edge flip_flops 4530a, 4530b, 4530c, 4530d, 4530e, 4530f, 4530g, and 4530h and sets the asynchronous set double edge flip-flops 4535a, 4535b, 4535c, 4535d, 4535e, 4535f, 4535g, 4535h, and 4535i on a rising edge of the input clock signal xclk_fe_rst. The input signal synch_reset preferably releases the asynchronous reset double edge flip-flops 4530a, 4530b, 4530c, 4530d, 4530e, 4530f, 4530g, and 4530h and the asynchronous set double edge flip_flops 4535a, 4535b, 4535c, 4535d, 4535e, 4535f, 4535g, 4535h, and 4535i on a falling edge of the input dock signal xclk_fe_rst.

In a preferred embodiment, the NAND gates 4515g and 4515h, the inverters 4510dd, 4510ee, and 4510ff, the asynchronous reset double edge flip-flop 4530g, and the XNOR gate 4525w within the clock resynchronization circuit 4405 interact to generate constant width pulses rise_delay and rise_delayb. The constant width pulses rise_delay and rise_delayb are preferably generated using a clock signal XCLK The clock signal XCLK may be any number of clock signals suitable for use in the clock resynchronization circuit 4405. In a preferred embodiment, the clock signal XCLK is 2 MHZ clock signal with a 50% duty cycle. The constant width pulses rise_delay and rise_delayb may be any number of constant width pulses suitable for use in the clock resynchronization circuit 4405.

The width of the constant width pulses rise_delay and rise_delayb may be determined by any number of factors that influence the width of constant width pulses. In a preferred embodiment, the widths of the constant width pulses rise_delay and rise_delayb are determined by a propagation delay through the asynchronous reset double edge flip-flop 4530g and the NAND gate 4515h. The propagation delay may be increased as needed to increase the width of the constant width pulses rise_delay and rise_delayb. In a preferred embodiment, the propagation delay is increased by adding additional delay buffers at an input A of the NAND gate 4515h. The XNOR gate 4525w preferably ensures that the constant width pulse rise_delay returns to the previous level after the completion of the propagation delay.

During the generation of the constant width pulses rise_delay and rise delayb, a feedback wire rise_delay_latched is preferably sent back from the NAND gate 4515h to an input B into the NAND gate 4515g and the inverter 4510dd. The feedback wire rise_delay_latched is preferably used to prepare an input D into the asynchronous reset double edge flip-flop 4530g to receive the next clock edge. The next clock edge may include any number of clock edges suitable for use in the clock resynchronization circuit 4405. In a preferred embodiment, the next clock edge is configured in the opposite direction of the previous clock edge received by the asynchronous reset double edge flip-flop 4530g.

Figure 48:
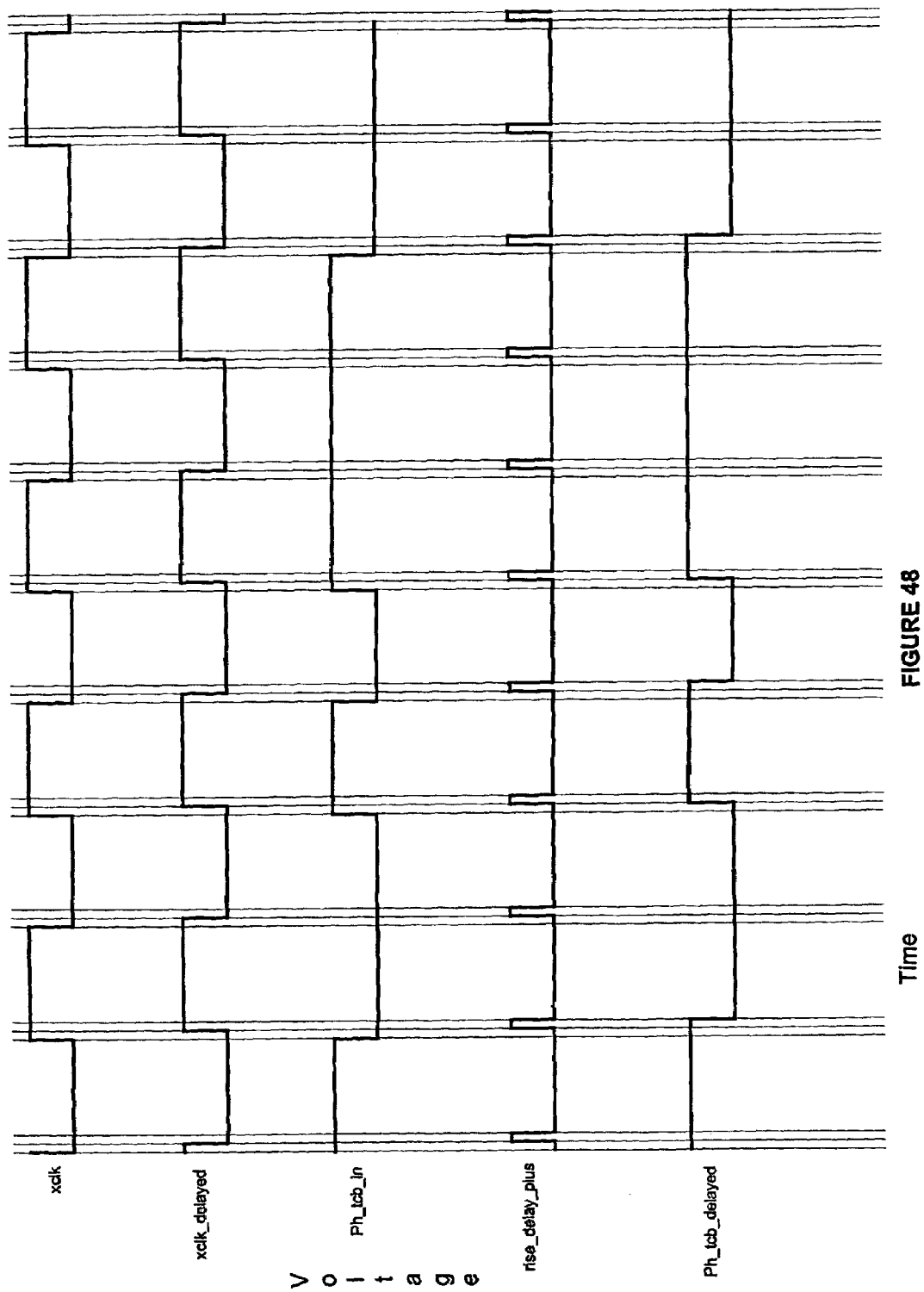
Figure 49:
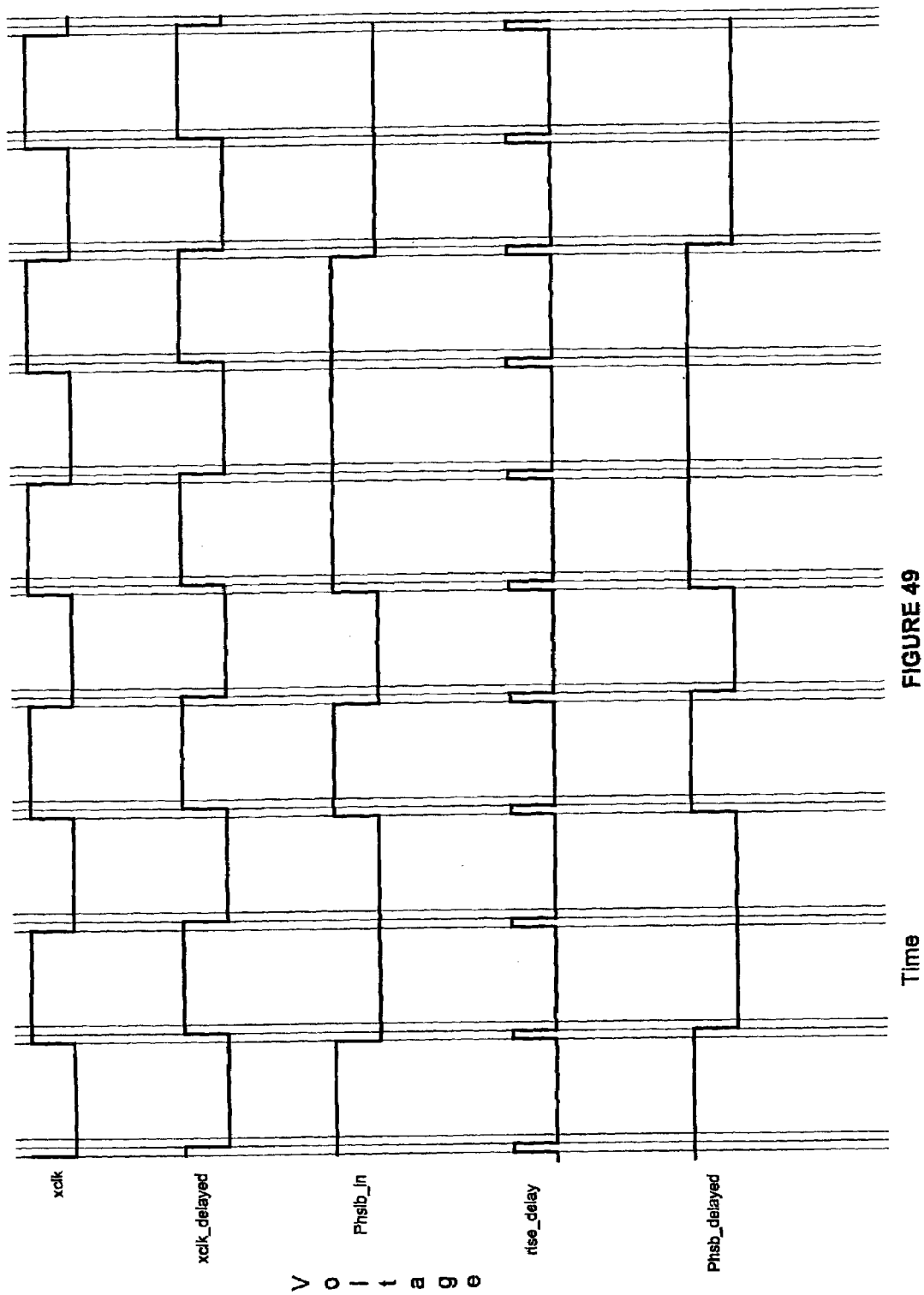

In a preferred embodiment, the NAND gates 4515c and 4515d, the inverters 4510p, 4510q, and 4510r, the asynchronous reset double edge flip-flop 4530a, and the XNOR gate 4525b interact to generate constant width delay pulses rise_delay plus and rise_delayb_plus. The constant width delay pulses rise_delay_plus and rise_delayb_plus are preferably generated using a clock XCLK_delayed. The clock XCLK_delayed may be any number of clocks suitable for use in the dock resynchronization circuit 4405. In a preferred embodiment, as illustrated in FIGS. 48 and 49, the clock XCLK_delayed is further delayed from the clock reference XCLK The extra clock delay may be generated using any method for creating an extra clock delay. In a preferred embodiment, the extra clock delay is generated by feeding the clock signal XCLK through the NAND gates 4515a and 4515b and the inverters 4510a, 4510b, 4510c, 4510d, 4510e, 4510f, 4510g, 4510h, 4510i, and 4510j. The extra clock delay preferably allows the two sets of constant delayed non-overlapping clocks XCLK and XCLK_delayed to be generated on each clock edge of an input clock. The two sets of constant delayed clocks XCLK and XCLK_delayed are preferably used to achieve the clocking scheme utilized in the front-end circuit 310.

The constant width pulses rise_delay and rise_delayb and the constant width delay pulses rise_delay_plus and rise_delayb_plus may be utilized for any suitable purpose within the clock resynchronization circuit 4405. In a preferred embodiment, the constant width pulses rise_delay and rise_delayb and the constant width delay pulses rise_delay plus and rise_delayb plus are preferably utilized to ensure that the switches within the front-end circuit 310 have adequate time to turn off before additional switches within the front-end circuit 310 are turned on.

In a preferred embodiment, the clock resynchronization circuit 4405 further receives input clock signals phadb_in, phsb_in, phsib_in, and phzb_in from the multiphase clock generator 4403. The input clock signals phadb_in, phsb_in, phsib_in, and phzb_in may be used for any suitable purpose within the clock resynchronization circuit 4405. In a preferred embodiment, the input clock signals phadb_in, phsb_in, phsib_in, and phzb_in are latched in the double edge flip-flops 4535g, 4535h, 4535i, and 4530h, respectively, on every rising edge and falling edge of the input dock signal XCLK to create latched clock signals phadb_latched, phsb_latched, phsib_latched, and phzb_latched. In a preferred embodiment, the input clock signals phadb_in, phsb_in, phsib_in, and phzb_in are latched in the double edge flip-flops 4535g, 4535h, 4535i, and 4530h to remove glitches from the input clock signals phadb_in, phsb_in, phsib_in, and phzb_in.

The latched clock signals phadb_latched, phsb_latched, phsib_latched, and phzb_latched may be used for any suitable purpose within the clock resynchronization circuit 4405. In a preferred embodiment, the latched clock signals phadb_latched, phsb_latched, phsib_latched, and phzb_latched provide stable signals for the clock resynchronization circuit 4405. In a preferred embodiment, the latched clock signals phadb_latched, phsb_latched, phsib_latched, and phzb_latched are sent to NOR gate feedback pairs 4525x and 4525y, 4525z and 4525aa, 4525bb and 4525cc, and 4525dd and 4525ee, respectively, along with the constant width pulse rise_delayb. The NOR gate feedback pairs 4525x and 4525y, 4525z and 4525aa, 4525bb and 4525cc, and 4525dd and 4525ee, preferably convert the latched input signals phadb_latched, phsb_latched, phsib_latched, and phzb_latched into signals phadb_delayed, phs_delayed, phsi_delayed, and phzb_delayed. The signals phad_delayed, phs_delayed, phsi_delayed, and phz_delayed are preferably processed within the clock resynchronization circuit 4405 to create the output signals phadb_delayed, phsb_delayed, phsib_delayed, and phzb_delayed. The output signals phadb_delayed, phsib_delayed, and phzb_delayed are preferably used by the clock resynchronization circuit 4405 to control the switches pha, phs, and phz, respectively, in the front-end circuit 310. The NOR gate feedback pairs 4525x and 4525y, 4525z and 4525aa, 4525bb and 4525cc, and 4525dd and 4525ee preferably utilize the constant width pulse rise delayb to ensure that the output signals phadb_delayed, phsib_delayed, and phzb_delayed turn off the switches pha, phs, and phz in the front-end circuit 310, if required, before the clock resynchronization circuit 4405 sends one or more signals to turn on switches within the front-end circuit 310. In a preferred embodiment, the latched clock signals phadb_latched, phsb_latched, phsib_latched, and phzb_latched are sent to an input A into the NOR gates 4525y, 4525aa, 4525cc, and 4525ee within the NOR gate feedback pairs 4525x and 4525y, 4525z and 4525aa, 4525bb and 4525cc, and 4525dd and 4525ee, respectively. Additionally, signals inter_node12, inter_node13, inter_node14, and inter_node15 are preferably sent from an output Y of the NOR gates 4525x, 4525z, 4525bb, and 4525dd to an input B into the NOR gates 4525y, 4525aa, 4525cc, and 4525ee, respectively. The signals inter_node12, inter_node13, inter_node14, and inter_node15 may be any number of signals suitable for use in the clock resynchronization circuit 4405. The NOR gates 4525y, 4525aa, 4525cc, and 4525ee preferably process the latched clock signals phadb_latched, phsb_latched, phsib_latched, and phzb_latched along with the signals inter_node12, inter_node13, inter_node14, and inter_node15 to create the signals phad_delayed, phs_delayed, phsi_delayed, and phz_delayed.

During the processing of the latched input signals phadb_latched, phsb_latched, phsib_latched, and phzb_latched, feedback signals 4540a, 4540b, 4540c, and 4540d are preferably sent from the NOR gates 4525y, 4525aa, 4525cc, and 4525ee to the NOR gates 4525x, 4525z, 4525bb, and 4525dd, respectively. The feedback signals 4540a, 4540b, 4540c, and 4540d preferably correspond to the signals phad_delayed, phs_delayed, phsi_delayed, and phz_delayed. The feedback signals 4540a, 4540b, 4540c, and 4540d from the NOR gates 4525y, 4525aa, 4525cc, 4525ee to the NOR gates 4525x, 4525z, 4525bb, and 4525dd may be utilized for any suitable purpose within the clock resynchronization circuit 4405. In a preferred embodiment, the feedback signals 4540a, 4540b, 4540c, and 4540d are provided to ensure that switches within the front-end circuit 310 remain unchanged when the current latched input signals phadb_latched, phsb_latched, phsib_latched, and phzb_latched to the NOR gates 4525y, 4525aa, 4525cc, and 4525ee are the same as the previous latched input signals phadb_latched, phsb_latched, phsib_latched, and phzb_latched to the NOR gates 4525y, 4525aa, 4525cc, and 4525ee.

In a preferred embodiment, the clock resynchronization circuit 4405 further receives input clock signals phdb_in, phub_in, ph_tcb_in, ph_bcb_in, phgb_in, phsub_in, phsim_in, phxbufb_in, phloopb_in, phfb_in, and phsgb_in from the digital signal generator 4403. The input clock signals phdb_in, phub_in, ph_tcb_in, ph_bcb_in, phgb_in, phsub_in, phsim_in, phxbufb_in, phloopb_in, phfb_in, and phsgb_in may be used for any suitable purpose within the clock resynchronization circuit 4405. In a preferred embodiment, the input clock signals phdb_in, phub_in, ph_tcb_in, ph_bcb_in, phgb_in, phsub_in, phsim_in, phxbufb_in, phloop_in, phfb_in, and phsgb_in are latched in the double edge flip-flops 4535a, 4536b, 4530b, 4530c, 4530d, 4535c, 4530e, 4535d, 4535e, 4535f, and 4530f, respectively, on every rising and falling edge of the clock signal XCLK_delayed to create latched clock signals phdb_latched, phub_latched, ph_tcb_latched, ph_bcb_latched, phgb_latched, phsub_latched, phsim_latched, phxbufb_latched, phloopb_latched, phfb_latched, and phsgb_latched.

The latched clock signals phdb_latched, phub_latched, ph_tcb_latched, ph_bcb_latched, phgb_latched, phsub_latched, phsim_latched, phxbufb_latched, phloopb_latched, phfb_latched, and phsgb_latched may be used for any suitable purpose within the clock resynchronization circuit 4405. In a preferred embodiment, the latched signals phdb_latched, phub_latched, ph_tcb_latched, ph_bcb_latched, phgb_latched, phsub_latched, phxbufb_latched, phloopb_latched, phfb_latched, and phsgb_latched are sent to NOR gate feedback pairs 4525c and 4525d, 4525e and 4525f, 4525g and 4525h, 4525i and 4525j, 4525k and 4525l, 4525m and 4525n, 4525o and 4525p, 4525q and 4525r, 4525s and 4525t, and 4525u and 4525v, respectively, along with the constant width pulse rise_delayb_plus. The NOR gate feedback pairs 4525c and 4525d, 4525e and 4525f, 4525g and 4525h, 4525i and 4525j, 4525k and 4525l, 4525m and 4525n, 4525o and 4525p, 4525q and 4525r, 4525s and 4525t, and 4525u and 4525v preferably convert the latched input signals phdb_latched, phub_latched, ph_tcb_latched, ph_bcb_latched, phgb_latched, phsub_latched, phxbufb_latched, phloopb_latched, phfb_latched, and phsgb_latched into signals phd_delayed, phu_delayed, ph_tc_delayed, ph_bc_delayed, phg_delayed, phsu_delayed, phxbuf_delayed, phloop_delayed, phf_delayed, and phsg_delayed. The signals phd_delayed, phu_delayed, ph_tc_delayed, ph_bc_delayed, phg_delayed, phsu_delayed, phxbuf_delayed, phloop_delayed, phf_delayed, and phsg_delayed are then preferably processed within the clock resynchronization circuit 4405 to create the output signals phdb_delayed, phub_delayed, ph_tcb_delayed, ph_bcb_delayed, phgb_delayed, phsub_delayed, phxbufb_delayed, phloopb_delayed, phfb_delayed, and phsgb_delayed. The clock resynchronization circuit 4405 preferably uses the output signals phdb_delayed, phub_delayed, ph_tcb_delayed, ph_bcb_delayed, phgb_delayed, phsub_delayed, phxbufb_delayed, phloopb_delayed, phfb_delayed, and phsgb_delayed to control the switches phd1 and phd2, phu1 and phu2, phtc, phbc, phg1 and phg2, phsu1 and phsu2, phxbuf, phloop, phf, and phsg, respectively, in the front-end circuit 310. In a preferred embodiment, the latched clock signal phsim_latched is sent to a NAND gate feedback pair 4515e and 4515f along with the constant width delay pulse rise_delay_plus. The NAND gate feedback pair 4515e and 4515f preferably converts the latched signal phsim_latched into the output signal phsim_delayed. The output signal phsim_delayed is preferably used by the clock resynchronization circuit 4405 to control the switch phsim_in the front-end circuit 310. The NOR gate feedback pairs 4525c and 4525d, 4525e and 4525f, 4525g and 4525h, 4525i and 4525j, 4525k and 4525l, 4525m and 4525n, 4525o and 4525p, 4525q and 4525r, 4525s and 4525t, and 4525u and 4525v, preferably utilize the constant width pulse rise_delayb_plus to ensure that the output signals phdb_delayed, phub_delayed, ph_tcb_delayed, ph_bcb_delayed, phgb_delayed, phsub_delayed, phxbufb_delayed, phloopb_delayed, phfb_delayed, and phsgb_delayed turn off the relevant switches in the front-end circuit 310 before the clock resynchronization circuit 4405 sends a signal to turn on relevant switches within the front-end circuit 310. The NAND gate feedback pair 4515e and 4515f preferably utilizes the constant width delay pulse rise_delay_plus to ensure that the output signal phsim_delayed turns off the relevant switch in the front-end circuit 310 before the clock resynchronization circuit 4405 sends a signal to turn on other relevant switches within the front-end circuit 310.

In a preferred embodiment, the latched clock signals phdb_latched, phub_latched, ph_tcb_latched, ph_bcb_latched, phgb_latched, phsub_latched, phxbufb_latched, phloopb_latched, phfb_latched, and phsgb_latched are sent to an input A into the NOR gates 4525d, 4525f, 4525h, 4525j, 4525l, 4525n, 4525p, 4525r, 4525t, and 4525v within the NOR gate feedback pairs 4525c and 4525d, 4525e and 4525f, 4525g and 4525h, 4525i and 4525j, 4525k and 4525l, 4525m and 4525n, 4525o and 4525p, 4525q and 4525r, 4525s and 4525t, and 4525u and 4525v, respectively. Additionally, signals inter_node1, inter_node2, inter_node3, inter_node4, inter_node5, inter_node6, inter_node8, inter_node9, inter_node10, and inter_node11 are preferably sent from an output Y of the NOR gates 4525c, 4525e, 4525g, 4525i, 4525k, 4525m, 4525o, 4525q, 4525s, and 4525u to an input B into the NOR gates 4525d, 4525f, 4525h, 4525j, 4525l, 4525n, 4525p, 4525r, 4525t, and 4525v, respectively. The signals inter_node1, inter_node2, inter_node3, inter_node4, inter_node5, inter_node6, inter_node8, inter_node9, inter_node10, and inter_node11 may be any number of signals suitable for use in the clock resynchronization circuit 4405. The NOR gates 4525d, 4525f, 4525h, 4525j, 4525l, 4525n, 4525p, 4525r, 4525t, and 4525v preferably process the latched clock signals phdb_latched, phub_latched, ph_tcb_latched, ph_bcb_latched, phgb_latched, phsub_latched, phxbufb_latched, phloopb_latched, phfb_latched, and phsgb_latched along with the signals inter_node1, inter_node2, inter_node3, inter_node4, inter_node5, inter_node6, inter_node8, inter_node9, inter_node10, and inter_node11, respectively, to create the signals phd_delayed, phu_delayed, ph_tc_delayed, ph_bc_delayed, phg_delayed, phsu_delayed, phxbuf_delayed, phloop_delayed, phf_delayed, and phsg_delayed.

During the processing of the latched input signals phdb_latched, phub_latched, ph_tcb_latched, ph_bcb_latched, phgb_latched, phsub_latched, phsim_latched, phxbufb_latched, phloopb_latched, phfb_latched, and phsgb_latched, feedback signals 4540e, 4540f, 4540g, 4540h, 4540i, 4540j, 4540k, 4540l, 4540m, and 4540n are preferably sent from the NOR gates 4525d, 4525f, 4525h, 4525j, 4525l, 4525n, 4525p, 4525r, 4525t, and 4525v, to the NOR gates 4525c, 4525e, 4525g, 4525i, 4525k, 4525m, 4525o, 4525q, 4525s, and 4525u, respectively. The feedback signals 4540e, 4540f, 4540g, 4540h, 4540i, 4540j, 4540k, 4540l, 4540m, and 4540n preferably correspond to the signals phd_delayed, phu_delayed, ph_tc_delayed, ph_bc_delayed, phg_delayed, phsu_delayed, phxbuf_delayed, phloop_delayed, phf_delayed, and phsg_delayed, respectively. The feedback signals 4540e, 4540f, 4540g, 4540h, 4540i, 4540j, 4540k, 4540l, 4540m, and 4540n from the NOR gates 4525d, 4525f, 4525h, 4525j, 4525l, 4525n, 4525p, 4525r, 4525t, and 4525v, to the NOR gates 4525c, 4525e, 4525g, 4525i, 4525k, 4525m, 4525o, 4525q, 4525s, and 4525u may be utilized for any suitable purpose within the clock resynchronization circuit 4405. In a preferred embodiment, the feedback signals 4540e, 4540f, 4540g, 4540h, 4540i, 4540j, 4540k, 4540l, 4540m, and 4540n are provided to ensure that switches within the front-end circuit 310 remain unchanged when the current latched input signals phdb_latched, phub_latched, ph_tcb_latched, ph_bcb_latched, phgb_latched, phsub_latched, phxbufb_latched, phloopb_latched, phfb_latched, and phsgb_latched to the NOR gates 4525*d*, 4525*f*, 4525*h*, 4525*j*, 4525*l*, 4525*n*, 4525*p*, 4525*r*, 4525*t*, and 4525*v* are the same as the previous latched input signals phdb_latched, phub_latched, ph_tcb_latched, ph_bcb_latched, phgb_latched, phsub_latched, phxbufb_latched, phloopb_latched, phfb_latched, and phsgb_latched to the NOR gates 4525*d*, 4525*f*, 4525*h*, 4525*j*, 4525*l*, 4525*n*, 4525*p*, 4525*r*, 4525*t*, and 4525*v*.

In a preferred embodiment, the latched clock signal phsim_latched is sent to an input A into the NAND gate 4515*f* within the NAND gate feedback pair 4515*e* and 4515*f*. Additionally, a signal inter_node7 is preferably sent from an output Y of the NAND gate 4515*e* to an input B into the NAND gate 4515*f*. The signal inter_node7 may be any number of signals suitable for use in the clock resynchronization circuit 4405. The NAND gate 4515*f* preferably processes the latched clock signal phsim_latched along with the signal inter_node7 to create the output signal phsim_delayed.

During the processing of the latched input signal phsim_latched, a feedback signal 4540*o* is preferably sent from the NAND gate 4515*f* to the NAND gate 4515*e*. The feedback signal 4540*o* preferably corresponds to the signal phsim_delayed. The feedback signal 4540*o* from the NAND gate 4515*f* to the NAND gate 4515*e* may be utilized for any suitable purpose within the clock resynchronization circuit 4405. In a preferred embodiment, the feedback signal 4540*o* is provided to ensure that the switch phsim within the front-end circuit 310 remains unchanged when the current latched input signal phsim_latched to the NAND gate 4515*f* is the same as the previous latched input signal phsim_latched to the NAND gate 4515*f*.

The asynchronous set double edge flip-flops 4535*a*, 4535*b*, 4535*c*, 4535*d*, 4535*e*, 4535*f*, 4535*g*, 4535*h*, and 4535*i* may process input signals using any method suitable for processing input signals. In a preferred embodiment, the operation of the asynchronous set double edge flip-flops 4535*a*, 4535*b*, 4535*c*, 4535*d*, 4535*e*, 4535*f*, 4535*g*, 4535*h*, and 4535*i* is dependent on the level of the input clock signal CLK When the input clock CLK is set high, the transmission gates 4620*a*, 4620*e*, and 4620*f* are preferably turned off while the transmission gates 4620*b*, 4620*c*, and 4620*d* are preferably turned on.

The inverter 4610*a* and the transmission gate 4620*b* preferably provide local feedback for the NOR gate 4615*a* When a set input S and the input clock signal CLK into the asynchronous set double edge flip-flops 4535*a*, 4535*b*, 4535*c*, 4535*d*, 4535*e*, 4535*f*, 4535*g*, 4535*h*, and 4535*i* are set high, the feedback from the transmission gate 4620*b* to the NOR gate 4615*a* preferably provides an input B into the NOR gate 4615*a*. The set input S may be any number of inputs suitable for use in the asynchronous set double edge flip-flops 4535*a*, 4535*b*, 4535*c*, 4535*d*, 4535*e*, 4535*f*, 4535*g*, 4535*h*, and 4535*i*. In a preferred embodiment, the set input S is the input signal synch_reset. In a preferred embodiment, the set input S provides the input B to match an input A into the NOR gate 4615*a* When the set input S is low and the input clock signal CLK is low, the feedback from the transmission gate 4620*b* preferably reinforces an input D into the NOR gate 4615*a* after the rising edge of the clock input CLK The inputs D into the asynchronous set double edge flip-flops 4535*a*, 4535*b*, 4535*c*, 4535*d*, 4535*e*, 4535*f*, 4535*g*, 4535*h*, and 4535*i* preferably correspond to the input signals phdb_in, phub_in, phsub_in, phxbufb_in, phloopb_in, phfb_in, phadb_in, phsb_in, and phsib_in, respectively.

On the rising edge of the clock input CLK, the transmission gates 4620*a*, 4620*f*, and 4620*e* preferably turn off at substantially the same time that transmission gates 4620*b*, 4620*c*, and 4620*d* turn on. As a result, the input D into the asynchronous set double edge flip-flops 4535*a*, 4535*b*, 4535*c*, 4535*d*, 4535*e*, 4535*f*, 4535*g*, 4535*h*, and 4535*i* is preferably disconnected from the NOR gate 4615*a* input B at substantially the same time that the inverter 4610*a* output Y is connected to the input B. In this embodiment, the NOR gate 4615*a*, the inverter 4610*a*, and the transmission gates 4620*a* and 4620*b* preferably form a level-sensitive latch J. The input B into the NOR gate 4615*a* within the level-sensitive latch J is preferably provided as a feedback stream from the inverter 4610*a* and the transmission gate 4620*b* when the input clock signal CLK is high. The output Y from the inverter 4610*a* may be used for any suitable purpose within the asynchronous set double edge flip-flops 4535*a*, 4535*b*, 4535*c*, 4535*d*, 4535*e*, 4535*f*, 4535*g*, 4535*h*, and 4535*i*. In a preferred embodiment, the output Y from the inverter 4610*a* reinforces the set input S into the double edge flip-flop 4535*a* when the input S is high. In another preferred embodiment, the output Y from the inverter 4610*a* reinforces the input D into the double edge flip-flop 4535*a* when the set input S is low. The output from the level-sensitive latch J is preferably passed through the transmission gate 4620*c* when the input clock signal CLK is high, and is provided to the input A to the inverter 4610*b*. The inverter 4610*b* preferably converts the output from the level-sensitive latch J into the output Q. The output Q is preferably held substantially constant until the next clock edge of the clock input CLK.

On the falling edge of the clock signal CLK, the transmission gate 4620*d* preferably turns off, disconnecting the input D into the asynchronous set double edge flip-flops 4535*a*, 4535*b*, 4535*c*, 4535*d*, 4535*e*, 4535*f*, 4535*g*, 4535*h*, and 4535*i* from the input B into the NOR gate 4615*b*. The transmission gate 4620*c* preferably turns off, disconnecting the NOR gate 4615*a* in the level-sensitive latch J from driving the output Q. The transmission gates 4620*e* and 4620*f* preferably turn on. In a preferred embodiment, the NOR gate 4615*b*, the inverter 4610*c*, and the transmission gates 4620*d* and 4620*e* work together to act as a second level-sensitive latch K in parallel with the level-sensitive latch J. The latch K preferably works on an inverted version of the clock signal CLK on which latch J works. The output from the level-sensitive latch K is preferably passed through the transmission gate 4620*f* when the input clock signal CLK is low, and is provided to the input A to the inverter 4610*b*. The inverter 4610*b* preferably converts the output from the level-sensitive latch K into the output Q. The output Q is preferably held substantially constant until the next clock edge of the clock input CLK.

The input D into the asynchronous set double edge flip-flops 4535*a*, 4535*b*, 4535*c*, 4535*d*, 4535*e*, 4535*f*, 4535*g*, 4535*h*, and 4535*i* preferably translates to the output Q on every edge of the clock input CLK when the set input S is low.

The outputs Q from the asynchronous set double edge flip-flops 4535*a*, 4535*b*, 4535*c*, 4535*d*, 4535*e*, 4535*f*, 4535*g*, 4535*h*, and 4535*i* preferably correspond to the latched signals phdb_latched, phub_latched, phsub_latched, phxbufb_latched, phloopb_latched, phfb_latched, phadb_latched, phsb_latched, and phsib_latched, respectively.

The asynchronous reset double edge flip-flops 4530*a*, 4535*b*, 4530*c*, 4530*d*, 4530*e*, 4530*f*, 4530*g*, and 4530*h* preferably receive reset inputs R and digital data inputs D, and provide digital data outputs Q. The reset inputs R may be any number of inputs suitable for use in the asynchronous reset double edge flip-flops 4530a, 4530b, 4530c, 4530d, 4530e, 4530f, 4530g, and 4530h. In a preferred embodiment, the reset input R is the input signal synch_reset. The digital data inputs D may be any number of inputs suitable for use in the asynchronous reset double edge flip-flops 4530b, 4530c, 4530d, 4530e, 4530f, and 4530h. In a preferred embodiment, the digital data inputs D into the asynchronous reset double edge flip-flops 4530b, 4530c, 4530d, 4530e, 4530f, and 4530h correspond to the input signals ph_tcb_in, ph_bcb_in, phgb_in, phsim_in, phsgb_in, and phzb_in, respectively. The asynchronous reset double edge flip-flops 4530a, 4530b, 4530c, 4530d, 4530e, 4530f, 4530g, and 4530h may process the input signals D and R using any method suitable for processing input signals in a double-edge flip-flop. In a preferred embodiment, the operation of the asynchronous reset double edge flip-flops 4530a, 4530b, 4530c, 4530d, 4530e, 4530f, 4530g, and 4530h is dependent on the level of the input clock signal CLK.

The inverter 4710a and the transmission gate 4720b preferably provide local feedback for the NAND gate 4715a When the reset input R and the input clock signal CLK are high, the feedback from the transmission gate 4720b to the NAND gate 4715a preferably provides an input B into the NAND gate 4715a. In a preferred embodiment, the reset input R provides the input B to match an input A into the NAND gate 4715a When the reset input R is low and the input clock signal CLK is low, the feedback from the transmission gate 4720b preferably reinforces the input D into the NAND gate 4715a after the rising edge of the clock input CLK.

On the rising edge of the clock input CLK, the transmission gates 4720a, 4720f, and 4720e preferably turn off at substantially the same time that transmission gates 4720b, 4720c, and 4720d turn on. As a result, the input D into the asynchronous reset double edge flip-flop 4530a is preferably disconnected from the NAND gate 4715a input B at substantially the same time that the inverter 4710a output Y is connected to the input B. In this embodiment, the NAND gate 4715a, the inverter 4710a, and the transmission gates 4720a and 4720b preferably form a level-sensitive latch L. The input B into the NAND gate 4715a within the level-sensitive latch L is preferably provided as a feedback stream from the inverter 4710a and the transmission gate 4720b when the input clock signal CLK is high. The output Y from the inverter 4710a may be used for any suitable purpose within the asynchronous reset double edge flip-flops 4530a, 4530b, 4530c, 4530d, 4530e, 4530f, 4530g, and 4530h. In a preferred embodiment, the output Y from the inverter 4710a reinforces the reset input R into the asynchronous reset double edge flip-flop 4535a when the input R is high. In another preferred embodiment, the output Y from the inverter 4710a reinforces the input D into the asynchronous reset double edge flip-flop 4530a when the reset input R is low. The output from the level-sensitive latch L is preferably passed through the transmission gate 4720c when the input clock signal CLK is high, and is provided to the input A to the inverter 4710b. The inverter 4710b preferably converts the output from the level-sensitive latch L into the output Q. The output Q is preferably held substantially constant until the next clock edge of the clock input CLK.

On the falling edge of the clock signal CLK, the transmission gate 4720d preferably turns off, disconnecting the input D into the asynchronous reset double-edge flip-flop 4530a from the input B into the NAND gate 4715b. The transmission gate 4720c preferably turns off, disconnecting the NAND gate 4715a in the level-sensitive latch L from driving the output Q. The transmission gates 4720e and 4720f preferably turn on. In a preferred embodiment, the NAND gate 4715b, the inverter 4710c, and the transmission gates 4720d and 4720e work together to act as a second level-sensitive latch M in parallel with the level-sensitive latch L. The latch M preferably works on an inverted version of the clock signal CLK on which latch L works. The output from the level-sensitive latch M is preferably passed through the transmission gate 4720f when the input clock signal CLK is low, and is provided to the input A to the inverter 4710b. The inverter 4710b preferably converts the output from the level-sensitive latch M into the output Q. The output Q is preferably held substantially constant until the next clock edge of the clock input CLK The input D into the asynchronous reset double edge flip-flops 4530a, 4530b, 4530c, 4530d, 4530e, 4530f, 4530g, and 4530h preferably translates to the output Q on every edge of the clock input CLK when the reset input R is low.

In a preferred embodiment, the outputs Q from the asynchronous reset double edge flip-flops 4530b, 4530c, 4530d, 4530e, 4530f, and 4530h correspond to the latched signals ph_tcb_latched, ph_bcb_latched, phgb_latched, phsim_latched, phsgb_latched, and phzb_latched, respectively.

The communication interface 4410 preferably operably couples the clock resynchronization circuit 4405 and the digital signal generator 4403. The communication interface 4410 may include any number of conventional commercially available communication interfaces suitable for transmitting the clock signals from the digital signal generator 4403 to the clock resynchronization circuit 4405. In a preferred embodiment, the communication interface includes a plurality of metal traces running across the substrate 4415.

The substrate 4415 may include any number of conventional commercially available materials suitable for forming a substrate from which the clock resynchronization circuit 4405 and the digital signal generator 4403 may be fabricated. In a preferred embodiment, the substrate 4415 is a silicon p-type substrate.

For circuits with time-division multiplexing of analog signals, the duty cycle of each signal preferably must be fixed while still providing the non-overlap of signal sources. The conventional manner of providing non-overlapping clock signals is through the use of cross-coupled gates. For clocking signals that include data, using cross-coupled gates typically causes the non-overlapping signals to have a data dependent duty cycle. A data dependent duty cycle is typically not critical for most switched-capacitor circuits as long as a satisfactory settling time is provided for the circuit. However, for circuits that create a signal strength or reaction that is relative to the amount of time the analog switch is enabled, a data dependent duty cycle typically can create distortion in the signal or reaction. Minor changes in duty cycle of the clock signals driving switches on a circuit with an analog front-end (AFE), such as, for example, the front-end circuit 310, can typically cause signal distortion. The non-overlapping clocks typically must be fixed with respect to a high precision/low jitter clock edge so that the duty cycle of the time-division multiplexed clock signals are not data dependent. The clock signals driving the analog switches such as, for example, the switches phsu1, phsu2, phu1, phu2, phd1, phd2, phg1, phtc, phbc, phg2, phsg, phs, phf, phloop, phsim, phxbuf, phz, and pha in the front-end circuit 310 typically must be low noise signals having both a fixed duty cycle and sharp edges. The original signals may be generated in a digital area, such as, for example, the digital signal generator 4403, where substrate noise is typically less critical. The clock resynchronization circuit 4405 may, for example, be used to resample the clock signals generated in the digital signal generator 4403, create the fixed duty cycle non-overlap, and drive the switches phsu1, phsu2, phu1, phu2, phd1, phd2, phg1, phtc, phbc, phg2, phsg, phs, phf, phloop, phsim, phxbuf, phz, and pha with the sharp edged signals. By resynchronizing the signals in the clock resynchronization circuit 4405 using different supplies, the DC on values of the clock signals are preferably less likely to have digital noise from either the supply or the substrate 4415.

The digital signal generator 4403 preferably uses cross coupled gates to generate the non-overlapping clock signals. The clock signals may, for example, change on either a rising or falling edge of the clock, which typically makes them susceptible to glitches in the clock generation when the clock signals are generated using level-sensitive latches. The clock signals from the digital signal generator 4403 are preferably routed across the substrate 4415 to the clock resynchronization circuit 4405. The routing of the clock signals across the substrate 4415 typically introduces glitches or noise into the clock signals. To help alleviate the problem of glitches and noise in the clock signals, the clock resynchronization circuit 4405 preferably uses the asynchronous reset double edge flip-flops 4530a, 4530b, 4530c, 4530d, 4530e, 4530f, 4530g, 4530h and the asynchronous set double edge flip-flops 4535a, 4535b, 4535c, 4535d, 4535e, 4535f, 4535g, 4535h, 4535i to restore signal integrity.

The asynchronous reset double edge flip-flops 4530a, 4530b, 4530c, 4530d, 4530e, 4530f, 4530g, 4530h and the asynchronous set double edge flip-flops 4535a, 4535b, 4535c, 4535d, 4535e, 4535f, 4535g, 4535h, 4535i preferably sample the signals on both the rising edge and the falling edge of a delayed clock to provide signal alignment and reduce signal glitches causing signal integrity problems. In a preferred embodiment, a clock edge is used to turn off the switches phsu1, phsu2, phu1, phu2, phd1, phd2, phg1, phtc, phbc, phg2, phsg, phs, phf, phloop, phsim, phxbuf, phz, and/or pha in the front-end circuit 315. In a preferred embodiment, a fixed delay from the clock edge is used to turn on the switches phsu1, phsu2, phu1, phu2, phd1, phd2, phg1, phtc, phbc, phg2, phsg, phs, phf, phloop, phsim, phxbuf, phz, and/or pha in the front-end circuit 315. The use of the clock edge and the fixed delay preferably ensures a non-overlap and a fixed duty cycle for each clock signal. Similarly, for signals requiring a cascading effect of non-overlap, the delay clock preferably incorporates a larger local delay and drives the same type of non-overlapping sampling circuit.

In a preferred embodiment, the asynchronous reset double edge flip-flops 4530a, 4530b, 4530c, 4530d, 4530e, 4530f, 4530g, and 4530h and the asynchronous set double edge flip-flops 4535a, 4535b, 4535c, 4535d, 4535e, 4535f, 4535g, 4535h, and 4535i resynchronize input signals to create fixed-delay, non-overlapping signals. The fixed delay is preferably generated by creating the constant width pulses rise_delay and rise_delay_plus. The constant width pulses rise_delay and rise_delay plus are preferably used to determine how large the fixed non-overlap delay should be with respect to the incoming clock edge. The sampled signals used to turn off the switches phsu1, phsu2, phu1, phu2, phd1, phd2, phg1, phtc, phbc, phg2, phsg, phs, phf, phloop, phsim, phxbuf, phz, and/or pha are preferably driven to the off position on the rising edges of the constant width pulses rise_delay and rise_delay plus. The sampled signals used to turn on the switches phsu1, phsu2, phu1, phu2, phd1, phd2, phg1, phtc, phbc, phg2, phsg, phs, phf, phloop, phsim, phxbuf, phz, and pha are preferably driven to the on position on the falling edges of the constant width pulses rise_delay and rise_delay plus.

Referring to FIGS. 45a, 45b, 45c, 45d, 45e, and 48, an exemplary embodiment of the creation and use of a fixed-delay, non-overlapping signal will now be described. In a preferred embodiment, the input signal ph_tcb_in is received by the asynchronous reset double edge flip_flop 4530b within the clock resynchronization circuit 4405 on an edge of the clock signal XCLK_delayed. The input signal ph_tcb_in is preferably processed within the clock resynchronization circuit 4405 along with the constant width delay pulse rise_delay_plus to create the output signal ph_tcb_delayed. In a preferred embodiment, the output signal ph_tcb_delayed is used to control the switch phtc in the front-end circuit 310 by driving the switch phtc to an on or off position.

The output signal ph_tcb_delayed, when necessary, preferably drives the switch phtc in the front-end circuit 310 to the off position on the rising edge of the constant width delay pulse rise_delay plus. The output signal ph_tcb_delayed, when necessary, preferably drives the switch phtc in the front-end circuit 310 to the on position on the falling edge of the constant width delay pulse rise_delay plus. A substantially identical process is used to process the input signals phdb_in, phub_in, ph_bcb_in, phgb_in, phsub_in, phsim_in, phxbufb_in, phloopb_in, phfb_in, and phsgb_in to create the output signals phdb_delayed, phub_delayed, ph_bcb_delayed, phgb_delayed, phsub_delayed, phsim_delayed, phxbufb_delayed, phloopb_delayed, phfb_delayed, and phsgb_delayed, respectively. The output signals phdb_delayed, phub_delayed, ph_bcb_delayed, phgb_delayed, phsub_delayed, phsim_delayed, phxbufb_delayed, phloopb_delayed, phfb_delayed, and phsgb_delayed are preferably used to control the switches phd1 and phd2, phu1 and phu2, phbc, phg1 and phg2, phsu1 and phsu2, phsim, phxbuf, phloop, phf, and phsg in the front-end circuit 310. The time lapse between the rising and falling edges of the constant width delay pulse rise_delay plus preferably creates a delay in the transmission of the output signals phdb_delayed, phub_delayed, ph_tcb_delayed, ph_bcb_delayed, phgb_delayed, phsub_delayed, phsim_delayed, phxbufb_delayed, phloopb_delayed, phfb_delayed, and phsgb_delayed from the clock resynchronization circuit 4405 to the front-end circuit 310. The delay preferably ensures that the signals used to turn on the relevant switches in the front-end circuit 310 are non-overlapping with respect to the signals used to turn off the relevant switches in the front-end circuit 310. The degree of non-overlap between the signals used to turn on the relevant switches in the front-end circuit 310 and to turn off the relevant switches in the front-end circuit 310 is preferably determined by the width of the constant width delay pulse rise_delay_plus. In a preferred embodiment, the width of the constant width delay pulse rise_delay_plus is adjusted using extra gates in the feedback comparison path.

Referring to FIGS. 45a, 45b, 45c, 45d, 45e, and 49, another exemplary embodiment of the creation of a fixed-delay, non-overlapping signal win now be described. In a preferred embodiment, the input signal phsib_in is received by the asynchronous set double edge flip-flop 4535i within the clock resynchronization circuit 4405 on an edge of the clock signal XCLK The input signal phsib_in is preferably processed within the clock resynchronization circuit 4405 along with the constant width delay pulse rise_delay to create the output signal phsib_delayed. In a preferred embodiment, the output signal phsib_delayed is used to control the switch phs in the front-end circuit 310. The output signal phsib_delayed, when necessary, preferably drives the switch phs in the front-end circuit 310 to an off position on the rising edge of the constant width pulse rise_delay. The output signal phsib_delayed, when necessary, preferably drives the switch phs in the front-end circuit 310 to an on position on the falling edge of the constant width pulse rise_delay. A substantially identical process is used to process the input signals phab_in, phsb_in, and phzb_in in the clock resynchronization circuit 4405 to create the output signals phab_delayed, phsb_delayed, and phzb_delayed, respectively. The output signals phab_delayed and phzb_delayed preferably control the switches pha and phz, respectively, in the front-end circuit 310. The time lapse between the rising and falling edges of the constant width pulse rise_delay preferably creates a delay in the transmission of the output signals phsb_delayed, phab_delayed, phsib_delayed, and phzb_delayed from the clock resynchronization circuit 4405 to the front-end circuit 310. The delay preferably ensures that the signals used to turn off the relevant switches in the front-end circuit 310 are non-overlapping with respect to the signals used to turn on the relevant switches in the front-end circuit 310. The degree of non-overlap between the signals used to turn off the relevant switches in the front-end circuit 310 and to turn on the relevant switches in the front-end circuit 310 is preferably determined by the width of the constant width pulse rise_delay. In a preferred embodiment, the width of the constant width pulse rise_delay is adjusted using extra gates in the feedback comparison path.

Figure 50:
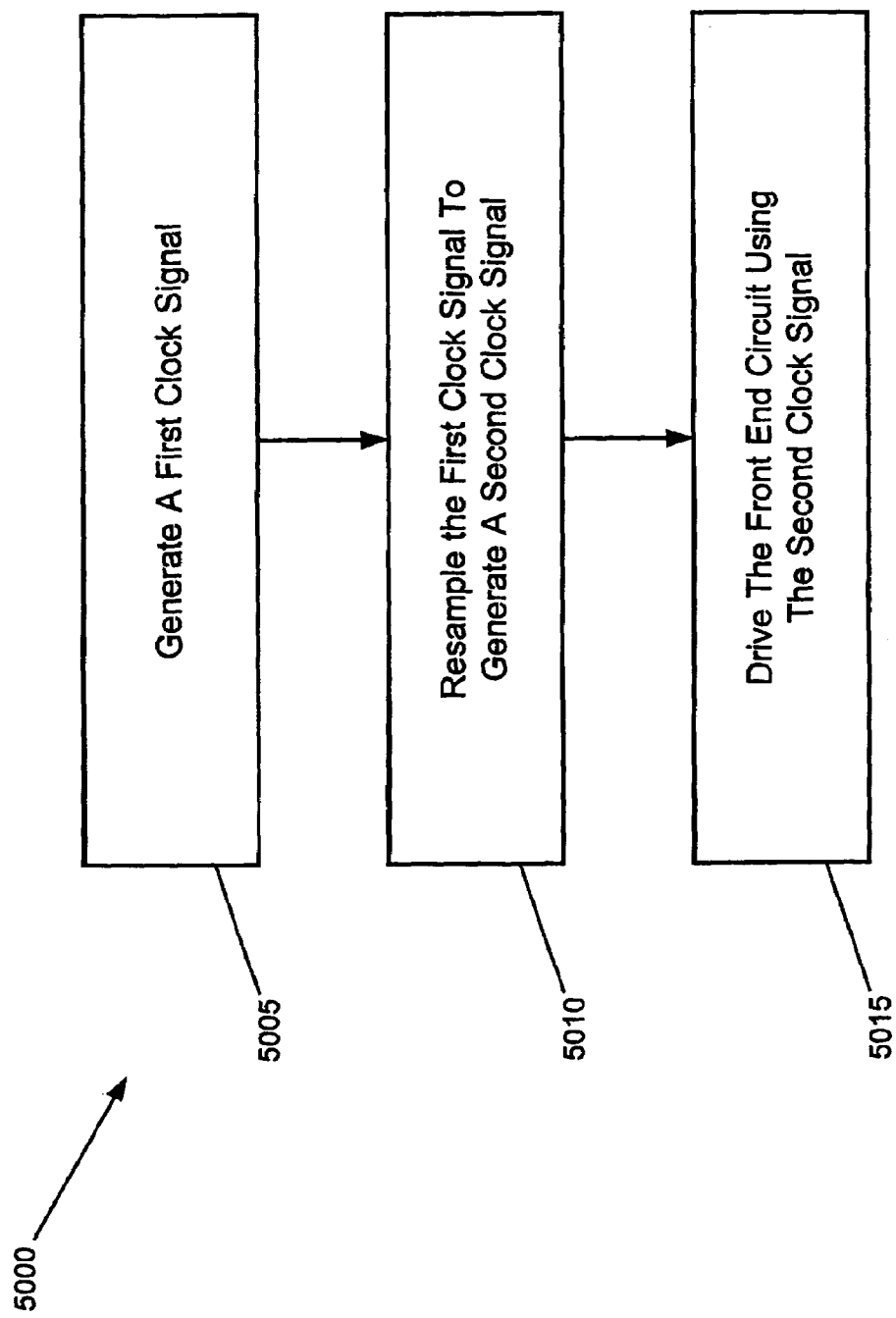
FIG. 50 is an embodiment of a method of controlling the operation of the front-end circuit of FIG. 4.

Referring to FIG. 50, a method 5000 of controlling the operation of front-end circuit 310 will now be described. In a preferred embodiment, time-division multiplexing is used to control the front-end circuit 310. In a preferred embodiment, the method 5000 includes: generating a first clock signal in step 5005, resampling the first clock signal to generate a second clock signal in step 5010, and driving the front-end circuit 310 using the second clock signal in step 5015.

In a preferred embodiment, in step 5005 a first clock signal is generated. The first clock signal may be generated using any number of conventional commercially available methods of generating a first clock signal such as, for example, using a state machine or a decoder. In a preferred embodiment, the first clock signals are generated in the digital signal generator 4403 within the multiphase clock generator 320.

In a preferred embodiment, in step 5010 the first clock signal generated by the digital signal generator 4403 is resampled by the clock resynchronization circuit 4405 to generate a second clock signal. In a preferred embodiment, the first clock signal is transmitted from the digital signal generator 4403 to an analog signal generator, which resamples the first clock signal. The analog signal generator may include any number of conventional commercially available signal generators suitable for generating the second clock signal. In a preferred embodiment, the analog signal generator is the clock resynchronization circuit 4405. The clock resynchronization circuit 4405 preferably incorporates edge sensitive double-edge flip-flops that sample the signal on both the rising edge and falling edge of a delayed clock to reduce the likelihood of signal glitches causing signal integrity problems. In a preferred embodiment, the double edge flip-flops include the asynchronous reset double edge flip-flops 4530a, 4530b, 4530c, 4530d, 4530e, 4530f, 4530g, and 4530h and the asynchronous set double edge flip-flops 4535a, 4535b, 4535c, 4535d, 4535e, 4535f, 4535g, 4535h, and 4535i.

In a preferred embodiment, in step 5015 the second clock signal is used to drive the front-end circuit 310. In a preferred embodiment, the clock resynchronization circuit 4405 sends the sampled signal to the front-end circuit 310 as the second clock signal. In a preferred embodiment, a clock edge is used to turn off switched within the front-end circuit 310, and a fixed delay from the clock edge is used to turn on switched with in the front-end circuit 310. In a preferred embodiment, the signals are non-overlapping signals with a fixed duty cycle.

Figure 51:
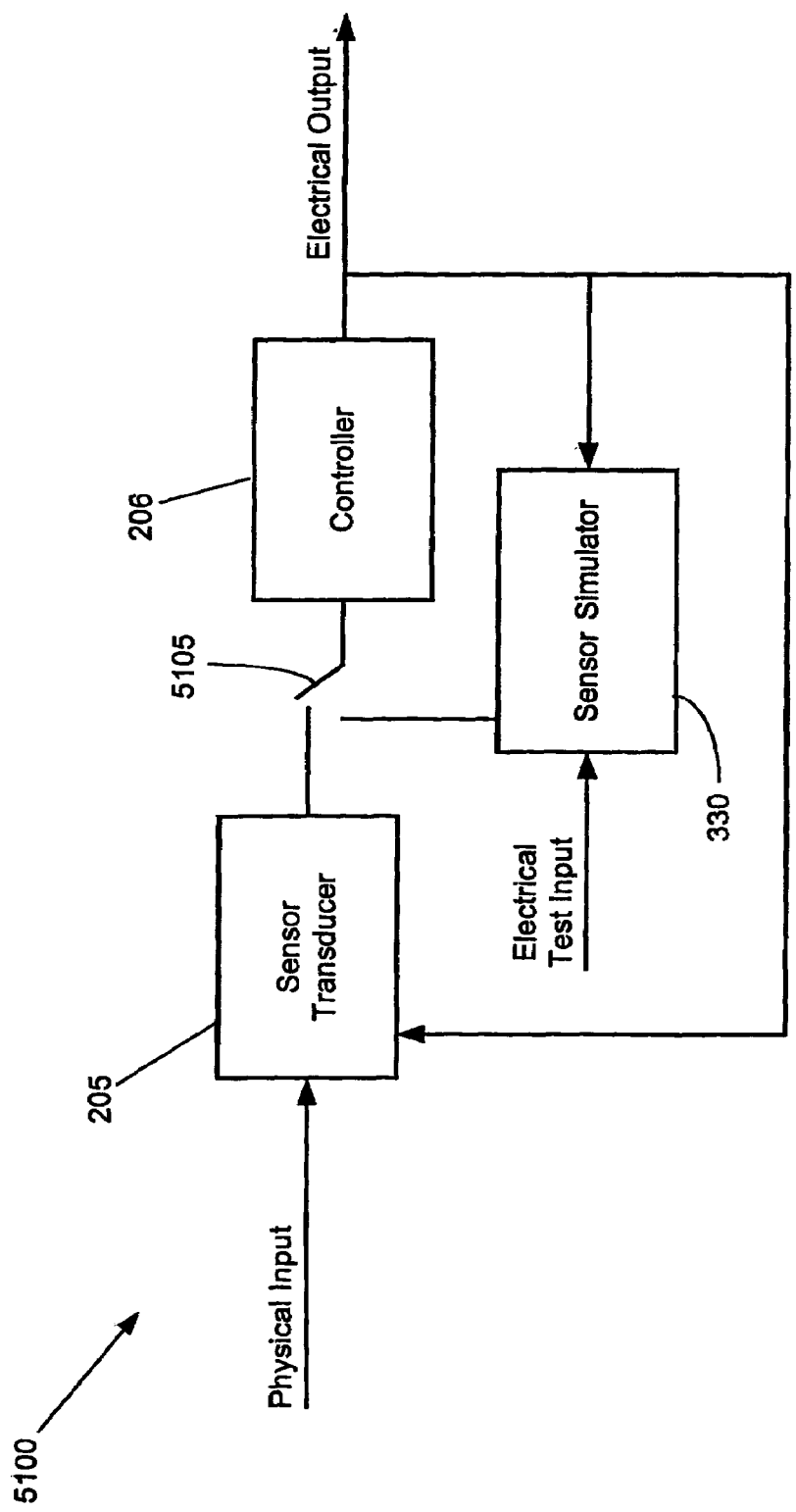
FIG. 51 illustrates an embodiment of a system for testing the operation of the controller of FIG. 2.
Figure 52:
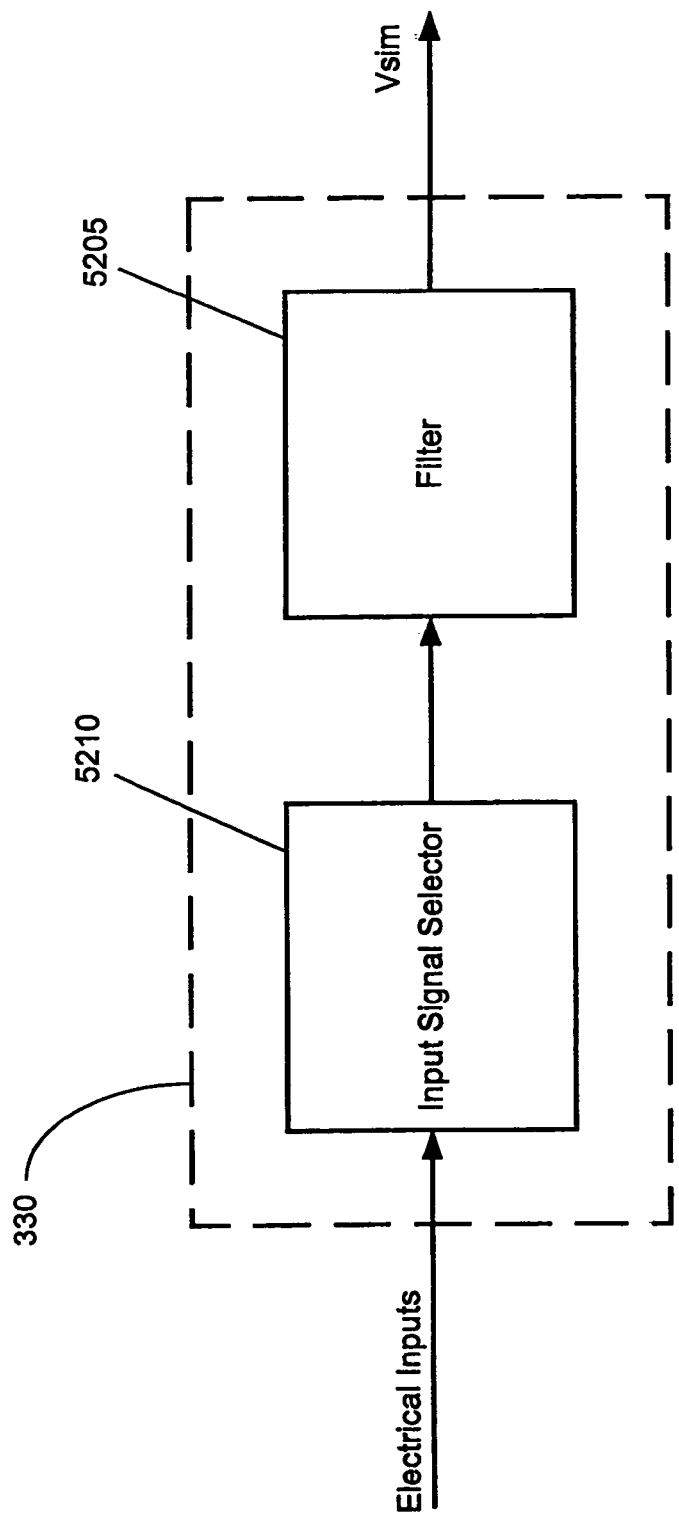
FIG. 52 illustrates an embodiment of a sensor simulator used in the system of FIG. 51.

Referring to FIGS. 51 and 52, a system 5100 for simulating the output of the sensor 205 will now be described. In a preferred embodiment, the system 5100 includes the sensor 205, the controller 206, sensor simulator 330, and a switch 5105 for controllably connecting the sensor 205 to the controller 206 or the sensor simulator 330.

The sensor 205 preferably converts a physical quantity of interest into an electrical quantity. The physical quantity of interest may include any physical quantity such as, for example, acceleration, pressure, or temperature. In a preferred embodiment, the physical quantity of interest is acceleration. The electrical quantity into which the physical quantity of interest is converted may be any electrical quantity such as, for example, resistance, capacitance, charge, voltage, or current. In a preferred embodiment, the electrical quantity is capacitance.

In a preferred embodiment, the sensor 205 is coupled to the controller 206 during normal operation. The sensor 205 may include any combination of non-electrical devices, integrated circuit and discrete circuit components. The sensor 205 may include any number of conventional commercially available transducers suitable for converting physical data into an electrical quantity such as, for example, integrated pressure sensors or integrated temperature sensors. In a preferred embodiment, the sensor 205 is a micromachined accelerometer with capacitive position sensing and electrostatic feedback forcing, the design of which is provided substantially as described in one or more of the following: U.S. Pat. No. 5,852,242 the disclosure of which are incorporated herein by reference.

The controller 206 is preferably coupled to the sensor 205 and controls the sensor 205 during normal operation. The controller 206 is preferably coupled to the sensor simulator 330 and controls the sensor simulator 330 during a test mode of operation. The controller 206 may include any combination of integrated circuit and discrete circuit components. The controller 206 may include any number of conventional commercially available controllers suitable for converting electrical input into a more convenient output data form such as, for example, an amplitude/frequency modulation, a PID controller, or a sigma-delta controller. In a preferred embodiment, the controller 206 is provided substantially as described above with reference to FIGS. 1–50.

In a preferred embodiment, during normal operation, the controller 206 determines the position of the measurement mass 309 within the sensor 205 by applying voltages and electrostatic forces to the sensor 205 and measuring the effects of the voltages and the electrostatic forces on the variable capacitors C1 and C2 within the sensor 205. In a preferred embodiment, the position of the measurement mass 309 within the sensor 205 is substantially indicative of the acceleration forces experienced by the sensor 205. The position of the measurement mass 309 within the sensor 205 is preferably conveyed to the controller 206 in the form of an electrical quantity. In a preferred embodiment, the controller 206 converts the electrical quantity indicative of the position of the measurement mass 309 within the sensor 205 into an output signal of convenient magnitude, phase, and form such as, for example, voltage, current, or digital data In a preferred embodiment, the controller 206 converts the electrical quantity indicative of the position of the measurement mass 309 within the sensor 205 into the voltage IMOD.

The sensor simulator 330 preferably simulates the input-output relations of the sensor 205. In a preferred embodiment, the sensor simulator 330 is coupled to the controller 206 during the test mode of operation. The sensor simulator 330 may include any combination of integrated circuit and discrete circuit components. In a preferred embodiment, as illustrated in FIG. 52, the sensor simulator 330 includes a filter 5205 and an input signal selector 5210.

The filter 5205 preferably receives one or more input signals and generates an output signal Vsim that is representative of the operating mode of the sensor 205. The filter 5205 may include any number of conventional commercially available filters such as, for example, a continuous-time analog filter, a switched-capacitor filter, or a digital filter. In a preferred embodiment, the filter 5205 is a second order low-pass filter, implemented as a discrete-time switched-capacitor filter.

The input signal selector 5210 preferably selects the input signal as a function of the operating mode simulated by the filter 5205. In a preferred embodiment, the output of the input signal selector 5210 is dependent on the operating mode specified by the filter 5205. In a preferred embodiment, the input signal selector 5210 is an electrical switch.

Figure 53:
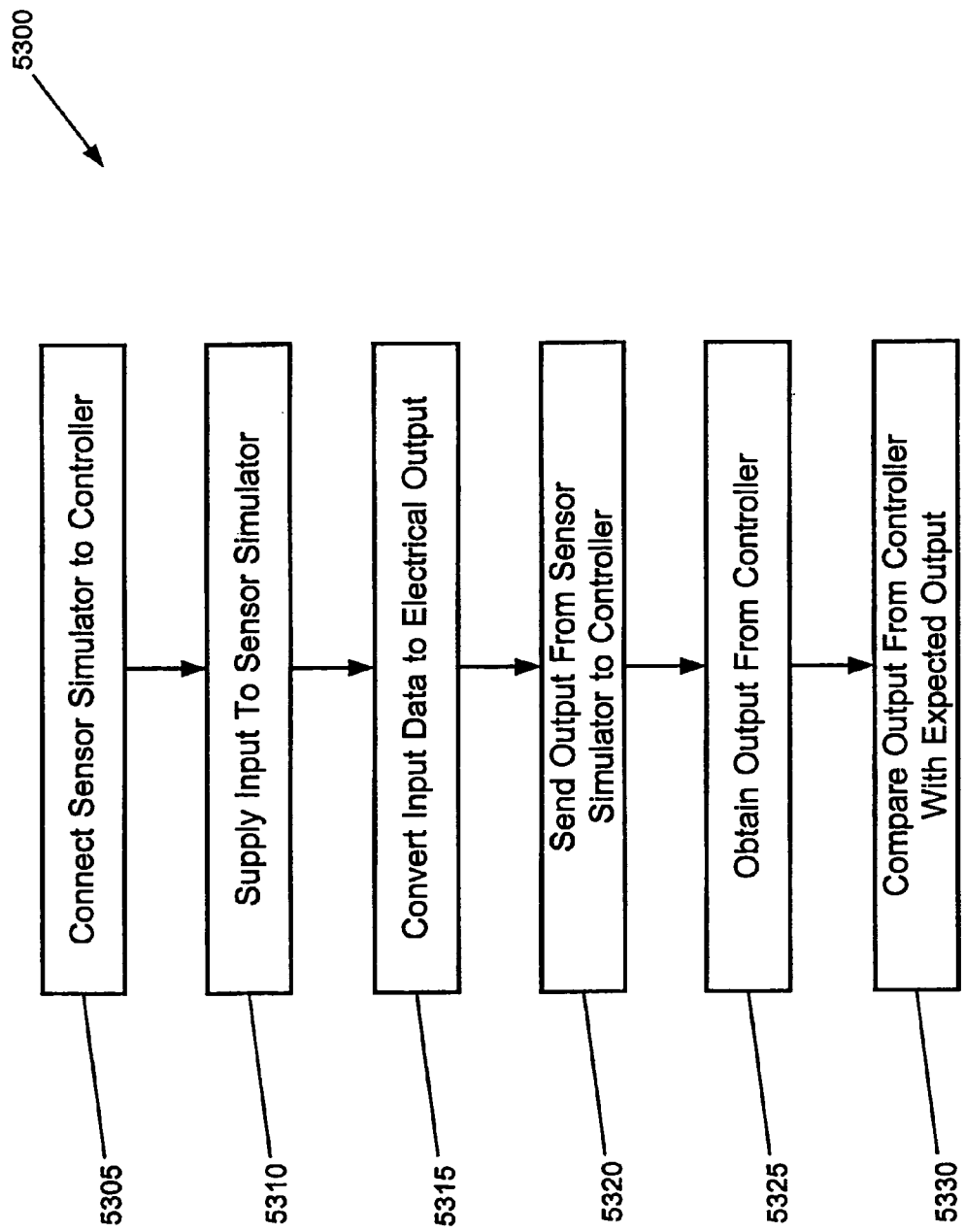
FIG. 53 is an embodiment of a method of testing the output of the controller of FIG. 2.
Figure 54A:
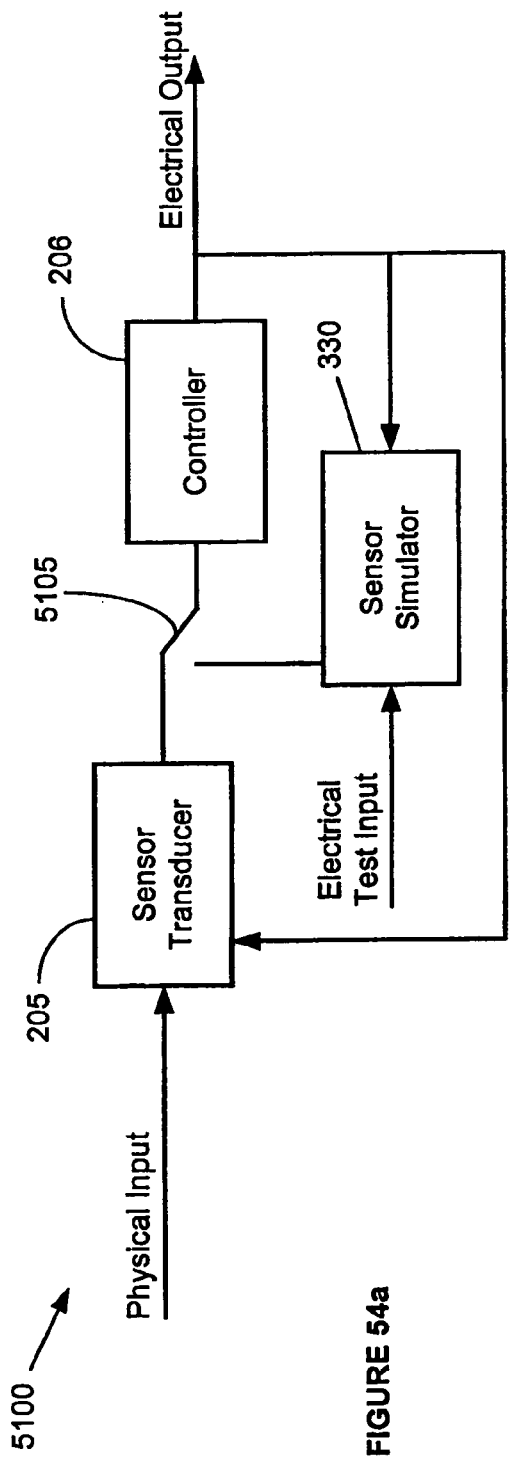
FIG. 54a illustrates an embodiment of the system of FIG. 51 when the system is operating in a normal operating mode.
Figure 54B:
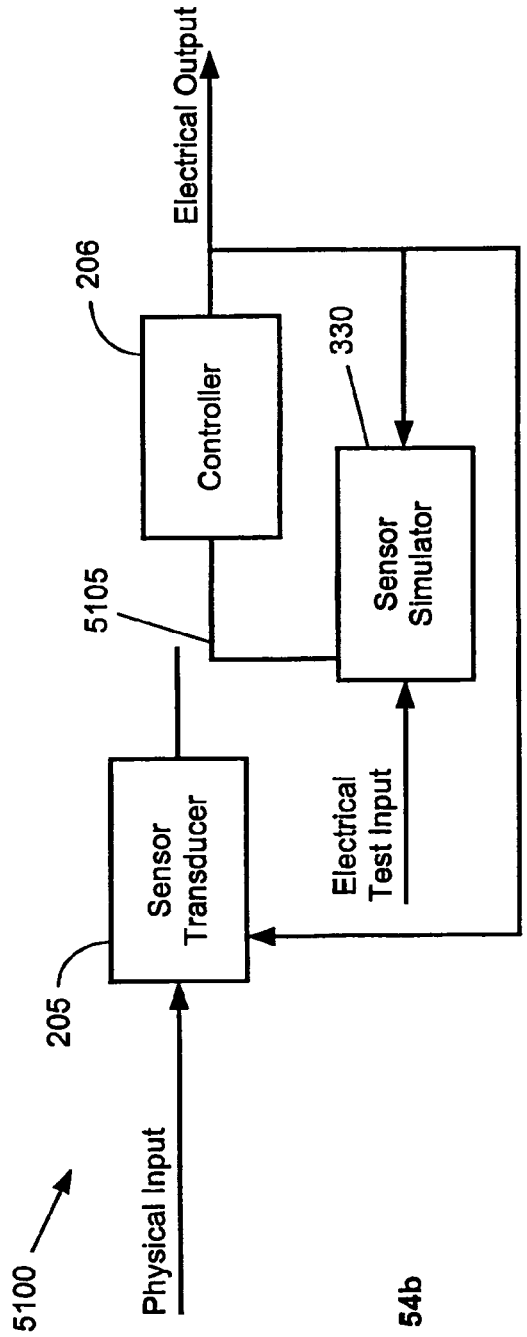
FIG. 54b illustrates an embodiment of the system of FIG. 51 when the system is operating in a testing mode.

Referring to FIGS. 53, 54a, and 54b, a method 5300 of testing the output of the controller 206 will now be described. In a preferred embodiment, as illustrated in FIG. 53, the method 5300 of testing the output of the controller 206 includes: connecting the sensor simulator 330 to the controller 206 in step 5305, supplying electrical input to the sensor simulator 330 in step 5310, converting the input into the sensor simulator 330 to electrical output in step 5315, sending the output from the sensor simulator 330 to the controller 206 in step 5320, obtaining the output IMOD from the controller 206 in step 5325, and comparing the output IMOD from the controller 206 with the anticipated output in step 5330.

In a preferred embodiment, in step 5305 the sensor simulator 330 is connected to the controller 206. The sensor simulator 330 may be connected to the controller 206 using any number of methods suitable for connecting the sensor simulator 330 and the controller 206. In a preferred embodiment, as illustrated in FIGS. 54a and 54b, the sensor simulator 330 is electrically connected to the controller 206 by the electrical switch 5105. In a preferred embodiment, as illustrated in FIG. 54a, the switch 5105 connects the sensor 205 to the controller 206 during normal operation of the sensor 205. In another preferred embodiment, as illustrated in FIG. 54b, the switch 5105 connects the sensor simulator 330 to the controller 206 during the test mode of operation. The switch 5105 may be any number of conventional commercially available switches suitable for connecting the sensor 205 or the sensor simulator 330 to the controller 206 such as, for example, a DG613 analog switch or a SST211 MOSFET.

In a preferred embodiment, in step 5310 input is supplied to the sensor simulator 330. The input may be supplied by any number of sources suitable for supplying input data to the sensor simulator 330 such as, for example, an analog oscillator, an external test source, or a digital signal in memory. In a preferred embodiment, the sensor simulator 330 receives input data from an external test source and receives feedback information from the controller 206. In a preferred embodiment, the filter 5205 preferably receives one or more input data signals and uses the signals to determine the operating state of the sensor 205. The filter 5205 then preferably generates a new signal indicative of the operating state of the sensor 205 and transmits the information to the controller 206. The input signal selector 5210 preferably controllably selects input signals as a function of the operating mode indicated by the startup sequencer 325.

In a preferred embodiment, in step 5315 the sensor simulator 330 converts the input received in step 5310 into an electrical output Vsim. In a preferred embodiment, the output Vsim of the sensor simulator 330 depends on the operating state indicated by the filter 5205. The output Vsim of the sensor simulator 330 may be in any form of electrical quantity such as, for example, resistance, capacitance, charge, voltage, or current. In a preferred embodiment, the output Vsim of the sensor simulator 330 is in the form of a voltage. In a preferred embodiment, the electrical input and transfer function of the sensor simulator 330 are approximately mathematically equivalent to the input and transfer function of a typical sensor. Therefore, the behavior of the sensor simulator 330 preferably approximately mimics the behavior of the sensor 205. The output Vsim from the sensor simulator 330 varies depending on the operating mode of the sensor 205. The operating modes of the sensor 205 include the measurement mass 309 setup mode (OPERATING MODE 1), the gravity cancellation mode (OPERATING MODE 2), the stray capacitance calibration mode (OPERATING MODE 3), and the sigma-delta operating mode (OPERATING MODE 4). In a preferred embodiment, the z-transform Vc(z) of the simulator 330 output voltage Vsim during the four operational modes OPERATING MODE 1, OPERATING MODE 2, OPERATING MODE 3, and OPERATING MODE 4 is given by:

$$V_c(z) = H(z)\frac{2C_o}{mC_F}\left[\frac{2AV_Rm}{d}V_{AC}(z) + \frac{4V_RV_{DD}C_o}{d^2}D_{GS1}V_{SUM}(z)\right] \quad (3)$$

during the OPERATING MODE 1, $$V_c(z) = H(z)\frac{2C_o}{mC_F}\left[\frac{2AV_Rm}{d}V_{AC}(z) + \frac{4V_R^2C_o}{d^2}D_{GS23}V_{SUM}(z)\right] \quad (4)$$

during the OPERATING MODE 2 and the OPERATING MODE 3, and $$V_c(z) = H(z)\frac{2C_o}{mC_F}\left[\frac{2AV_Rm}{d}V_{AC}(z) + \frac{4V_R^2C_o}{d^2}V_{DAC}(D_{F4}D_o(z) - D_{G4})\right] \quad (5)$$

during the OPERATING MODE 4, where, $V_C(z)$=z-transform of the simulator output voltage Vsim, H(z)=z-transform of the discrete-time sensor model, m=proof mass of the sensor 205, d=gap distance between the capacitor plates of C1 and C2, $V_R$=reference voltage supplied by the front-end circuit 310, $V_{DD}$=power supply voltage supplied by system power input,
$C_o$=nominal plate capacitance of C1 and C2 in FIG. 9,
$D_{GS1}$=duty factor of 1-g cancellation force in OPERATING MODE 1,
$D_{GS23}$=duty factor of 1-g cancellation force in OPERATING MODE 2 and OPERATING MODE 3,
$D_{G4}$=duty factor of 1-g cancellation force in OPERATING MODE 4,
$D_{F4}$=duty factor of modulator feedback forcing in OPERATING MODE 4,
$V_{AC}(z)$=z-transform of a voltage-equivalent input acceleration test signal supplied by an external signal input,
$V_{SUM}(z)$=z-transform of feedback voltage in OPERATING MODES 1, 2 and 3, and
$D_o(z)$=z-transform of a feedback bitstream.

For a sensor transfer function H(s) given by:

$$H(s) = \frac{1}{s^2 + \frac{B}{m}s + \frac{K}{m}} \quad (6)$$

where B is a damping coefficient and K is an effective spring constant, the "step-invariant" z-transform of H(s) is preferably given by:

$$H(z) = K_o \frac{(A-B+1)z^{-1} + (C-A)z^{-2}}{1 - Bz^{-1} + Cz^{-2}} \quad (7)$$

where:

$$K_o = \frac{m}{K},$$

$A = e^{-aT} \sec\phi \cos(\omega T - \phi),$
$B = 2e^{-aT} \cos \omega T,$
$C = e^{-2aT},$ $$\phi = \tan^{-1}\left(\frac{-a}{\omega}\right),$$

$$a = \frac{B}{2m}, \text{ and}$$

$$\omega = \sqrt{\frac{K}{m} - \left(\frac{B}{2m}\right)^2}.$$

In a preferred embodiment, the values of the variables associated with Equation (7) are given by:
T=sample interval,
m=proof mass of the sensor 205,
K=spring constant,
Q=quality factor, and $$B = \frac{\sqrt{Km}}{Q} = \text{damping factor.}$$

The variables are preferably plugged into Equations (3), (4), or (5) along with other variables and constants to obtain the value of the output Vsim from the sensor simulator 330.

In a preferred embodiment, in step 5320 the output Vsim from the sensor simulator 330 is transmitted to the controller 206. The output Vsim may be sent from the simulator 330 to the controller 206 using any number of conventional commercially available methods of sending the output Vsim from the simulator 330 to the controller 206. In a preferred embodiment, the output Vsim from the simulator 330 is sent to the controller 206 by an electrical switch. In a preferred embodiment, the output Vsim from the simulator 330 is in the form of a voltage.

In a preferred embodiment, in step 5325 the controller 206 receives the input from the sensor simulator 330 and converts it into an output signal of convenient magnitude, phase, and form such as, for example, voltage, current, or digital data In a preferred embodiment, the output IMOD of the controller 206 is in the form of voltage. The output Vsim from the sensor simulator 330 may be processed by the controller 206 using any number of processes suitable for converting the output data Vsim from the sensor simulator 330 into a more convenient form such as, for example, analog filtering or amplitude modulation. In a preferred embodiment, the processing in the controller 206 occurs by switched-capacitor filtering and sigma-delta modulation.

In a preferred embodiment, in step 5330 the output IMOD from the controller 206 is analyzed to determine if the controller 206 is operating properly. The output IMOD from the controller 206 may be analyzed using any number of methods suitable for determining the accuracy of the controller 206 output IMOD. In a preferred embodiment, the controller 206 output IMOD is analyzed to check the stability of the closed-loop system by spectrum analyzing the bitstream outputs from the controller 206 and comparing the bitstream outputs IMOD from the controller 206 with known frequency response characteristics of working sigma-delta modulators. If the output IMOD from the controller 206 is inconsistent with the expected output, the controller 206 is identified as a possible source of error within the system 100.

Figure 55:
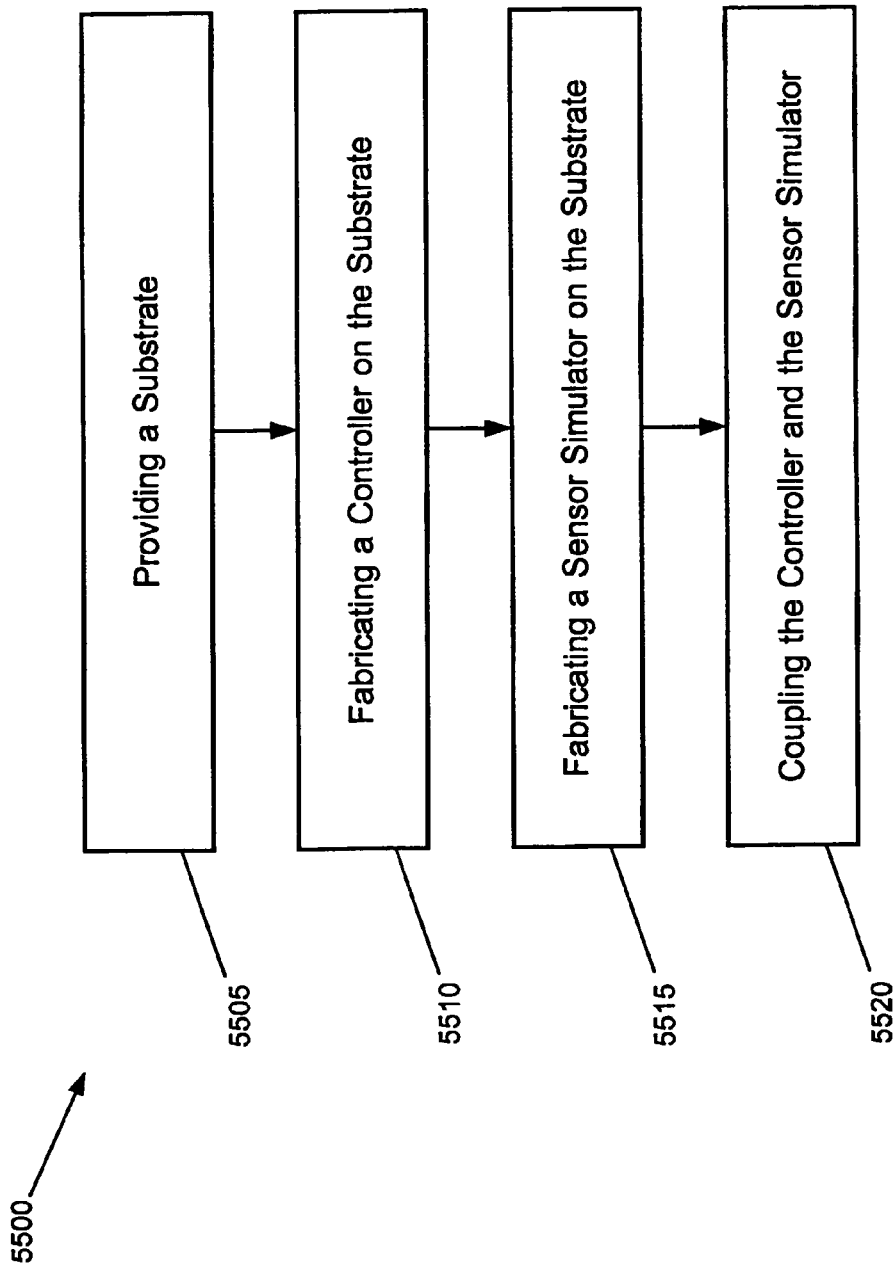
FIG. 55 is an embodiment of a method of creating a controller assembly.
Figure 56:
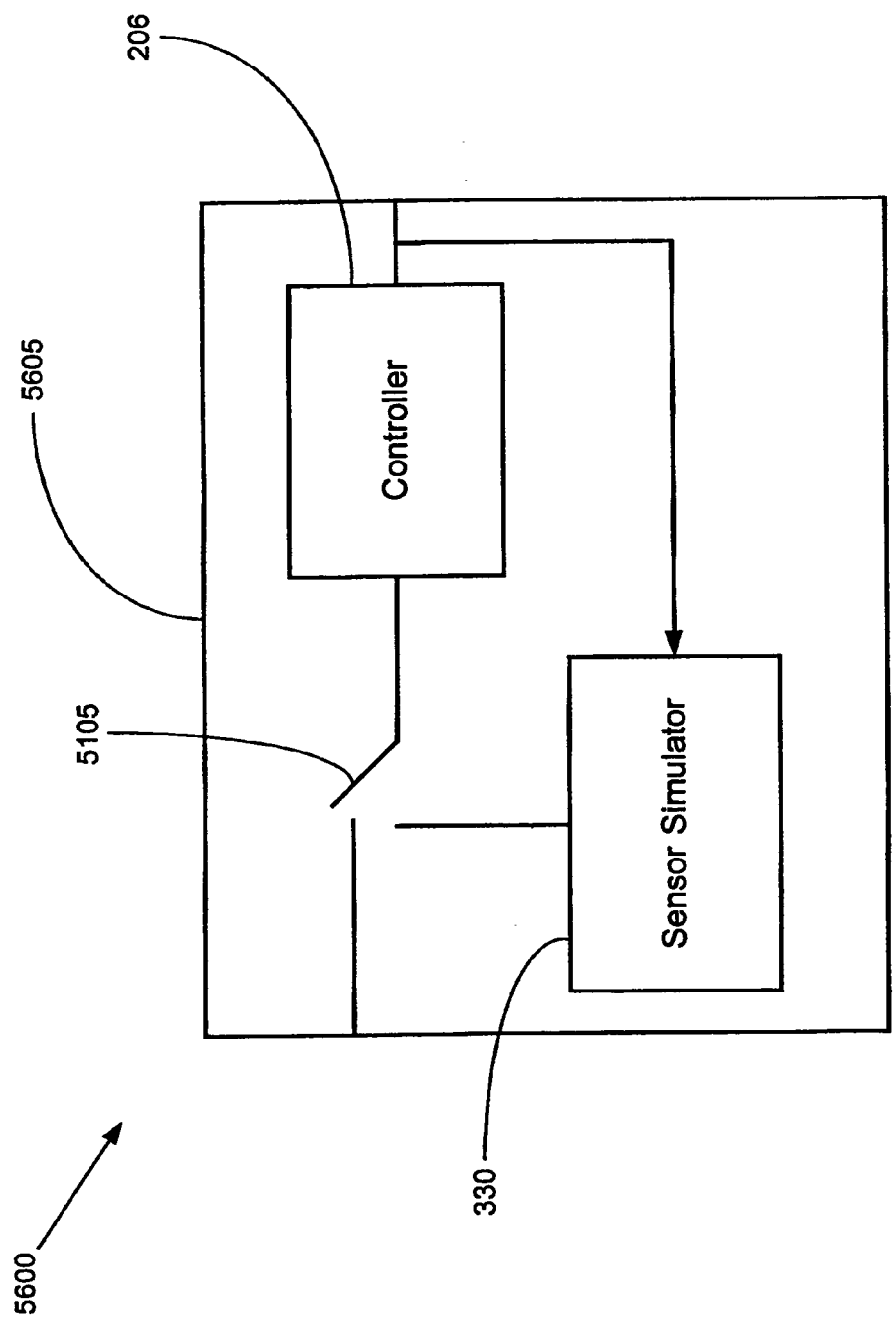
FIG. 56 is an embodiment of a controller assembly for use in the method of FIG. 55.

Referring to FIGS. 55 and 56, a method 5500 of creating a controller assembly 5600 will now be described. In a preferred embodiment, as illustrated in FIG. 55, the method 5500 of creating the controller assembly 5600 includes: providing a substrate 5605 for the controller assembly 5600 in step 5505, fabricating the controller 206 on the substrate 5605 in step 5510, fabricating the sensor simulator 330 on the substrate 5605 in step 5515, and coupling the controller 206 and the sensor simulator 330 in step 5520.

In a preferred embodiment, in step 5505 the substrate 5605 is provided onto which the controller assembly 5600 is implemented. The substrate 5605 may include any number of conventional commercially available materials suitable for acting as a substrate for the controller assembly 5600. In a preferred embodiment, the substrate 5605 is silicon.

In a preferred embodiment, in step 5510 the controller 206 is fabricated onto the substrate 5605. The controller 206 may be fabricated onto the substrate 5605 using any number of methods suitable for fabricating a controller onto a substrate.

In a preferred embodiment, the controller 206 is fabricated onto the substrate 5605 by using a 1.5 micron double poly, double metal CMOS process with weak bipolars.

In a preferred embodiment, in step 5515 the sensor simulator 330 is fabricated onto the substrate 5605. The sensor simulator 330 may be fabricated onto the substrate 5605 using any number of methods for fabricating a simulator onto a substrate. In a preferred embodiment, the sensor simulator 330 is fabricated onto the substrate 5605 by using a 1.5 micron double poly, double metal CMOS process with weak bipolars.

In a preferred embodiment, in step 5520 the controller 206 is coupled to the sensor simulator 330. The controller 206 and the sensor simulator 330 may be coupled using any number of methods suitable for coupling electronic components. In a preferred embodiment, the electrical switch 5105 is used to couple the controller 206 and the simulator 330. In another preferred embodiment, the switch 5105 is turned off to disconnect the controller 206 and the sensor simulator 330 and is turned on to connect the controller 206 and the sensor 205. In this manner, for example, the operation of the controller 206 may be tested without assembling the entire sensor system 100.

In another preferred embodiment, in step 5510 a plurality of controllers 206 are fabricated onto the substrate 5605, and in step 5515 a plurality of sensor simulators 330 are fabricated onto the substrate 5605. In step 5520, the plurality of controllers 206 and the plurality of sensor simulators 330 are preferably coupled, creating a plurality of controller assemblies 5600 on a single substrate 5605. In this configuration, for example, the operation of a plurality of controllers 206 may be tested by using a single substrate 5605, eliminating the need to use a plurality of substrates 5605.

Figure 57:
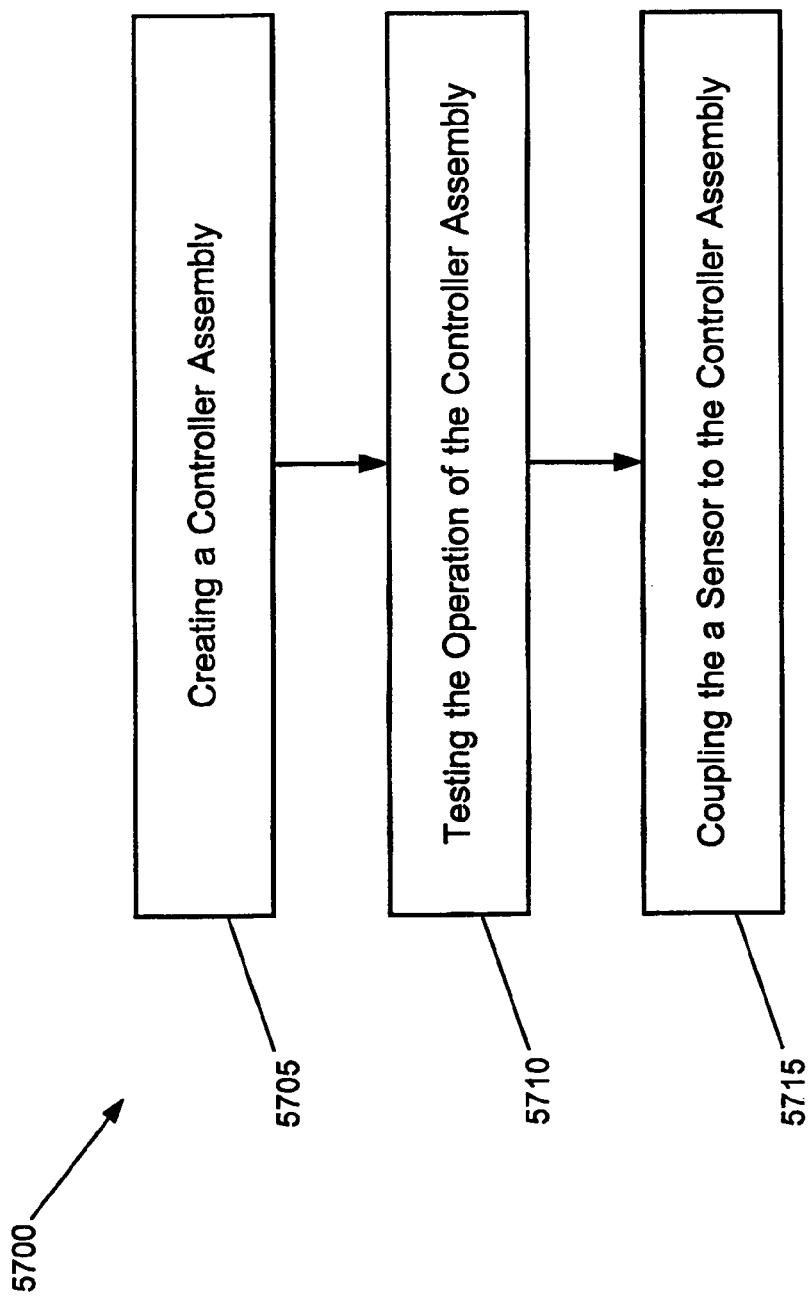
FIG. 57 is an embodiment of a method of creating a sensor assembly.

Referring to FIG. 57, a method 5700 of creating the sensor system 100 will now be described. In a preferred embodiment, the method 5700 of creating the sensor system 100 includes: creating a controller assembly in step 5705, testing the controller assembly in step 5710, and coupling the controller assembly to a sensor 205 in step 5715.

In a preferred embodiment, in step 5705 the controller assembly is created. The controller assembly preferably includes the sensor simulator 330, the controller 206, and the substrate 5605. The controller assembly may be created using any method suitable for creating a controller assembly. In a preferred embodiment, the controller assembly is created by fabricating the sensor simulator 330 and the controller 206 on the substrate 5605, substantially as described in the method 5500 of creating the controller assembly 5600. In a preferred embodiment, the controller assembly 5600 includes the controller 206 and the sensor simulator 330 implemented as an application specific integrated circuit (ASIC).

In a preferred embodiment, in step 5710 the operation of the controller assembly 5600 is tested. The operation of the controller assembly 5600 may be tested using any number of methods suitable for testing a controller. In a preferred embodiment, the operation of the controller assembly 5600 is tested by checking the stability of a closed-loop system by spectrum analyzing the bitstream outputs IMOD from the controller 206 and comparing them with known frequency response characteristics of working sigma-delta modulators. The controller 206 preferably processes the output Vsim of the sensor simulator 330 and produces the controller 206 output IMOD. The output IMOD of the controller 206 is preferably compared with the expected output associated with the known output Vsim from the sensor simulator 330. If the actual output IMOD of the controller 206 and the expected output of the controller 206 are equal, the controller assembly 5600 is operating properly.

In a preferred embodiment, in step 5715 the controller assembly 5600 is coupled to the sensor 205. In a preferred embodiment, the controller assembly 5600 is coupled to the sensor 205 after the controller assembly 5600 is found to be operating properly in step 5710. The sensor 205 and the controller assembly 5600 may be coupled using any number of methods suitable for coupling a sensor to a controller. In a preferred embodiment, the sensor 205 and the controller assembly 5600 are coupled using the electrical switch 5105.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

The invention claimed is:

1. An apparatus for recording environmental data measurements, comprising:
   a sensor for detecting environmental data;
   a controller for controlling the operation of the sensor, the operation of the sensor including a plurality of operation modes automatically selected by the controller, wherein the controller further comprises:
   a front-end circuit coupled to the sensor;
   a loop filter coupled to the front-end circuit;
   a multiphase clock generator coupled to the front end circuit and the loop filter;
   a startup sequencer coupled to the loop filter and the multiphase clock generator;
   a sensor simulator for simulating the performance of the sensor coupled to the startup sequencer, the multiphase clock generator, and the front-end circuit; and
   an overload detection device coupled to the loop filter and the startup sequencer.

2. The apparatus of claim 1, wherein the startup sequencer is used at least in part to select a mode of operation of a feedback control system providing control to the apparatus.

3. The apparatus of claim 1, wherein the multiphase clock generator includes a digital signal generator; and a data-independent clock resynchronization circuit coupled to the digital signal generator for resampling clock signals.

4. The apparatus of claim 1, wherein the sensor simulator includes a sensor simulator filter adapted to receive one or more input signals and generate an output signal representative of an operating state of the sensor; and an input signal selector operably coupled to the sensor simulator filter adapted to controllably select the one or more input signals as a function of a simulated operating state of the sensor.

5. A method for recording environmental data measurements, comprising:
   detecting environmental data using a sensor;
   controlling the operation of the sensor by automatically selecting one or more of a plurality of operation modes using a controller, wherein the controller includes a front-end circuit coupled to the sensor, a loop filter coupled to the front-end circuit, a multiphase clock generator coupled to the front end circuit and the loop filter, a startup sequencer coupled to the loop filter and the multiphase clock generator, an overload detection device coupled to the loop filter and the startup sequencer; and simulating the performance of the sensor using a sensor simulator coupled to the startup sequencer, the multiphase clock generator, and the front-end circuit.

6. The method of claim 5 further including selecting a mode of operation of a feedback control system for recording environmental data measurements using in part the startup sequencer.

7. The method of claim 5, wherein the multiphase clock generator includes a digital signal generator; and a data-independent clock resynchronization circuit coupled to the digital signal generator, the method further including resampling clock signals using the multiphase clock generator.

8. The method of claim 5, wherein the sensor simulator includes a sensor simulator filter and an input signal selector operably coupled to the sensor simulator filter, the method including receiving one or more input signals and generating an output signal representative of an operating state of the sensor using the sensor simulator filter and controllably selecting the one or more input signals as a function of a simulated operating state of the sensor using the input signal selector.

* * * * *